(12) United States Patent
Uenoyama et al.

(10) Patent No.: US 7,516,725 B2
(45) Date of Patent: Apr. 14, 2009

(54) TWO-STROKE CYCLE ENGINE

(75) Inventors: Kazuyuki Uenoyama, Nagoya (JP);
Yoshio Kobayashi, Nagoya (JP);
Kazunori Kudo, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 11/700,036

(22) Filed: Jan. 31, 2007

(65) Prior Publication Data

US 2007/0125325 A1 Jun. 7, 2007

Related U.S. Application Data

(62) Division of application No. 10/634,918, filed on Aug. 6, 2003, now Pat. No. 7,225,769, which is a division of application No. 10/388,727, filed on Jan. 9, 2003, now Pat. No. 6,729,276, which is a division of application No. 10/152,035, filed on May 22, 2002, now Pat. No. 6,564,761, which is a division of application No. 09/832,802, filed on Apr. 12, 2001, now Pat. No. 6,408,805, which is a division of application No. 09/558,596, filed on Apr. 26, 2000, now Pat. No. 6,257,179.

(30) Foreign Application Priority Data

| Apr. 28, 1999 | (JP) | ................................ 11-122599 |
| Dec. 16, 1999 | (JP) | ................................ 11-357099 |
| Dec. 27, 1999 | (JP) | ................................ 11-371683 |
| Dec. 27, 1999 | (JP) | ................................ 11-371684 |
| Dec. 28, 1999 | (JP) | ................................ 11-375130 |
| Jan. 7, 2000 | (JP) | ................................ 2000-1316 |

(51) Int. Cl.
*F02B 25/20* (2006.01)

(52) U.S. Cl. .................................. 123/73 PP

(58) Field of Classification Search ............. 123/73 PP, 123/73 A, 74 R, 74 A
See application file for complete search history.

(56) References Cited

U.S. PATENT DOCUMENTS 1,611,283 A * 12/1926 Scott ....................... 123/74 AP (Continued)

FOREIGN PATENT DOCUMENTS

DE 19520944 1/1996

(Continued)

*Primary Examiner*—M. McMahon
(74) *Attorney, Agent, or Firm*—Crowell & Moring LLP

(57) ABSTRACT

A two-stroke cycle engine using a preceding air-layer for scavenging and having a scavenger passage connected to a branching scavenger passage opened to a scavenging port and a connecting passage linking the air and fuel passages so that negative pressure in the air passage forces the fuel-air mixture in the fuel passage into the air passage. The engine also has a removable guide with a surface forming a curved smooth channel which is attachable to the scavenger passage in the crankcase from the mounting surface, and forms a portion of the scavenger passage with the curved channel. The blow-up angle of the scavenger passage varies along the circumference of the cylinder, and the crankcase is configured such that the front and rear portions are separated by a block, and a scavenger passage is provided inside both said front and rear portions of the crankcase and cylinder. Two parallel air passages extend from the air cleaner, the first connected to the air passage, and the second connected to the air inlet of the carburetor to provide air for the fuel passage, and a choke valve on the air cleaner is provided to open and close the first and second air passages.

4 Claims, 31 Drawing Sheets

U.S. PATENT DOCUMENTS

| | | |
|---|---|---|
| 2,115,657 A | 4/1938 | Venedlger |
| 2,317,772 A | 4/1943 | Huber et al. |
| 2,440,645 A | 4/1948 | Pyk et al. |
| 3,089,685 A | 5/1963 | Hennemann et al. |
| 3,612,014 A | 10/1971 | Tenney |
| 3,641,987 A | 2/1972 | Hooper |
| 3,916,851 A | 11/1975 | Otani |
| 4,075,985 A | 2/1978 | Iwai |
| 4,084,556 A | 4/1978 | Villella |
| 4,178,886 A | 12/1979 | Uchinishi |
| 4,204,488 A | 5/1980 | Onishi |
| 4,305,361 A | 12/1981 | Perry |
| 4,306,522 A | 12/1981 | Fotsch |
| 4,445,468 A | 5/1984 | Onishi et al. |
| 4,478,180 A | 10/1984 | Fujikawa et al. |
| 4,821,687 A | 4/1989 | Iwai |
| 4,834,784 A | 5/1989 | Bidanset |
| 4,977,875 A | 12/1990 | Kumagai et al. |
| 5,163,388 A | 11/1992 | Jonsson |
| 5,174,255 A | 12/1992 | Collins et al. |
| 5,201,288 A | 4/1993 | Doragrip |
| 5,226,399 A | 7/1993 | Ozawa |
| 5,251,580 A | 10/1993 | Torigai |
| 5,447,129 A | 9/1995 | Kawasaki et al. |
| 5,678,525 A | 10/1997 | Taue |
| 5,727,506 A | 3/1998 | Tajima et al. |
| 5,870,981 A | 2/1999 | Knaus et al. |
| 5,992,375 A | 11/1999 | Nagashima |
| 6,135,072 A | 10/2000 | Kishita |
| 6,142,113 A | 11/2000 | Mochizuka et al. |
| 6,257,179 B1 | 7/2001 | Uenoyama et al. |
| 6,318,311 B1 | 11/2001 | Kikuchi |
| 6,338,327 B1 | 1/2002 | Ogi et al. |
| 6,354,251 B1 | 3/2002 | Toda |
| 6,367,432 B1 | 4/2002 | Araki |
| 6,418,891 B2 | 7/2002 | Kobayashi |
| 6,450,135 B1 | 9/2002 | Araki |
| 6,491,006 B2 | 12/2002 | Jonsson et al. |
| 6,786,188 B2 | 9/2004 | Kawamoto |
| 6,854,430 B2 | 2/2005 | Olander |
| 6,935,297 B2 | 8/2005 | Honda et al. |

FOREIGN PATENT DOCUMENTS

| | | | | |
|---|---|---|---|---|
| DE | 195 12 566 A1 | 10/1996 | | |
| EP | 0 320 576 B1 | 6/1989 | | |
| GB | 769977 | 3/1957 | | |
| GB | 1021378 | 3/1966 | | |
| JP | 58005423 | 1/1983 | | |
| JP | 58005424 | 1/1983 | | |
| JP | 144740 | 12/1989 | | |
| JP | 426657 | 6/1992 | | |
| JP | 405195789 A | * | 8/1993 | ............... 123/65 R |
| JP | 7139358 | 5/1995 | | |
| JP | 9125966 | 5/1997 | | |
| JP | 9-268917 A | 10/1997 | | |
| JP | 9-287530 | 11/1997 | | |
| JP | 10252565 | 9/1998 | | |
| JP | 2001-55958 A | 2/2001 | | |
| WO | WO 00/26516 | 5/2000 | | |

* cited by examiner

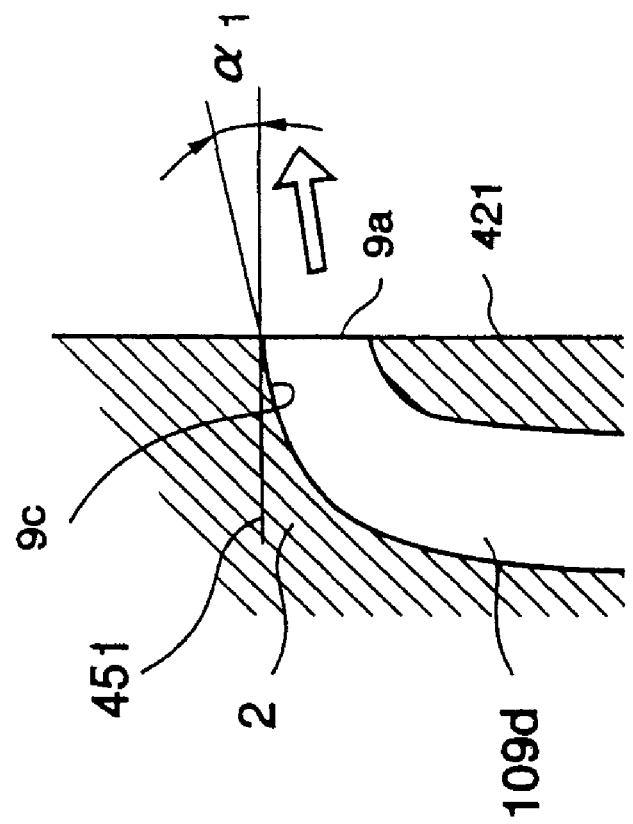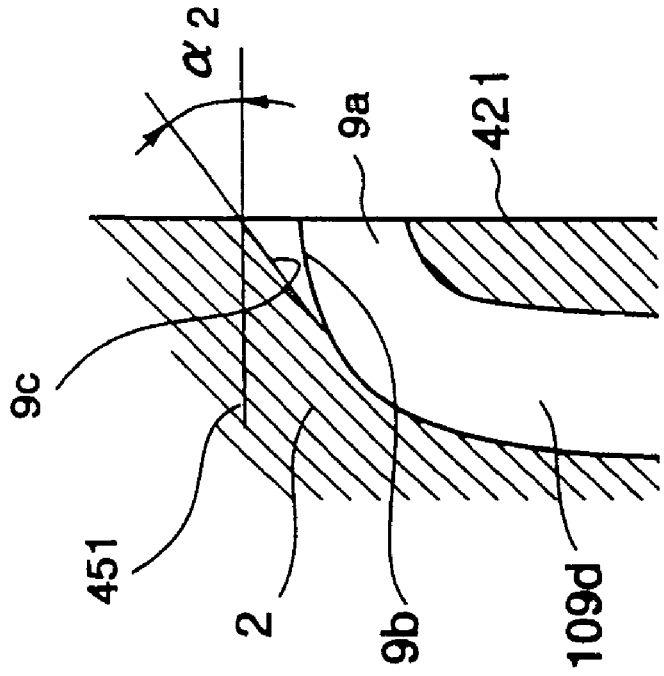

TWO-STROKE CYCLE ENGINE

CROSS REFERENCE TO RELATED APPLICATIONS

This application is a division of application Ser. No. 10/634,918, filed Aug. 6, 2003, now U.S. Pat. No. 7,225,769, which in turn was a division of application Ser. No. 10/338,727, filed Jan. 9, 2003, now U.S. Pat. No. 6,729,276, which was a division of application Ser. No. 10/152,035, filed May 22, 2002, now U.S. Pat. No. 6,564,761, which was a division of application Ser. No. 09/832,802, filed Apr. 12, 2001, now U.S. Pat. No. 6,408,805, which was a division of application Ser. No. 09/558,596, filed Apr. 26, 2000, now U.S. Pat. No. 6,257,179.

BACKGROUND OF THE INVENTION

1. Field of the Invention

This invention concerns a two-stroke cycle engine which uses a layer of scavenging air pressurizing the crankcase. More specifically, it concerns a small two-stroke cycle engine using a preceding air-layer for scavenging, which drives a layer of scavenging air in advance of the fuel-air mixture.

2. Description of the Related Art

Two-stroke cycle engines belonging to the prior art take advantage of the fact that a negative pressure is created in the crankcase when the piston reaches the top of its stroke. This negative pressure causes the fuel-air mixture to be sucked into the crankcase. When the piston reaches the bottom of its stroke, the pressurized fuel-air mixture in the crankcase reaches the scavenging port and is conducted from the crankcase into the combustion chamber. The fuel-air mixture fills the combustion chamber, pushing the exhaust gases ahead of it. In this scavenging process, the opening duration of the scavenging port and the exhaust port experiences significant overlap, with the result that approximately 30% of the fuel-air mixture is sucked out with the exhaust gases. This is the primary cause of the large component of THC (total hydrocarbons) in the exhaust, and it results in the wastage of fuel.

To reduce the quantity of fuel-air mixture which is pushed out of the combustion chamber, scavenging air designs which drive a layer of air ahead of the fuel-air mixture have been proposed. In engines which use scavenging air, the fuel-air mixture goes into the crankcase as the piston travels upward in the intake process. At the same time, air is sucked into the crankcase through a scavenger passage connected to the scavenging port so that the passage is filled with air. In the combustion and exhaust processes which occur when the piston drops and the scavenging port is open, the air in the scavenger passage is forced into the combustion chamber ahead of the fuel-air mixture to scavenge the exhaust gases from the combustion. Immediately after the scavenging air, the fuel-air mixture is admitted into the combustion chamber. This scavenging-air method reduces the quantity of fuel-air mixture which is pushed out of the combustion chamber to one third that which occurred with prior art engines.

A design for a scavenging-air two-stroke cycle engine which forces a layer of air ahead of the fuel-air mixture, in which the fuel and air valves on the carburetor are realized as a single valve, is disclosed in the Japanese Patent Publication (Kokai) 10-252565.

In the prior art scavenging-air engine which drives a layer of air ahead of the fuel-air mixture, the preceding layer of air admitted to the cylinder and crankcase through the air control valve was routed through the same number of passages (either two or three) as there were scavenging ports downstream from the air control valve. These were connected to the passages for the scavenging ports of the cylinders by rubber tubes. The air was fed through lead valves on the scavenger passages to passages on the cylinder and crankcase.

The air introduced via the air control valve was sucked into the crankcase temporarily when the cylinder of the piston was pressurized. When the piston dropped and scavenging occurred, the scavenging air was led into the combustion chamber from the scavenging port.

In another prior art design proposed in the Japanese Patent Publication (Kokai) 7-139358, an air passage was provided which fed into the scavenger passage at a location adjacent to the scavenging port. A non-return valve was provided on the air passage, as was a control valve. The control valve was interlinked with the operation of the engine throttle. In this engine, the crankcase experienced negative pressure when the piston was up. At the same time that the fuel-air mixture was sucked into the crankcase through its supply port, the non-return valve was opened and the air was sucked in through the air passage. This air would completely or partially fill the scavenger passage. When the piston fell during the ignition and exhaust processes and the scavenging port was opened, first the air would rush into the combustion chamber and then the fuel-air mixture would be supplied.

With this prior art technique, a means was devised which would supply the air from the scavenging port to scavenge the combustion chamber quickly at the start of the scavenging process so as to minimize the quantity of fuel-air mixture lost through the exhaust port. This device admitted the fuel-air mixture from the crankcase into the combustion chamber via the scavenging port with a slight delay after the scavenging air was admitted.

This sort of two-stroke cycle engine which admitted a layer of air in front of the fuel-air mixture reduced the quantity of mixture exhausted with the combustion gases, prevented an excessive quantity of THC (total hydrocarbons) from being exhausted, and minimized the quantity of fuel wasted.

In the preceding air-layer type two-stroke cycle engine proposed in the Japanese Patent Publication (Kokai) 10-252565, the preceding air was brought in through a number of rubber tubes with lead valves which was equal to the number of scavenging ports. The design thus required a large number of parts and assembly processes, both of which drove the cost up. Furthermore, the supply passages for the air were provided on the outside of the cylinder, so the dimensions of the engine in its axial direction were increased.

In a two-stroke cycle engine, combustion must be kept stable by supplying a rich mixture with little air when the engine is operating under a light load, including when it is idling, and a comparatively thin mixture when it is operating under a heavy load. This will reduce fuel consumption and decrease the harmful component of the exhaust gas. However, in the prior art design proposed in the Japanese Patent Publication (Kokai) 7-139358, the airflow supplied via the supply passages during scavenging is not controlled to conform to the operating state of the engine.

Under light load conditions, then, such as when the engine is idling, too much air is supplied; and it would be difficult to stabilize combustion by limiting the quantity of air admitted to produce a rich mixture. Similarly, it would be difficult to maintain a thin mixture under heavy load conditions in order to reduce the pollutants in the exhaust gas and lower the fuel consumption.

In the invention disclosed in the Japanese Patent Publication (Kokai) 9-125966, a mixture control valve is provided to open and close the mixture passage which connects the carburetor to the crankcase, and an air control valve is provided to open and close the air passage which connects the air cleaner. The mixture control valve and air control valve are linked so that it is possible to control the flow rate of the fuel-air mixture and that of the air in such a way that their ratio remains constant.

In this type of preceding air-layer type two-stroke cycle engine, when the engine is idling the negative pressure in the air passage increases until it is higher than that in the fuel mixture passage. This causes the throttle to open more, suddenly increasing the speed of the engine. The delay in the fuel supply allows the excessively rich fuel mixture to be thinned out by radically increasing the quantity of preceding air. The extra air reduces the concentration of the fuel mixture.

But when the engine is operating at high speed, an increase in the quantity of air will not be followed by an increased quantity of fuel. The concentration of the fuel will decrease and proper combustion will no longer be possible. Problems with acceleration or engine cut-off may result.

However, in the inventions disclosed in the Japanese Patent Publications 7-139358, 10-252565 and 9-125966, no means are provided to control the ratio of air flow to air-fuel mixture flow during normal operation so as to prevent an excessive quantity of air from being supplied when the engine suddenly accelerates as was described above.

Furthermore, when this sort of two-stroke cycle engine is used in a lawnmower, in many cases it must operate while mounted obliquely. When an obliquely mounted engine operates, fuel collects in the portion below the passage for the fuel-air mixture. When the position of the engine changes, this fuel is sucked in suddenly, resulting in combustion problems due to excess fuel in the engine.

However, the prior art techniques did not offer any method to counteract problems arising from the engine being operated while mounted obliquely.

Generally in two-stroke cycle engines, the passage for the scavenging air which leads into the chamber inside the crankcase follows a smooth curve inside the crankcase, goes through the surface where the crankcase is attached to the cylinder, and is connected to the scavenging port in the cylinder.

FIG. 39 shows an example of a scavenger passage in a two-stroke cycle engine belonging to the prior art. In this drawing, 1 is the engine, which is configured as follows.

2 is the cylinder; 5 is the crankcase. The cylinder 2 and crankcase 5 are fixed to each other with gasket 3 between them by bolts 110 at surfaces 04 and 05. 6 is the crankshaft, 7 is the cylinder head, 10 is the air passage and 60 is the center of the crankshaft.

9 is the scavenging port, which opens into the side of the cylinder 2. 109a is the scavenger passage formed in the cylinder 2, which connects to the scavenging port 9. 109c is the inlet for the scavenger passage formed in the crankcase 5, which opens into the crank chamber. 109b is the scavenger passage in the crankcase 5. It follows a smooth curve inside the crankcase 5 and connects scavenger passage 109a in the cylinder 2 with scavenging inlet 109c.

In this two-stroke cycle engine, the scavenger passage comprises passage 109b in crankcase 5 and 109a in cylinder 2, which meet at the surfaces 04 and 05. Because scavenger passage 109b in crankcase 5 is curved, it has a portion 16 which protrudes between the upper wall of the passage 109b and surface 04.

In the Japanese Patent Publications 58-5423 and 58-5424, scavenger passages are disclosed such that a curved scavenger passage in the crankcase and a scavenger passage in the cylinder come together at the surface where the crankcase and the cylinder are fixed to each other.

However, in the configuration of the scavenger passage in the two-stroke cycle engine shown in FIG. 39, scavenger passage 109b in crankcase 5 is a curved passage with a portion 16 which protrudes between the upper wall of the passage 109b and surface 04. When the crankcase is cast, the die to form scavenger passage 109b in crankcase 5 cannot be removed as a single die in the direction of axis 61 of the cylinder.

With the prior art design shown in FIG. 39, then, to enable the die for scavenger passage 109b to be removed, several different dies were combined to cast the scavenger passage. This complicated the casting work and increased the number of casting processes. Also, because it required combining a number of dies, the probability of a defective cast due to slippage of a die increased.

In the Japanese Patent Publications (Kokai) 58-5423 and 58-5424, too, a protruding portion is formed between the upper wall of the scavenger passage and the surface where the cylinder is fixed to the crankcase. These designs, then, suffer from the same problems as were just described.

Further, with the prior art design shown in FIG. 39, the curved scavenger passage in the crankcase and the scavenger passage in the cylinder meet to form a scavenger passage which goes through the surface where the crankcase and the cylinder are fixed to each other. The fuel in the fuel-air mixture which flows through the scavenger passage will thus seep into the microscopic gap between surfaces 04 and 05 where gasket 3 is inserted. When the engine is operated in an oblique position, this fuel will return to the scavenger passage and result in defective combustion.

In the Japanese Patent Publications (Kokai) 58-5423 and 58-5424, too, a scavenger passage in the crankcase and a scavenger passage in the cylinder meet to form a common passage which goes through the surface where the crankcase and the cylinder are fixed together. These designs thus suffer from the same problem which is described above.

In a two-stroke cycle engine with a pressurized crankcase, the design takes advantage of the fact that a negative pressure is created in the crankcase when the piston reaches the top of its stroke. The fuel-air mixture is sucked into the crankcase through the air inlet. When the piston reaches the bottom of its stroke, the scavenging port opens and the pressurized fuel-air mixture in the crankcase is conducted from the crankcase into the combustion chamber via the scavenger passage and the scavenging port. The fuel-air mixture fills the combustion chamber, pushing the exhaust gases ahead of it.

In the scavenging process in a two-stroke cycle engine, the opening duration of the scavenging port and the exhaust port experiences significant overlap. To address this problem, a number of devices have been proposed to prevent the fuel-air mixture from being sucked out with the combustion gases and to insure that the mixture fills the combustion chamber uniformly.

One such device is proposed in the Japanese Utility Model Publication (Kokai) 1-44740. In this proposal, a two-stroke cycle engine has two scavenger passages, one on the right and one on the left, which lead up from the crankcase. Their upper ends curve toward the axial direction of the cylinder, and they lead into the cylinder. The angles at which the surfaces of the upper walls of the curving scavenger passages meet the cylinder vary continuously from one side to the other.

In this sort of scavenging two-stroke cycle engine with a pressurized crankcase, it is necessary to reduce the quantity of fuel-air mixture which escapes with the exhaust gases, eliminate the exhaust of a large quantity of THC (total hydrocarbons) and minimize the wastage of fuel.

In the scavenging two-stroke cycle engine with a pressurized crankcase proposed in the Japanese Utility Model Publication (Kokai) 1-44740, the angles at which the surfaces of the upper walls of the tops of the scavenger passages meet the cylinder, that is, the angles at which the air is blown into the cylinder, do vary continuously from one side of the scavenging port to the other. However, as can be seen in FIG. 3 of the same publication, the angles θ of the airflow differ from each other. The portion (θa) nearer the exhaust port, which is shown in FIG. 3 (a) is larger than the portion (θc) nearer the intake port, which is shown in FIG. 3 (c).

Thus in the prior art design proposed in the Japanese Utility Model Publication (Kokai) 1-44740, the angle θ of the airflow in the location closer to the exhaust port is made larger. As a result, after the fuel-air mixture forced into the combustion chamber from the portion of the scavenger passage closer to the exhaust port reaches the top of the combustion chamber, it is liable to be caught in the flow of combustion gases travelling toward the exhaust port. The fuel-air mixture supplied from the location closer to the exhaust port, then, is likely to escape out the exhaust port with the combustion gases which comprise the exhaust gas. This will increase the quantity of the THC (total hydrocarbons) which are exhausted and the quantity of fuel which is wasted. The scavenging efficiency will decrease, the density of the fuel-air mixture filling the combustion chamber will be lower, and the engine output will go down.

In a two-stroke cycle engine which is used in a lawnmower, the long scavenger passage which connects the scavenging port to the crankcase and supplies the air-fuel mixture from the crankcase to the combustion chamber must be formed in both the crankcase and the cylinder. The crankcase and cylinder, which are generally made of cast aluminum, must assume a complicated shape, so that their casting requires many processes.

Two-stroke cycle engines for universal applications have been proposed in the Japanese Patent Publication (Kokai) 58-5424 and the Japanese Utility Model Publication (Kokai) 4-26657, among others.

In the Japanese Patent Publication (Kokai) 58-5424, the crankcase has both a primary and an auxiliary scavenging port. The two scavenger passages which lead into the interior of the crankcase, i.e., into the crank chamber, go from the interior of the crankcase through the surface where the crankcase and the cylinder are fixed together. In the cylinder, these two scavenger passages connect to the primary and auxiliary scavenging ports.

In the Japanese Utility Model Publication (Kokai) 4-26657, two pairs of curved scavenger passages go from the interior of the crankcase through the surface where the crankcase and the cylinder are fixed together and then through the interior of the cylinder.

As has been discussed, this is an air-layer type scavenging two-stroke cycle engine. In it, a long scavenger passage which connects the scavenging port and the crankcase is formed in the interior portions of the crankcase and the cylinder. In addition, an air passage is formed in the cylinder to transport the preceding air to the scavenging port. This air passage connects to some intermediate location on the scavenger passage. The crankcase and cylinder, which are generally made of cast aluminum, must be shaped in such a way that the scavenger passage forms a smooth channel in order to minimize the resistance experienced by the fuel-air mixture and the airflow. The shapes of the dies for the casting must be simple, the number of dies must be small, and the engine must be able to be produced in a small number of production processes.

In the design in the Japanese Patent Publication (Kokai) 58-5424, however, the inventors limited their improvement to giving the two long primary and auxiliary scavenger passages in the crankcase and cylinder a smooth contour and so reducing the resistance of the two channels. They did not devote any attention to improving the shape or number of dies used when the crankcase and cylinder were cast or to improving the casting work by reducing the number of casting processes required.

In the design proposed in the Japanese Utility Model Publication (Kokai) 4-26657, the inventors limited their improvement to providing a shape for a curved scavenger passage running from the interior of the crankcase through the interior of the cylinder and preventing the fuel-air mixture from escaping toward the exhaust side. In this prior art design, then, just as with that discussed above, no consideration was given to the casting of the crankcase and cylinder.

In a two-stroke cycle scavenging engine using a layer of air, there is a scavenger passage which connects the scavenging port on the side of the cylinder and the crankcase; an air passage which connects to the scavenger passage at a point midway along its length and supplies scavenging air from the air cleaner to the scavenger passage; and a passage which supplies the fuel-air mixture produced in the carburetor to the crankcase. Before the fuel-air mixture is supplied from the scavenging port to the combustion chamber, a mass of preceding air filtered by the air cleaner is conducted into the combustion chamber by way of the air passage, scavenger passage and scavenging port. This air scavenges the chamber, enhancing both the scavenging and the combustion efficiency.

Two inventions which have proposed such two-stroke cycle scavenging engines which use a layer of air are those disclosed in the Japanese Patent Publications (Kokai) 9-125966 and 10-252565.

In the invention disclosed in the Japanese Patent Publication (Kokai) 9-125966, there are two air cleaners. The outlet of one of the air cleaners connects via the carburetor to the supply passage for the fuel-air mixture. The outlet of the other air cleaner connects through a control valve to the passage which supplies the preceding air to the scavenger passage.

In the invention disclosed in the Japanese Patent Publication (Kokai) 10-252565, the passage which supplies the fuel-air mixture from the carburetor to the crankcase is parallel to the passage which supplies the preceding air to the scavenger passage. The air inlet of the carburetor and the inlet of the air supply passage are connected directly to the outlet of the air cleaner.

When this air layer-type scavenging two-stroke cycle engine is started up, the quantity of air which is to go through the air supply passage must be controlled and a negative pressure must be obtained. The quantity of fuel-air mixture supplied to the combustion chamber from the air mixture supply passage by way of the crankcase and scavenger passage must be increased to produce a rich mixture and so improve the starting characteristics of the engine.

In the invention proposed in the Japanese Patent Publication (Kokai) 9-125966, the air control valve is shut during start-up, so the air supply passage is closed. The air passage on the carburetor is open, and the fuel-air mixture supplied from the carburetor to the air mixture supply passage is increased to produce a rich mixture. However, this design requires two air cleaners, so the configuration is complicated and large, which drives up the equipment cost.

In the invention proposed in the Japanese Patent Publication (Kokai) 10-252565, the air inlet of the carburetor and the inlet of the air supply passage are connected directly to the outlet of the air cleaner. For this reason it would be extremely difficult to completely shut off the preceding air, that is, the air which flows into the air supply passage, at the outlet stage of the air cleaner during start-up.

It is thus impossible, in this invention, to supply a rich mixture to the combustion chamber. And since it is difficult to achieve a high negative pressure as well, the start-up characteristics are unavoidably poor.

Furthermore, in the two prior art designs discussed above, the choke valve which closes off the air passage when the engine is started up is generally a rocking choke valve which rotates about its valve shaft. When the engine is connected to a lawnmower or other working machine and is to be operated, the operating lever of the choke valve gets in the way when the engine is started with the recoil starter. Also, the rocking diameter of the operating lever is considerable, which makes it difficult to operate and so affects the ease of operation.

SUMMARY OF THE INVENTION

The present invention was developed to address the problems associated with the prior art.

The first objective of this invention is to simplify the configuration of the scavenger passage in a scavenging two-stroke cycle engine using a layer of air, to make the engine smaller and lighter, to reduce the number of parts and processes required to produce the engine, and to reduce the production cost.

The second objective of this invention is to provide an air-layer-type scavenging two-stroke cycle engine such that the quantity of fuel-air mixture exhausted with the combustion gases is reduced, and at the same time the quantity of air supplied to the combustion chamber through the scavenging port is controlled via a cut-off valve so that it remains in proper proportion to the quantity of fuel-air mixture. In such an engine, an appropriate concentration of fuel-air mixture is maintained through the entire operating range of the engine. Combustion remains constant when the engine is operated under a light load, and the rate of fuel consumption and the proportion of pollutants in the exhaust are reduced when the engine is operated under a heavy load.

The third objective of this invention is, in an air-layer-type scavenging two-stroke cycle engine, to prevent the concentration of the fuel mixture from becoming too thin due to an excessive intake of air when the engine accelerates suddenly and so maintain proper combustion, thus preventing the engine from hesitating or cutting out.

The fourth objective of this invention is to prevent fuel from collecting at the bottom of the fuel passage when the engine is installed obliquely, and so prevent the defective combustion which would result from an excess of fuel.

The fifth objective of this invention is to make it possible to cast the scavenger passage for a two-stroke cycle engine in such a way that a single die could be used and the piece could be removed from the die in the axial direction of the cylinder. The casting process would be simplified and the number of sub-processes reduced. This would prevent defects resulting from the dies slipping. It would also prevent the imperfect combustion which occurs when the engine is mounted obliquely due to fuel flowing back into the scavenger passage from the surface where the cylinder and crankcase are fixed together.

The sixth objective of this invention is, in a two-stroke cycle engine using pressurized air to scavenge the crankcase, to prevent the fuel-air mixture from escaping out the exhaust port, the reduce the quantity of THC (total hydrocarbons) in the exhaust, to improve the efficiency of the scavenging, to increase the concentration of the fuel-air mixture in the combustion chamber, and to improve the combustion and so enhance the output of the engine.

The seventh objective of this invention is to provide a two-stroke cycle engine with a scavenger passage in the crankcase and cylinder and a method of casting such an engine such that a smooth scavenger passage with little flow resistance could be formed, simply-shaped dies could be used to cast the engine, the number of dies could be reduced, and the number of casting processes could be reduced.

The eighth objective of this invention is to provide a two-stroke cycle engine with a simple, compact, low-cost configuration which would be able to supply a rich fuel-air mixture to the combustion chamber during start-up, and which would enjoy improved start-up characteristics as a result of achieving a high negative pressure.

The ninth objective of this invention is to provide a valve such as a choke valve with a simple and compact configuration to improve the operating characteristics of the engine.

This invention, then, comprises an exhaust port on the side of the cylinder; a scavenging port on the side of the cylinder; a fuel passage, which supplies fuel-air mixture to the crank chamber through the intake port on the side of the cylinder during the time of the elevation of the piston; an air passage, which supplies scavenging air from the air cleaner towards the inner side of the engine; an insulator, in which the fuel passage and the air passage run in parallel; a non-return valve, which is provided on the insulator facing towards the inner side of the engine, to allow the scavenging air to flow only towards the inner side of the engine; a pair of branching air passages to connect an air supply chamber provided at the inner side of the non-return valve and a branching scavenger passage opened to the scavenging port, which are provided within the wall of the cylinder: and a pair of scavenger passages, one end of which is connected to the scavenging port, and another outlet end of which is opened to the crank chamber, the pair of scavenger passages are provided within the wall of the crankcase.

With this invention, scavenger passages are formed in halves, with one half of each inside the walls of the crankcase and the other half inside the walls of the cylinder. This results in long scavenger passages which, when filled with air, can scavenge the crankcase ahead of the fuel-air mixture. Since the mixture is supplied after the crankcase is completely scavenged, the quantity of mixture lost through the exhaust port can be minimized.

Since all the scavenging and air passages are formed inside the crankcase and cylinder, no external pipes or mounting hardware are needed to create air passages. Both the parts count and the number of assembly processes are therefore reduced.

Ideally, in addition to the configuration disclosed above, the end surface of the outlet end of the scavenger passage in the crankcase forms right angles with respect to the axis of the crankshaft, and a microscopic gap is created between the end surface of the outlet and the end surfaces of the crank webs which are perpendicular to the crankshaft, which constitutes disk valves, as the opening area of the outlet of the scavenger passage varies as the crank webs rotate.

The opening area of the outlet of the scavenger passage preferably is formed so that the opening area opens more with the rotation of the crank webs as the opening area uncovered by the crank web grows larger.

If configured as described above, the area of the outlets of the scavenger passages will increase with the rotation of the crank webs. In this way the velocity of the scavenging air which flows from the outlets through the scavenger passages and from the scavenging ports into the combustion chamber can be controlled. This allows us to reduce the quantity of fuel-air mixture which is dragged into the exhaust gas stream, and so minimize the loss of fuel-air mixture.

Ideally, the branching air passages and the branching scavenger passages formed on either side of the cylinder are surrounded by virtually parallel walls which run in the same direction.

If configured in this way, the walls of the branching scavenging and air passages can be formed integrally to and virtually parallel with the cylinder. This allows the cylinder to be cast using a single sliding die. This simplifies the configuration of the die and reduces the cost of producing it.

One preferred embodiment of the invention disclosed in this application comprises a two-stroke cycle engine using a preceding air-layer for scavenging with an exhaust port on the side of the cylinder; a scavenging port on the side of the cylinder; an intake port on the side of the cylinder fuel passage, which supplies fuel-air mixture through a mixture control valve on the carburetor to the crank chamber during the time of the elevation of the piston; a scavenger passage opened to the scavenging port; an air supply port, which supplies scavenging air from the air cleaner to the scavenger passage; a cam which is interlocked with the mixture control valve; a cam follower which engages with the cam; and an air control valve in the upstream of an air passage which controls the diameter of the air passage, and the air control valve being operated by the cam and the cam follower in such a way as to supply a quantity of scavenging air proportional to the quantity of fuel-air mixture determined by the opening of the cam and the mixture control valve to control the fuel-air mixture.

Ideally, the air control valve comprises a valve seat midway along the air passage and an umbrella-type valve which can be attached to or removed from the valve seat and which opens and closes the air passage, the cam is fixed to the rotary shaft of the mixture control valve, the cam is configured with an inner cam which is formed on the inside of the edge at a given height raised up on the outer side along the circumference so that, if a spring exerts force in the direction which closes the air control valve, when the edge of the inner cam engages with the cam follower, the operation of the mixture control valve for the fuel-air mixture is transmitted to the air control valve, and the operation opens the air control valve against the force of the spring.

Ideally, the air control valve has a valve seat midway along the air passage and an umbrella-type valve which can be attached to or removed from the valve seat and which opens and closes the air passage, the cam is fixed to the rotary shaft of the mixture control valve, the cam is configured with an inner cam which is formed on the inside of the edge at a given height dropped down on the outer side along the circumference so that, if a spring exerts force in the direction which closes the air control valve, when the edge of the inner cam engages with the cam follower, the operation of the mixture control valve for the fuel-air mixture is transmitted to the air control valve, and the operation opens the air control valve against the force of the spring.

If configured in this way, the air control valve is interlocked with the valve which controls the flow rate of the fuel-air mixture. Thus when the engine operates under a light load, the air control valve is closed more, and the quantity of air is reduced. This allows stable combustion with a rich mixture. Under heavy load conditions, the air control valve is opened more, and the engine operates with a thin mixture. In this way we can prevent noxious substances with high THC (total hydrocarbons) from being exhausted.

If configured as described above, the opening ratio of the throttle valve and air control valve can easily be controlled in response to a change in the angular position of the mixture control valve.

Ideally, an air passage which connects to the outlet of the supply passage for the fuel-air mixture runs inside the insulator. This insulator is attached to the side of the cylinder downstream from the outlet of the supply passage and the air control valve and runs in the same direction as the air supply outlet. The air passage runs in the same direction as the insulator.

One advantageous embodiment of the invention comprises a two-stroke cycle engine using a preceding air-layer for scavenging with an exhaust port on the side of the cylinder; a scavenging port on the side of the cylinder; a fuel passage, which supplies fuel-air mixture to the crank chamber through the intake port on the side of the cylinder during the time of the elevation of the piston; a scavenger passage to be connected to the scavenging port; an air passage, which supplies scavenging air from the air cleaner toward the inner side of the engine; an insulator, in which the fuel passage and the air passage run in parallel; a non-return valve, which is provided on the insulator facing toward the inner side of the engine, to open or close the air passage by means of the negative pressure in the scavenger passage; and a connecting passage with a small diameter to link the air passage and the fuel passages so that negative pressure in the air passage forces the fuel-air mixture in the fuel passage into the air passage.

With the invention disclosed above, the fuel-air mixture in the fuel passage is supplied to the air passage through a small-diameter connecting passage when the negative pressure in the air passage becomes greater than that in the fuel passage because the engine is idling. Thus when there is an excessive quantity of air in the air passage during sudden acceleration, fuel-air mixture from the fuel passage will be introduced and mixed with that air.

By forcing fuel-air mixture into the airflow in the air passage, we prevent the new air supplied to the cylinder from the scavenging port from creating a mix with too much air. This method prevents the fuel mixture from becoming too thin during sudden acceleration of the engine and so improves the acceleration characteristics.

Furthermore, since the throttle opens during high-speed operation, the pressure differential between the fuel and air passages virtually disappears. Thus virtually no fuel-air mixture will flow from the fuel passage through the small-diameter connecting passage and into the air passage at high speeds. The method prevents fuel-air mixture from getting into the preceding air and so helps maintain the required exhaust characteristics.

When the engine is mounted obliquely, the fuel-air mixture in the fuel passage can flow through the small-diameter connecting passage into the air passage. It will thus not collect in the bottom of the fuel passage, so that a large quantity of fuel is suddenly sucked into the cylinder when the engine's orientation is changed. This design, then, will prevent imperfect combustion.

With the invention disclosed above, then, we can achieve an air-layer-type scavenging two-stroke cycle engine which produces the effect through a very simple device, i.e., a small-diameter connecting passage between the air and fuel passages which causes the negative pressure of the air passage to draw the fuel-air mixture in the fuel passage into the air passage. This obviates the need for a complicated control device.

In one preferred embodiment of the invention, the small-diameter connecting passage in the configuration discussed above connects the air and fuel passages at a point downstream from the non-return valve.

If configured in this way, the connecting passage goes into the air passage downstream from the non-return valve. When the engine is mounted obliquely, when it is, say, rotated 180°, the fuel which collects in the lower end of the fuel passage will flow through the connecting passage into the air passage. This will prevent too much fuel from flowing into the combustion chamber and affecting the rate of combustion, improving both the engine's operation and its effect.

In one preferred embodiment of the invention, the small-diameter connecting passage in the configuration discussed above can connect the air and fuel passages at a point upstream from the non-return valve.

If configured in this way, the connecting passage goes into the air passage upstream from the non-return valve. The diameter of the mouth of the connecting passage can be increased without producing a drop in engine output. This further improves the acceleration characteristics during sudden acceleration.

The following embodiments are preferred.

(1) The connecting passage is formed in the insulator gasket interposed between the mounting surfaces of the insulator and cylinder, or in the carburetor gasket interposed between the mounting surfaces of the carburetor and the insulator. If one of these configurations is adopted, it will be possible to fashion a connecting passage merely by creating a slit of the same diameter as the connecting passage in either the insulator gasket or the carburetor gasket. Creating a connecting passage in this way is straightforward and does not require a large number of processes.

(2) The connecting passage is cut into the surface of the insulator where it is mounted to the cylinder.

(3) The connecting passage is cut into the surface of the cylinder where it is mounted to the insulator.

(4) The connecting passage is formed in the carburetor gasket which goes between the carburetor and the insulator.

(5) The connecting passage is cut into the surface of the insulator where it is mounted to the carburetor.

(6) The connecting passage is cut into the surface of the carburetor where it is mounted to the insulator.

(7) The connecting passage comprises a small hole in either the insulator, the carburetor, or the cylinder, which connects the air passage to the fuel passage.

(8) There is a non-return valve on the small hole which permits flow only in the direction from the fuel passage to the air passage.

(9) The connecting passage is placed so that one end connects the air and fuel passages downstream from the non-return valve while the other end connects them upstream from the valve.

If the connecting passage is configured in this way, with one end between the air and fuel passages downstream from the non-return valve, the fuel-air mixture in the fuel passage can flow through the connecting passage and into the air passage when the engine is mounted obliquely. This prevents fuel from collecting at the bottom of the fuel passage and being sucked into the cylinder suddenly when the position of the engine changes, so it eliminates imperfect combustion due to an excess of fuel. The other end of the connecting passage connects the air and fuel passages upstream from the non-return valve. This makes it possible to increase the diameter of the outlet of the connecting passage without a drop in engine output, thus improving the engine's ability to accelerate suddenly.

A preferred embodiment of the invention comprises a two-stroke cycle engine with a scavenger passage which connects a scavenging port on the side of the cylinder to the crank chamber inside the crankcase, and goes through the mounting surface where the cylinder and crankcase are attached to each other; and a removable guide with a surface forming a curved smooth channel which is attachable to the scavenger passage in the crankcase from the mounting surface, and forms a portion of the scavenger passage with the curved channel.

The guide should be configured as follows.

In one advantageous embodiment, the guide has a positioning tooth which engages with the hole in the gasket for the surface where the cylinder and crankcase are attached to each other.

In another preferred configuration, the guide is fixed to the crankcase when its tooth engages in an indentation in the crankcase.

If the engine is configured as described above, the fuel-air mixture from the crank chamber in the crankcase is led into a scavenger passage one portion of which comprises a guide with a smoothly curved channel. The mixture flows through the scavenger passage formed as a smooth channel and is supplied to the scavenging port. Because the scavenger passage is a smoothly curved channel without any right angles, the fuel-air mixture flows smoothly and rapidly without any flow loss such as a decrease in flow velocity as it is supplied to the scavenging port.

The guide is mounted on the crankcase in such a way that it can be removed by pulling it away from the surface where the crankcase is attached to the cylinder along the axial direction of the cylinder. This obviates the need for a tooth between the upper wall of the scavenger passage and the surface where the crankcase is attached, as was required in the prior art. The guide performs the same function as the tooth. When the crankcase is cast, even if a single die is used to form the scavenger passage inside the crankcase, the die can easily be removed in the axial direction of the cylinder.

This design simplifies the casting procedure by which the scavenger passage is formed, and it reduces the number of casting processes required. Because the scavenger passage can be formed using a single die, there is no possibility that one of several dies will slip out of position, as sometimes happened with prior art techniques, and ruin the casting. This design, then, improves the quality of the crankcase containing the scavenger passage.

If the engine is configured in accordance with one preferred embodiment, the guide has a positioning tooth which engages in a hole in the gasket between the cylinder and crankcase. When the tooth engages in the hole in the gasket, its position is assured, and the position of the gasket is also assured. The fact that the guide has been inserted can be ascertained by how the gasket is positioned, so there is no chance that the guide will be forgotten.

In another advantageous embodiment of the invention, the crankcase has an indentation which serves as the slot into which the tooth on the guide engages. Because the guide is fixed to the crankcase, it will always be positioned correctly. The surface of the channel on the guide connects smoothly to the scavenger passage in the crankcase.

Ideally, the guide should have a depression in the surface at which it is fixed to the crankcase.

If the engine is configured in this way, the slight gap between the crankcase and cylinder where the gasket is interposed will be smaller. Less fuel will seep into the gap from the fuel-air mixture flowing through the scavenger passage connecting the crankcase and the cylinder through the common surface where they are attached to each other, which comprises the scavenger passage formed by the crankcase and the guide, and the scavenger passage in the cylinder. The fuel flows downward through the depression formed in the guide, so even if the engine is mounted obliquely, the fuel cannot return to the scavenger passage. This eliminates imperfect combustion due to fuel flowing back into the scavenger passage.

Ideally, the guide is distinguished by the fact that it is painted on.

If the guide is configured in this way, by being painted on, it will always be perfectly plain whether or not it is there. This will eliminate the possibility that it will be forgotten during assembly. By using a different color for each type of machine, we can simplify our parts control.

A preferred embodiment of the invention of this application is as follows.

The guide is formed by molding a deep-drawing sheet as a single piece with the gasket between the cylinder and crankcase. If produced in this way, the guide and the gasket are one piece, and deep drawing allows the channel surface and the depression to be formed on the front and reverse sides of the sheet at the same time. This reduces the parts count and the number of assembly processes.

One embodiment of the invention disclosed in this application comprises a two-stroke cycle engine with an exhaust port on the sidewall of the cylinder, which opens into the cylinder; a scavenging port on the sidewall of the cylinder positioned a slight distance apart in the circumferential direction from the exhaust port, which also opens into the cylinder; an intake port, which opens to supply fuel-air mixture to the crankcase according to the action of the piston; and a scavenger passage, which connects the crankcase and the scavenging port; wherein a blow-up angle ($\alpha$) of the scavenger passage, which is defined by an angle between the upper wall which connects to the scavenging port and a perpendicular line to the axis of the cylinder, varies along the circumferential direction of the cylinder, and if the blow-up angle in a location nearer the exhaust port is defined as ($\alpha 1$) and the blow-up angle in a location nearer the intake port is defined as ($\alpha 2$), then $\alpha 1 < \alpha 2$.

Ideally, the blow-up angle ($\alpha$) of the scavenger passage varies continuously from a location nearer the intake port to one nearer the exhaust port.

Also ideally, the surface of the upper wall of the scavenger passage is formed so that it varies in one or more steps from angle ($\alpha 2$) at a location nearer the intake port to angle ($\alpha 1$) at a location nearer the exhaust port.

If the scavenger passage is configured as described above, when the action of the piston causes the exhaust port and then the slightly lower scavenging port to open, the fuel-air mixture forced into the scavenger passage from the crankcase will flow from the scavenging port into the combustion chamber.

Because the blow-up angle of the upper wall connecting the scavenger passage to the scavenging port is greater at a location nearer the intake port than it is at a location nearer the exhaust port, the fuel mixture which enters the chamber from the location nearer the exhaust port will flow along the top of the piston at a high speed without being dispersed. This will prevent it from getting caught in the exhaust gas stream and so reduce the quantity of fuel lost through the exhaust port. The fuel-air mixture which enters the chamber from the location nearer the intake port will be flowing at a lower velocity than that nearer the exhaust port. It will be sent into the area around the spark plug in the upper part of the chamber, where it will be efficiently ignited and combusted.

Thus this configuration prevents the fuel-air mixture from escaping unburned through the exhaust port, improves the scavenging efficiency, and increases the concentration of the fuel-air mixture which fills the combustion chamber. This improves the combustion and increases the output of the engine. The fact that the fuel-air mixture is prevented from escaping through the exhaust port translates into a lower THC level (total hydrocarbons) in the exhaust.

If the engine is configured in accordance with one preferred embodiment, the surface of the upper wall of the scavenger passage is formed so that it varies in step fashion from a large angle ($\alpha 2$) at a location nearer the intake port to a smaller angle ($\alpha 1$) at a location nearer the exhaust port. When the cylinder is cast, two dies can be used with two different blow-up angles, as described above, with the angles changing at the border between the dies. This will make it easy to remove the work from the dies and will reduce the number of processes necessary to produce the cylinder. Also, using dies with two different blow-up angles to form the scavenger passage is an easy and reliable way to control the blow-up angle.

A preferred embodiment of the invention disclosed in this application comprises a two-stroke cycle engine with a scavenging port on the side of the cylinder, which opens into the cylinder; and a scavenger passage, which connects the crank chamber in a crankcase and the scavenging port, and supplies the fuel-air mixture in the crank chamber to the scavenging port; wherein the crankcase is configured in such a way that the front and rear portions, which are separated by a block at a right angle to the crankshaft which entails the axis of the cylinder, are fixed to each other by mounting hardware, a scavenger passage is provided inside both the front and rear portions of the crankcase, and the cylinder, whose scavenger passage connects to the scavenger passage in the crankcase, is fixed by mounting hardware to the mounting surface on the top of the crankcase in such a way that the scavenger passage runs through the mounting surface.

The invention of this application thus comprises a two-stroke engine with a scavenger passage which connects the crankcase and the scavenging port on the side of the cylinder, which opens into the cylinder and supplies the fuel-air mixture in the crankcase to the scavenging port. This two-stroke engine is distinguished by the following. In addition to having scavenger passages in both the crankcase and the cylinder, the front and rear portions of the crankcase, separated by a block at a right angle to the crankshaft, which entails the axis of the cylinder, are fixed to each other at the block by mounting hardware to form a unitary crankcase. The cylinder, whose scavenger passage connects to that in the crankcase, is fixed by mounting hardware to the mounting surface at the top of the crankcase.

Ideally, the air passage which supplies air from the air cleaner to the scavenger passage is formed inside the cylinder. The air passage connects to the middle portion of the scavenger passage inside the cylinder.

If the engine is configured in this way, the crankcase is separated by a block at a right angle to the crankshaft, and so to the axis of the cylinder, into front and rear portions, each of which has a scavenger passage inside it. The front and rear portions of the crankcase are fixed together by mounting hardware. The cylinder, which also has a scavenger passage inside it, is fixed to the upper surface of the crankcase by mounting hardware. The scavenger passage in the cylinder is thus linked to that in the crankcase, forming a long scavenger passage running through both cylinder and crankcase. Both the crankcase and the cylinder are thus compact structures with no bulges, and the scavenger passage has a gradually curved contour without angularities.

Furthermore, a crankcase with a scavenger passage running through its interior can be cast in two pieces which form the front and rear portions of the engine. These can be removed from the die at the surface where the front and rear pieces are separated and at the surface where the cylinder is mounted to the crankcase, which is perpendicular to the surface between the pieces. This allows the die to have a simple shape, simplifies removing the work from the die, and allows the engine to be forming a long scavenger passage running through both cylinder and crankcase. Both the crankcase and the cylinder are thus compact structures with no bulges, and the scavenger passage has a gradually curved contour without angularities.

Furthermore, a crankcase with a scavenger passage running through its interior can be cast in two pieces which form the front and rear portions of the engine. These can be removed from the die at the surface where the front and rear pieces are separated and at the surface where the cylinder is mounted to the crankcase, which is perpendicular to the surface between the pieces. This allows the die to have a simple shape, simplifies removing the work from the die, and allows the engine to form a long scavenger passage running through both cylinder and crankcase. Both the crankcase and the cylinder are thus compact structures with no bulges, and the scavenger passage has a gradually curved contour without angularities.

Furthermore, a crankcase with a scavenger passage running through its interior can be cast in two pieces which form the front and rear portions of the engine. These can be removed from the die at the surface where the front and rear pieces are separated and at the surface where the cylinder is mounted to the crankcase, which is perpendicular to the surface between the pieces. This allows the die to have a simple shape, simplifies removing the work from the die, and allows the engine to be cast using fewer dies. The casting procedure is simplified and requires fewer processes.

Ideally, there should be two scavenging ports along the circumference of the cylinder. There should also be two scavenger passages running from the outlets in the crankcase to the scavenging ports. These passages should run through the block separating the halves of the crankcase, and they should be arranged symmetrically along the front-to-rear dimension of the engine.

If the engine is configured in this way, the scavenger passages will run the entire length from the outlets of the crankcase to the scavenging ports in the cylinder and through the separator block, and they will be symmetrical. Thus a common die can be used to cast the front and rear portions of the scavenger passages, allowing the engine to be produced with only a few dies. The shapes of the two passages will be identical, so the cylinder will be scavenged uniformly along its circumference and filled uniformly with the fuel-air mixture.

The following embodiments are preferred for the devices disclosed in this application.

(1) The air passage branches into two passages at the inlet to the cylinder. Each of these branching air passages extends from the branch along the length of the engine, and the two run symmetrically through the block separating the halves of the crankcase. They are connected to the scavenger passages.

If the engine is configured in this way, the two branching air passages run in parallel through the block separating the halves of the crankcase. Since they are identical, a common die can be used to cast each of the passages, and fewer dies need be used overall. Since the shapes of the two air passages are identical, the action of the scavenging air will be uniform along the circumference of the cylinder.

(2) The scavenger passages and branching air passages formed in the cylinder are enclosed by walls which run virtually parallel to each other in the same direction.

If configured in this way, the walls of the scavenging and branching air passages are integral to the cylinder and run virtually parallel to each other. The sliding die for the cylinder can thus be a single piece, which simplifies the configuration of the die.

The invention in one preferred embodiment comprises a two-stroke engine with a scavenger passage which connects the crankcase and the scavenging port on the side of the cylinder; an air passage connected to the midpoint of the scavenger passage, which supplies scavenging air from the air cleaner to the scavenger passage; and a fuel passage, which supplies the fuel-air mixture produced in the carburetor to the crankcase. This two-stroke engine is distinguished by the following. The air cleaner has two air passages running from it in parallel, one of which is connected to the air passage, and the other of which is connected to the air inlet of the carburetor to provide air for the fuel-air mixture. A choke valve on the air cleaner opens and closes both of these air passages.

Ideally, the choke valve comprises a rotary valve which, when rotated, opens or closes the openings of the two air passages, and a knob by which the valve can be rotated.

Also, in one preferred embodiment, the choke of the choke valve engages with the case of the air cleaner in such a way that it is free to rotate. Its front surface comprises a sheet which covers or uncovers the inlets of the two air passages. A sealing ring consisting of an elastic material presses the flat surface of the valve against the openings of the inlets by elastic force and forms a fluid seal around the valve shaft with respect to the interior of the case.

A tapered protrusion is formed on the inner surface of the case of the air cleaner. When the rotary knob of the choke valve strikes the protrusion, the flat surface of the valve is pressed against the opening of either the first or the second of the two air passages.

If the choke is configured in this way, when the knob of the choke valve is turned to start up the engine, the second air passage, which connects the air cleaner to the air inlet of the carburetor, is completely closed, and only the choke hole is open. The first air passage, which connects the air cleaner to the air passage supplying the preceding air, is also completely closed when the engine is started up.

When the choke is adjusted in this way, the air from the air cleaner which is supplied to the carburetor via the second air passage is constricted by the choke hole. The fuel-air mixture produced in the carburetor is supplied via the crankcase, scavenger passage and scavenging port to the combustion chamber.

Since the first air passage from the air cleaner is completely closed by the choke at this time, the fuel-air mixture from the carburetor is supplied to the combustion chamber without any preceding air. Thus the chamber is filled with a rich fuel-air mixture. This improves the start-up characteristics of the engine.

The flat surface of the rotary choke of the choke valve covers and uncovers the openings of the two air passages. The elastic force of the O-ring or other sealing ring which is inserted around the shaft of the choke causes the flat surface to press against the openings. The choke valve thus completely and reliably closes the opening of the passage for the preceding air. This promotes the production of a rich fuel-air mixture as described above and allows a high negative pressure to be maintained.

This invention provides both a sealing ring as described above and a protrusion on the outside of the case of the air cleaner to serve as a stop for the choke, and rotating the choke valve from its initial position to its normal operating position will switch between the two aforesaid air passages. When the choke valve is rotated, its knob easily goes over the protrusion against the force of the sealing ring. The moderate friction improves the operating feel of the choke valve. When the choke valve is released, the elastic force of the sealing ring and the force of the protruding stop automatically hold the choke valve in place on the flat portion of the case in such a way that it cannot go back. This insures easy operation.

There is a tapered protrusion on the inner surface of the case of the air cleaner. When the choke valve is rotated toward starting position, the knob of the choke valve goes over the protrusion. When this occurs, the elastic force generated by the deflection of the valve causes its flat surface to push down on the opening of the passage for the preceding air. This improves the sealing function of the flat surface, and thus improves the start-up characteristics.

The invention disclosed herein is a two-stroke engine which is distinguished by the following. It has a rotary valve installed on the case in such a way that it is free to rotate which, when rotated, opens and closes the two air passages; and a rotary knob which operates the valve. The front surface of the valve comprises a sheet which covers or uncovers the inlets of the two air passages. A sealing ring consisting of an elastic material presses the flat surface of the valve against the openings of the inlets by elastic force and forms a fluid seal around the valve shaft with respect to the interior of the case.

A rotary valve configured in this way is not limited in its application to use as a choke valve for the air cleaner of a two-stroke engine. It can be used in a wide range of applications which require switching between two fluid passages by operating a rotary valve.

To summarize, the effects of the invention disclosed above are as follows.

(1) In one preferred embodiment of the invention, all scavenger passages and air passages are formed inside the crankcase and the cylinder. This obviates the need for external pipes to serve as air passages as well as their mounting hardware. Fewer parts and assembly processes are required, and the engine can be made lighter and smaller.

The scavenger passage is formed of two passages, one created by walls in the crankcase and the other by similar walls in the cylinder. The result is a long scavenger passage which can be filled with air for the scavenging operation. Since the fuel-air mixture is supplied only after the crankcase has been thoroughly scavenged by this air, no fuel is lost through the exhaust port, and fuel wastage is minimized.

If configured as in one preferred embodiment, the outlet of the scavenger passage on the side of the crankcase opens into the crank chamber. The gap between the side of the crankcase and the crank web is reduced, and a disk valve is formed by the outlet on the crankcase and the crank web. This controls the velocity of the air forced in through the scavenging port and reduces the quantity of fuel-air mixture which becomes trapped in the exhaust gas stream.

If configured as in another advantageous embodiment of the invention, the branching air passage and the branching passage to the scavenging port in the cylinder are both enclosed by walls that run parallel in the same direction. This allows the sliding die for the scavenger passage to be one piece in the process of casting the cylinder. The die can have a simpler shape and will be cheaper to produce.

If the engine is configured in accordance with one preferred embodiment, a valve controls the air flow supplied to the combustion chamber via the scavenging port of the engine. This air control valve is interlocked with the fuel-mixture control valve through a cam mechanism which rotates with the fuel-mixture valve. This allows the opening and closing of the air and fuel control valves to be controlled in relation to each other.

Thus when the engine is operating under a light load, the air control valve can be fully closed or opened only slightly so that the fuel mixture is richer and stable combustion can be maintained. When the engine is operating under a heavier load, the air control valve can be opened or closed proportionally with the fuel mixture control valve to produce a thinner mixture. We can thus provide an air-layer-type scavenging two-stroke engine in which the overall richness of the mixture can be kept at the appropriate concentration, the rate of fuel consumption is reduced, and the quantity of pollutants in the exhaust gas is lowered.

The opening of the mixture control valve which controls the flow rate of the fuel-air mixture is interlocked via a cam mechanism to the opening of the air control valve. The angular ratio of the mixture control valve to the air control valve can be set as desired; it will remain constant regardless of the angular position of the mixture control valve. This design, then, allows the user to select the most advantageous ratio.

(2) In one preferred embodiment of the invention, the air passage and the fuel mixture passage are linked by a small-diameter connecting passage. Thus the fuel mixture in the fuel passage can be supplied via this small-diameter connecting passage to the air passage. In this way more fuel-air mixture can be added to the air flowing through the air passage. This prevents the new air supplied to the cylinder from the scavenging port from creating too thin a mix when the engine accelerates suddenly, and thus improves the acceleration characteristics.

When the engine is operating at high speed, there is virtually no pressure differential between the fuel passage and the air passage. There will therefore be almost no fuel-air mixture flowing via the small-diameter connecting passage from the fuel passage to the air passage, and thus no fuel in the layer of preceding air. This will insure that the required exhaust specifications can be maintained.

When the engine is mounted obliquely, the fuel-air mixture in the fuel passage can flow into the air passage via the connecting passage. This prevents fuel from collecting in the lowest portion of the fuel passage so that a large quantity of fuel is suddenly sucked into the cylinder when the engine's orientation is changed. This design, then, will prevent the imperfect combustion which would occur if there were excess fuel in the chamber.

Providing a small-diameter connecting passage between the air and fuel passages obviates the need for a control device with a complicated configuration. It allows us to realize an air-layer-type scavenging two-stroke engine which can achieve the same effect with an extremely simple device.

One end of the connecting passage connects the air and fuel passages downstream from the non-return valve. The effect of this when the engine is mounted obliquely is that it will prevent an excess of fuel in the combustion chamber which will result in imperfect combustion. The other end of the connecting passage connects the air and fuel passages upstream from the non-return valve. This makes it possible to increase the diameter of the outlet of the connecting passage without a drop in engine output, thus improving the engine's ability to accelerate suddenly.

(3) In one advantageous embodiment of the invention, a surface of a guide which forms the shape of a channel connects smoothly with the scavenger passage in the crankcase. The resulting scavenger passage is gradually curved with no right angles, so the fuel-air mixture which moves through it does not experience any loss of flow through deceleration, but is supplied to the scavenging port smoothly and at a high velocity. This improves the engine output.

The guide is mounted on the crankcase in such a way that it can be removed by pulling it away from the surface where the crankcase is attached to the cylinder along the axial direction of the cylinder. The guide fulfills the function of the projection that was used in the prior art. When the crankcase is cast, even if a single die is used to form the scavenger passage inside the crankcase, the die can easily be removed in the axial direction of the cylinder.

This design simplifies the casting procedure by which the scavenger passage is formed, and it reduces the number of casting processes required. Because the scavenger passage can be formed using a single die, there is no possibility that one of several dies will slip out of position, as sometimes happened with prior art techniques, and ruin the casting. This design, then, improves the quality of the crankcase containing the scavenger passage.

In one advantageous configuration of the invention, the guide has a positioning tooth which engages with the hole in the gasket. When the tooth engages in the gasket hole, its position is guaranteed, and so is that of the gasket. The fact that the guide is in place can be known from how the gasket is seated, so there is no chance of forgetting the guide.

In one preferred embodiment of the invention, the guide is fixed to the crankcase when its tooth engages in an indentation in that crankcase. In this way the guide can be positioned with complete accuracy so that its surface which forms a channel can connect smoothly to the scavenger passage in the crankcase.

According to another preferred embodiment, even if the fuel in the fuel-air mixture flowing through the scavenger passage connecting the crankcase and the cylinder through the common surface where they are attached to each other seeps into the gap between the surfaces where the gasket is inserted, the fuel will flow downward through the depression formed in the guide. Thus even if the engine is mounted obliquely, the fuel cannot return to the scavenger passage. This eliminates imperfect combustion due to fuel flowing back into the scavenger passage.

(4) In another preferred embodiment, the blow-up angle of the upper wall of the scavenger passage which connects it to the scavenging port is greater at a location nearer the intake port than at one nearer the exhaust port. The fuel mixture which enters the chamber from the location nearer the exhaust port will flow along the top of the piston at a high speed without being dispersed. This will prevent it from getting caught in the exhaust gas stream and so reduce the quantity of fuel lost through the exhaust port. The fuel-air mixture which enters the chamber from the location nearer the intake port will be flowing at a lower velocity than that nearer the exhaust port. It will be sent into the area around the spark plug in the upper part of the chamber, where it will be efficiently ignited and combusted. The scavenging efficiency is improved, the fuel-air mixture which fills the combustion chamber has a higher concentration, and the combustion is improved, resulting in greater engine output. Also, preventing the fuel-air mixture from escaping reduces the level of THC (total hydrocarbons) in the exhaust.

If the engine is configured in accordance with another preferred embodiment, the surface of the upper wall of the scavenger passage is formed so that it varies in step fashion from a large blow-up angle at a location nearer the intake port to a smaller blow-up angle at a location nearer the exhaust port. When the cylinder is cast, two dies can be used with two different blow-up angles, with the angles changing at the border between the dies. This will make it easy to remove the work from the dies and will reduce the number of processes necessary to produce the cylinder.

Also, using dies with two different blow-up angles to form the scavenger passage is an easy and reliable way to control the blow-up angle.

(5) In another preferred embodiment of the invention, the crankcase is divided into front and rear portions, each of which has a scavenger passage inside it. These two portions of the crankcase are fixed to each other by mounting hardware. The cylinder, whose scavenger passage connects to that in the crankcase, is fixed by mounting hardware to the mounting surface at the top of the crankcase. This results in a long scavenger passage running through both cylinder and crankcase. Both the crankcase and the cylinder are thus compact structures with no bulges, and the scavenger passage has a gradually curved contour without angularities.

Furthermore, a crankcase with a scavenger passage running through its interior can be cast in two pieces which form the front and rear portions of the engine. These can be removed from the die at the surface where the front and rear pieces are separated and at the surface where the cylinder is mounted to the crankcase, which is perpendicular to the surface between the pieces. This allows the die to have a simple shape, simplifies removing the work from the die, and allows the engine to be cast using fewer dies. The casting procedure is simplified and requires fewer processes, with the result that the cost is lower.

If the engine is configured in accordance with another preferred embodiment, the scavenger passages will run the entire length from the outlets of the crankcase to the scavenging ports in the cylinder and through the surfaces where the two portions meet, and they will be symmetrical. Thus a common die can be used to cast the front and rear portions of the scavenger passages, allowing the engine to be produced with fewer dies. The shapes of the two passages will be identical, so the cylinder will be scavenged uniformly along its circumference and filled uniformly with the fuel-air mixture.

Furthermore, the two branching air passages run symmetrically through the surface between the two halves of the crankcase. If the passages are configured in this way, a common die can be used to cast both of them, so fewer dies need be used overall. Since the shapes of the two air passages are identical, the action of the scavenging air will be uniform along the circumference of the cylinder.

Also, the walls of the scavenging and branching air passages can be formed integrally to the cylinder and virtually parallel with each other. If configured in this way, the sliding die for the cylinder can be a single piece. This simplifies the configuration of the die and reduces the cost of producing it.

(6) With the invention disclosed above, the first air passage from the air cleaner is completely and reliably closed by the choke valve when the engine is being started up. Thus the supply of scavenging air to the combustion chamber is cut off, and only the fuel-air mixture from the carburetor is supplied to the combustion chamber. Thus the chamber is filled with a rich fuel-air mixture. This improves the start-up characteristics of the engine.

The flat surface of the rotary choke of the choke valve covers and uncovers the openings of the two air passages. The elastic force of the O-ring or other sealing ring which is inserted around the shaft of the choke causes the flat surface to press against the openings. If configured in this way, the choke valve completely and reliably closes the opening of the passage for the preceding air. This promotes the production of a rich fuel-air mixture as described above and allows a high negative pressure to be maintained.

In addition to the sealing ring, a protrusion is provided on the outside of the case of the air cleaner to serve as a stop for the choke. If the choke valve is configured in this way, rotating it from its initial position to its normal operating position will switch between the two aforesaid air passages. When the choke valve is rotated, its knob easily goes over the protrusion against the force of the sealing ring. The moderate friction improves the operating feel of the choke valve. When the user releases the choke valve after operating it, the elastic force of the sealing ring and the force of the protruding stop automatically hold the choke valve in place on the flat portion of the case in such a way that it cannot go back. This insures easy operation.

Furthermore, there is a tapered protrusion on the inner surface of the case of the air cleaner. When the choke valve is rotated toward starting position, the knob of the choke valve goes over the protrusion. When this occurs, the elastic force generated by the deflection of the valve causes its flat surface to push down on the opening of the passage for the preceding air. This improves the sealing function of the flat surface, and thus improves the start-up characteristics.

BRIEF DESCRIPTION OF THE DRAWINGS

FIG. 25 are cross sections of the scavenger passages in the cylinders of the sixth and seventh preferred embodiments. (A) is taken along line A2-A2 in FIGS. 23 and 24; (B) is taken along line B2-B2.

DETAILED DESCRIPTION OF THE PREFERRED EMBODIMENTS

Figure 1:
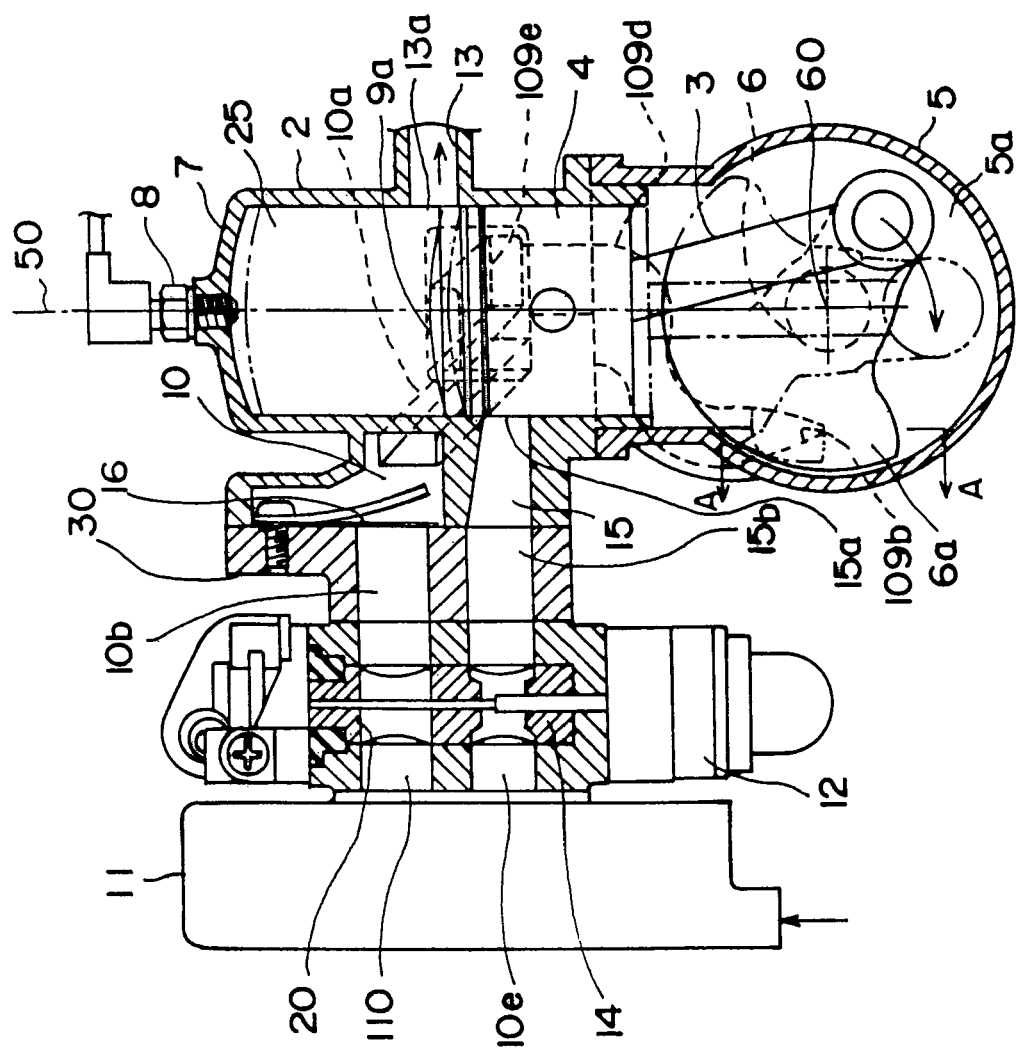
FIG. 1 is a cross section taken at a right angle to the crankshaft which indicates the center passage of the cylinder in an air-layer-type scavenging two-stroke engine which is the first preferred embodiment of this invention.

In this section we shall give a detailed explanation of a number of preferred embodiments of this invention with reference to the drawings. Whenever the shapes, relative positions and other aspects of the parts described in the embodiments are not clearly defined, the scope of the invention is not limited only to the parts shown, which are meant merely for the purpose of illustration.

FIGS. 1 through 5 show the first preferred embodiment of this invention. 2 is the cylinder, 4 the piston, 6 the crankshaft, 6a the crank web comprising the crankshaft 6, 5 the crankcase, 3 the connecting rod which connects piston 4 and crankshaft 6, 7 the cylinder head, 8 the spark plug, 11 the air cleaner and 12 the carburetor. 25 is the combustion chamber. 5a is the crank chamber formed inside crankcase 5. 15b and 15 are the passage for the fuel-air mixture which connects the carburetor 12 and crank chamber 5a. 13a is the exhaust port which opens into the side of cylinder 2. It is connected to exhaust pipe 13.

Figure 2:
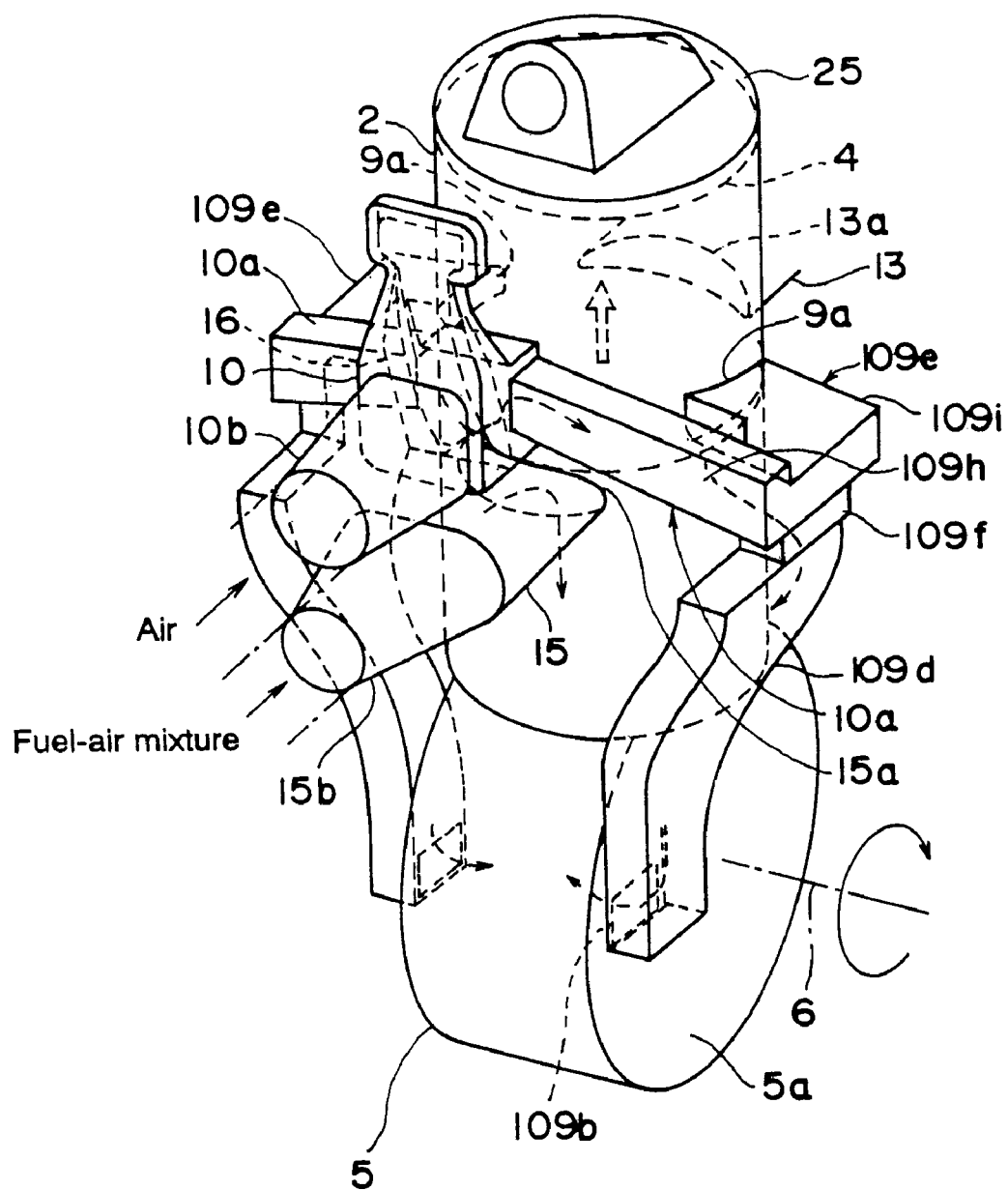
FIG. 2 is a perspective drawing showing the arrangement of the scavenging and air passages in the first preferred embodiment.

9a are two scavenging ports to the right and left of exhaust port 13a on cylinder 2, oriented at virtually a right angle to exhaust port 13a. As can be seen in FIG. 2, the scavenging ports 9a are connected to the crank chamber 5a via two branching scavenger passages 109e, which are mounted obliquely on cylinder 2; two scavenger passages 109f, which are at the point where the various scavenger passages meet; arc-shaped scavenger passages 109d, which are enclosed by walls on either side of crankcase 5; and outlets 109b.

Figure 4:
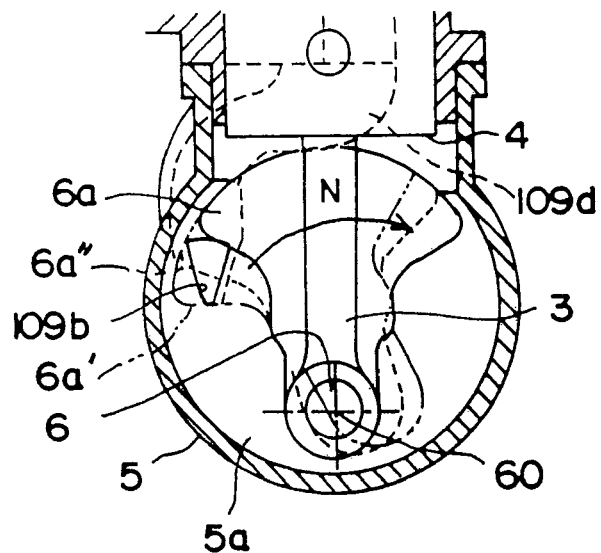
FIG. 4 shows the relationship between the crank web and the scavenger passage in the first preferred embodiment.
Figure 5:
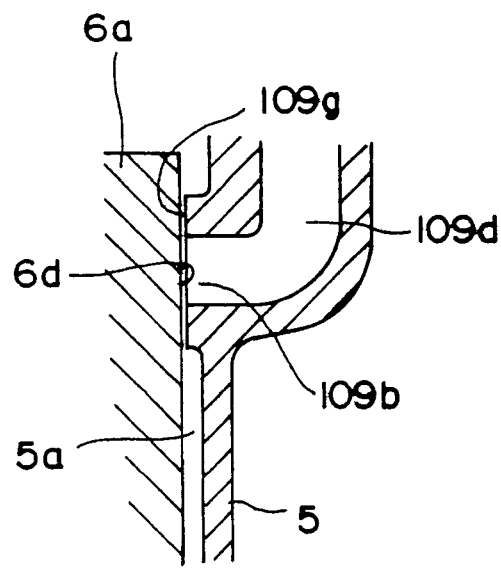
FIG. 5 is a cross section taken along passage A-A in FIG. 1.

As can be seen in FIG. 5, the end surfaces 109g of the outlets 109b and the end surfaces 6d of crank webs 6 approximate each other in the direction of crankshaft 60, leaving only a microscopic gap, so that the ends of the outlets can be opened and closed by the action of crank webs 6a of crankshaft 6. At a right angle to crankshaft 60, as can be seen in FIG. 4, the outlets 109b of the scavenger passages are progressively uncovered by crank webs 6a as crankshaft 6 rotates in direction N. The lower portions of outlets 109b 6a are tapered so that initially a small part of the openings is uncovered and then progressively a larger and larger portion of them.

10 is an air supply chamber in the side of cylinder 2. Its upstream side is connected to air passage 10b in insulator 30, which will be discussed shortly. Its downstream side is connected to the two branching air passages 10a. The branching air passages 10a, as is shown in FIG. 2, connect to scavenger passages 109f and branching scavenger passages 109e.

The air supply chamber 10 has non-return valves 16 on the outlets to branching air passages 10a on its right and left, which permit air to flow only toward branching air passages 10a.

Figure 3:
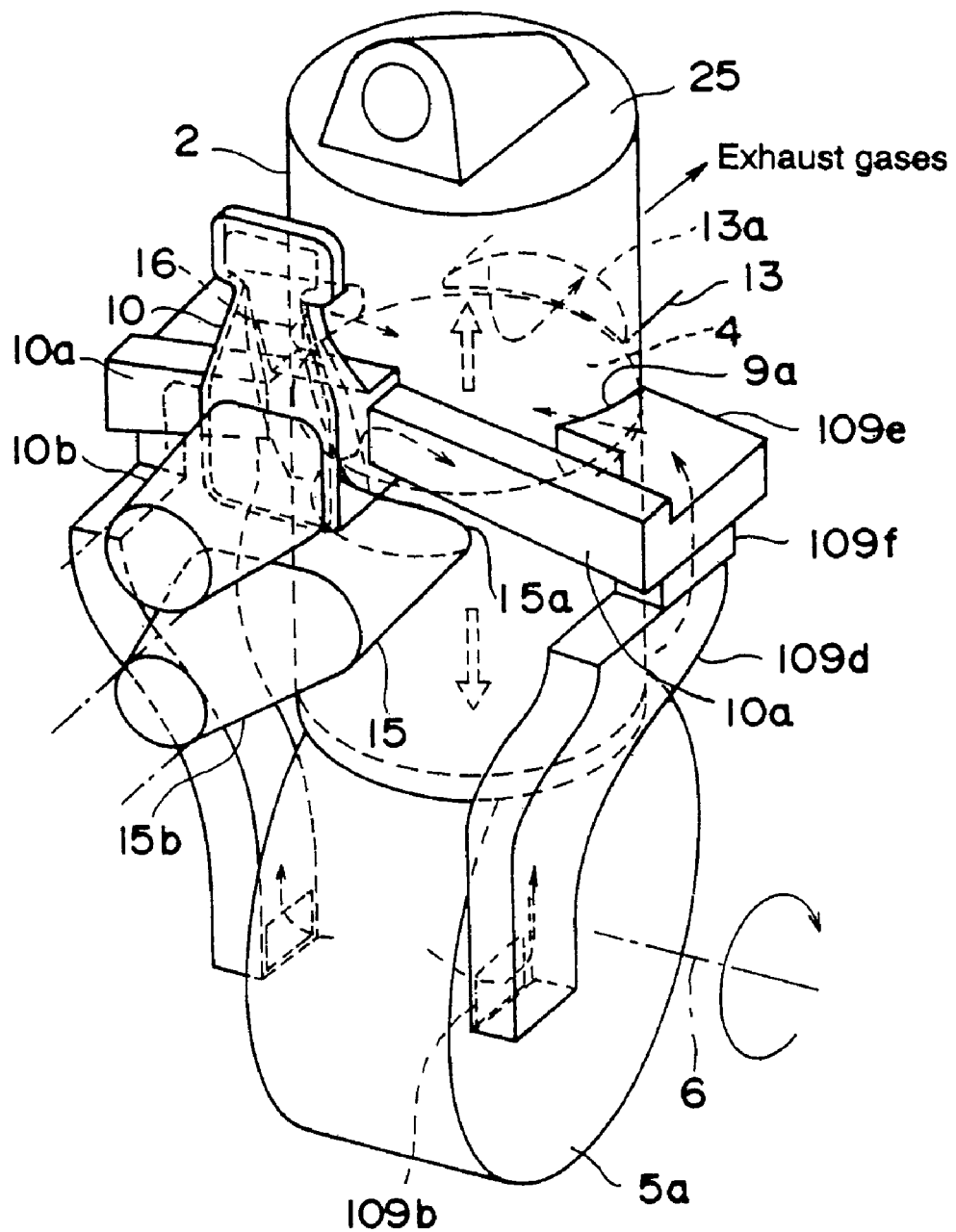
FIG. 3 corresponds to FIG. 2, and shows the operation of the engine which is the first preferred embodiment.

As can be seen in FIGS. 2 and 3, the branching air passages 10a and scavenger passages 109e are formed virtually symmetrically with respect to the axis 50 of the cylinder by walls 109h and 109i, which extend outward from the sides of the cylinder 2 and are integral to it. The walls 109h and 109i are parallel to each other. The single die which forms them can be removed by pulling it sideward away from the cylinder.

30 is an insulator to thermally isolate the engine body from the vacuum system. The insulator 30 is bolted to the side of cylinder 2. The air passage 10b is in the upper portion of the insulator 30, and fuel passage 15b is in its lower portion.

The upstream side of the fuel passage 15b is connected to control valve 14 on the carburetor, which controls the rate of flow of the fuel-air mixture. The downstream side is connected to the interior of the cylinder (combustion chamber 25) via fuel supply inlet 15a.

110 is an air passage which is integral to carburetor 12. It connects air cleaner 11 and insulator 30. Control valve 20 varies the size of the opening of the air passage 110. The control valve 20 is interlocked with mixture control valve 14 on carburetor 12.

When an air layer-type scavenging two-stroke engine configured in this way operates, the explosive force inside combustion chamber 25 pushes piston 4 downward and opens exhaust port 13a. The combustion gases (i.e., the exhaust gas) in the chamber 25 go out exhaust port 13a into exhaust pipe 13 and are released to the exterior through the muffler (not pictured).

When piston 4 goes down further, the scavenging ports 9a to its left and right open. The air which has accumulated in branching scavenger passage 109 flows into combustion chamber 25, as indicated by the arrow in FIG. 3, and pushes the combustion gases toward exhaust port 13a.

Next, the fuel-air mixture stored in crank chamber 5a flows into combustion chamber 25 via outlets 109b of the scavenger passages, scavenger passages 109d and branching scavenger passages 109e.

When piston 4 goes down, as can be seen in FIG. 3, and reaches bottom dead center, exhaust port 13a and scavenging ports 9a open, and the supply of air and fuel-air mixture to combustion chamber 25 is completed or attempts to be completed. When piston 4 rises from bottom dead center, it closes scavenging ports 9a, and the interior of crank chamber 5a becomes a closed space. As the space begins to expand, its pressure begins to drop.

When piston 4 rises further, exhaust port 13a closes, and the fuel-air mixture in combustion chamber 25 begins to be pressurized. As piston 4 rises, the volume inside crank chamber 5a increases, which further reduces the pressure in the crankcase. As can be seen in FIG. 2, when piston 4 rises further, fuel supply inlet 15a on the side of cylinder 2 opens, and the fuel-air mixture generated in carburetor 12 and controlled by valve 14 is supplied to crank chamber 5a through fuel passages 15b and 15, as indicated by the arrows in FIG. 2.

The drop in pressure inside the crank chamber 5a is communicated via outlets 109b, scavenger passages 109d and branching scavenger passages 109e to branching air passages 10a on the left and right. Non-return valve 16 opens, and the air supplied to air supply chamber 10 via valve 16 through a process we shall discuss shortly flows into crank chamber 5a.

The various pairs of passages which run from the scavenging ports 9a to crank chamber 5a, namely, branching scavenger passages 109e, and scavenger passages 109f and 109d, together form two long scavenger passages. The air supplied to the scavenger passages must fill their entire length before it is admitted into crank chamber 5a.

When piston 4 reaches the vicinity of top dead center, spark plug 8 discharges a spark in combustion chamber 25. This ignites the pressurized fuel-air mixture and combustion occurs. The pressure generated by this combustion pushes piston 4 down, which generates rotary torque in crankshaft 6.

When piston 4 goes down and exhaust port 13a opens, the combustion gases in combustion chamber 25 flow through exhaust port 13a into exhaust pipe 13. They are exhausted to the exterior through the muffler (not pictured).

When piston 4 begins to drop, the gases in crank chamber 5a are pressurized by its reverse side. When piston 4 drops further, the outlets of scavenging ports 9a on either side of it open. The fuel-air mixture supplied to crank chamber 5a as described above is sucked into combustion chamber 25 from scavenging ports 9a via outlets 109b, scavenger passages 109d and 109f, and branching scavenger passages s109e. The combustion gases (i.e., the exhaust gas) in the combustion chamber 25 is pushed out through exhaust port 13a in the scavenging operation.

When the chamber is to be scavenged, the non-return valve 16 described above is opened, and an appropriate quantity of air is allowed to fill scavenger passages 109d and 109f and branching scavenger passages 109e. Thus at the completion of a specified time interval from the beginning of scavenging, everything between scavenging ports 9a and combustion chamber 25 will have been scavenged by air. Only then is the fuel-air mixture in crank chamber 5a forced into combustion chamber 25 from scavenging ports 9a via scavenger passages 109d and branching passages 109e.

When the process is executed repeatedly, the engine operates and power is generated.

As is shown in FIGS. 1 through 3, in this sort of preceding air layer-type scavenging two-stroke engine, scavenger passages 109d in crankcase 5 are symmetrical with respect to the axis 50 of the cylinder on either side of the crankcase, and scavenger passage outlets 109b open into crank chamber 5a symmetrically with respect to axis 50 of the cylinder.

And as can be seen in FIG. 5, crank webs 6a form disk valves over outlets 109b into crankcase 5, with a small gap between the ends 109g of the outlets 109b and the ends 6d of crank webs 6a.

FIG. 4 shows how an outlet 109b is progressively uncovered when a crank web 6a rotates in crank chamber 5a. The position of the outlets 109b varies along the direction of rotation N of crankshaft 6. The timing at which the scavenging air is forced through scavenging ports 9a also varies. As can be seen in FIG. 4, the openings of outlets 109b are tapered so that their size progressively increases as crank webs 6a rotate. By controlling the velocity of the scavenging air entering via scavenging ports 9a, we can further reduce the quantity of fuel-air mixture which gets caught in the exhaust gas stream.

In the preceding air layer-type scavenging two-stroke engine which is the first preferred embodiment of this invention, branching air passages 10a on cylinder 2 and branching scavenger passages 109e to scavenging ports 9a on cylinder 2 are surrounded by parallel walls 109h and 109i, as can be seen in FIG. 2. The sliding die used to cast the cylinder can thus be a single piece. The configuration of the die is simpler, and this reduces its cost.

Figure 6:
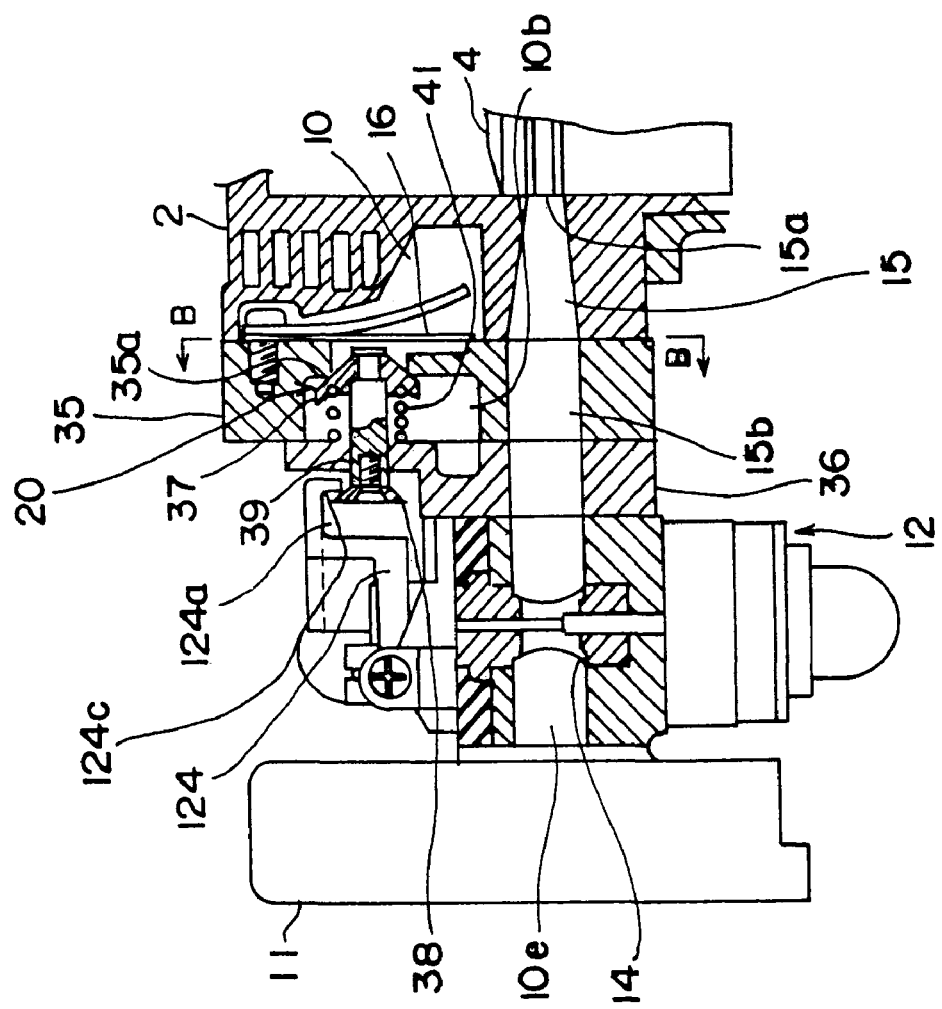
FIG. 6 is a cross section of the air control valve and its surrounding area in the second preferred embodiment of this invention.
Figure 7:
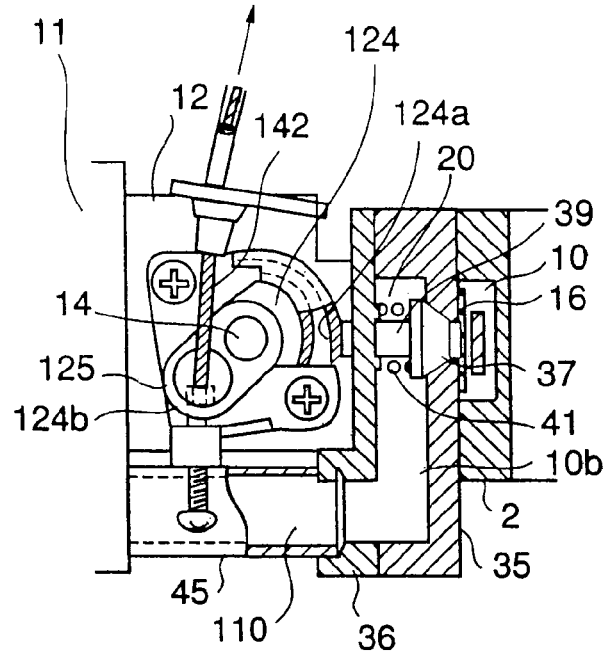
FIG. 7 is a horizontal cross section of the air control valve in the second preferred embodiment of this invention.
Figure 8:
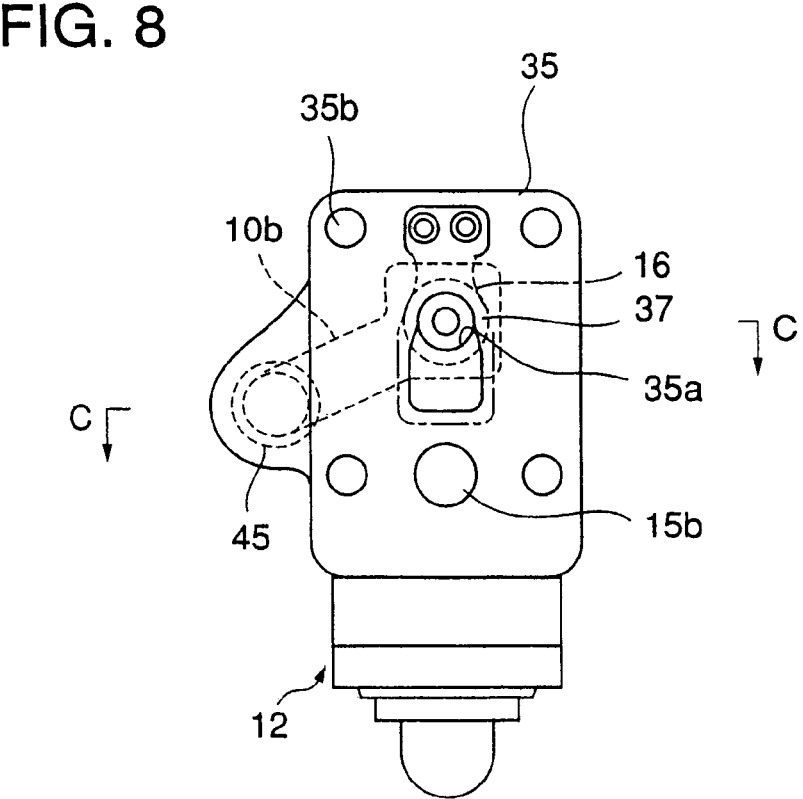
FIG. 8 is the view of the air control valve seen from line B-B in FIG. 6.

FIGS. 6 through 8 show the second preferred embodiment of a preceding air layer-type scavenging two-stroke engine according to this invention. In this embodiment, the air control valve 20 of the two-stroke engine of the first embodiment is replaced by a modified valve 20 which has the following improvements.

In FIGS. 6 through 8, 11 is the air cleaner, 12 the carburetor, 10e the air passage in carburetor 12, and 14 the fuel mixture control valve of carburetor 12. 15 and 15b are the fuel mixture passages, and 15a is the supply inlet for the fuel mixture on cylinder 2.

20 is the air control valve. 45 is an air pipe connecting the air passage 10e of the air cleaner 11 to a separate outlet. 35 is the air supply pipe in the insulator attached to the cylinder 2. 36 is a joint pipe for intake air. It is attached to air supply pipe 35 in the insulator and connected to the outlet of the air passage 110.

As is shown in FIG. 7, the scavenging air, which is conducted through a different outlet on the air cleaner 11 than is the air passage 10e, flows through air passage 110 in air pipe 45. It goes through air passage 10b, which is surrounded by the joint pipe 36 for air intake and air supply pipe 35 of the insulator. It passes from air valve 37 of control valve 20, which will be discussed shortly, and valve seat 35a. It flows through air supply chamber 10 in cylinder 2 by way of non-return valve 16, and is sent to branching air passage 10a, as shown in FIG. 1.

20 is an air control valve. The valve 20 is umbrella-shaped and is installed on joint pipe 36 for air intake. Air valve 37, which is attached to the end of the valve stem 39 in such a way that it can move along the stem, engages in valve seat 35a in such a way that it can freely be attached or removed. Cam follower 38 is on the end of the valve stem 39 which juts out from joint pipe 36. Compressive spring 41 exerts force in the direction which is downstream in terms of the air flow through the air valve 37, that is, it exerts pressure on air valve 37 against valve seat 35a.

Portion 124c is bent downward on the end of control lever 124, which is attached to the rotary shaft of fuel mixture control valve 14 of the carburetor 12. Cam 124a, which has a fan-shaped cross section, is formed on the bent portion 124c. The internal cam 124a engages with cam follower 38, which is on the other end of the air valve 37, to open and close that valve. The internal cam 124a engages with the cam follower 83 so as to open air valve 37 in the direction opposite the flow of air, through the cam follower 38, against the force of compressive spring 41.

As is well known, the control lever 124 adjusts the opening of mixture control valve 14; i.e., it adjusts the rate of flow of the fuel-air mixture. Swivel 125 is mounted so that it can rotate on operating end 124b of the side of the control lever 124 which is opposite the internal cam 124a. Control lever 124 is operated by control cord 142, which is connected from the exterior to the swivel 125.

In the second preferred embodiment, the pressure in crank chamber 5a drops when piston 4 rises. When a negative pressure is achieved, it is communicated from crank chamber 5a to air supply chamber 10 via scavenger passages 109b, 109d and 109f and branching air passages 10a. When the air supply chamber 10 goes to negative pressure, non-return valve 16 opens.

When the control lever 124 is operated, internal cam 124a rotates and cam follower 38 of air control valve 20 is pulled leftward in FIGS. 6 and 7 against the spring force of compressive spring 41. This opens air valve 37. Scavenging air from air cleaner 11 flows into air supply chamber 10 through air pipe 45, air passages 110 and 10a, air valve 37 and non-return valve 16.

From the air supply chamber 10, just as in the first embodiment, the scavenging air flows into crank chamber 5a by way of branching air passages 10a, scavenger passages 109f and 109d and scavenger passage outlets 109b as indicated by arrows in FIGS. 2 and 3. It accumulates in the passages and the crank chamber 5a, and scavenges them in the same process as in the first embodiment.

Generally, in two-stroke engines, mixture control valve 14 will be adjusted under a partial load to control the rate of flow of the fuel-air mixture supplied to combustion chamber 25 through crank chamber 5a. In this way a nearly constant concentration of fuel-air mixture can be maintained over a wide range of operation.

In the air layer-type scavenging two-stroke engine related to this invention, as has been discussed above, in the scavenging process air is supplied to combustion chamber 25 through air supply chamber 10 instead of fuel-air mixture. If the concentration of the fuel-air mixture has a given concentration, and a quantity of air proportional to the quantity of fuel-air mixture is supplied to combustion chamber 25, the overall richness of the mixture can be kept constant.

In the second preferred embodiment of this invention, mixture control valve 14, which controls the flow rate of the fuel-air mixture, and air control valve 20, which controls the flow rate of the scavenging air sent into combustion chamber 25 through air supply chamber 10, are interlocked through internal cam 124a of lever 124, which adjusts mixture control valve 14, and cam follower 38. By selecting the profile of internal cam 124a, we can attain an appropriate ratio for the degree of openness of mixture control valve 14 and air control valve 20 (i.e., an appropriate ratio of the flow rate of the fuel-air mixture to that of the scavenging air).

Figure 9:
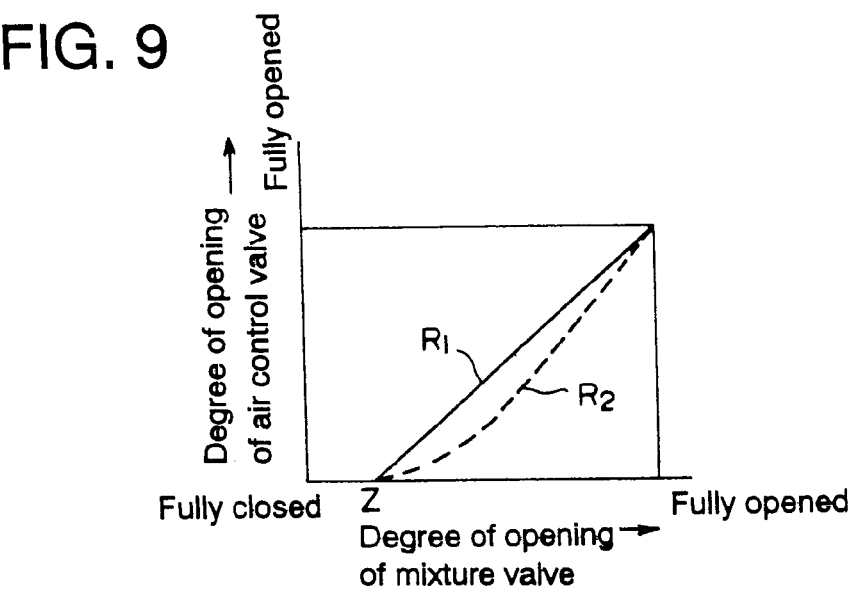
FIG. 9 is a graph showing an example of the relationship between the throttle valve and the air control valve.

The graph shown in FIG. 9 is an example of an appropriate relationship between the degree of opening of mixture control valve 14 and air control valve 20. In this figure, R1, which is shown by a solid line, is an example in which combustion is stabilized under light load conditions, including idling, which occur until valve 14 reaches its fixed Z point of opening, by supplying a relatively rich mixture. In this region, i.e., the region in which valve 14 has not yet reached its Z point, air control valve 20 is completely closed. Beyond the Z point, the degree of openness of valves 14 and 20 are set proportionally to each other. R2, which is shown by a broken line, is an example in which air control valve 20 is less open than in R1 while mixture control valve 14 is only partly open.

In the second preferred embodiment, mixture control valve 14, which controls the flow rate of the fuel-air mixture, and air control valve 20 are interlocked through internal cam 124a, which is connected to the control lever 124, and cam follower 38. Thus the opening ratio of the mixture control valve 14 and air control valve 20 can easily be set in response to a change in the angular position of mixture control valve 14. In other words, as can be seen in FIG. 9, while the engine is under a light load, as when idling, until it reaches the Z point, air control valve 20 is completely closed. Fuel-air mixture whose flow rate is controlled by mixture control valve 14 is sent into combustion chamber 25 to fill the chamber both for scavenging and combustion.

Once the opening of mixture control valve 14 reaches the Z point in FIG. 9, internal cam 124a of control lever 124 draws air valve 37 out to open it, and air control valve 20 moves into the open position.

When the load on the engine increases and mixture control valve 14 opens further, air control valve 20 operates with the rotation of internal cam 124a of control lever 124, which follows the rotation of valve 14, and opens proportionally to the valve 14. The flow rate of air increases, and the engine is run with the weak mixture that a heavy load demands.

Other aspects of the configuration are identical to corresponding aspects of the first preferred embodiment, pictured in FIGS. 1 through 5. The same parts have been numbered in the same way as in these figures.

Figure 10:
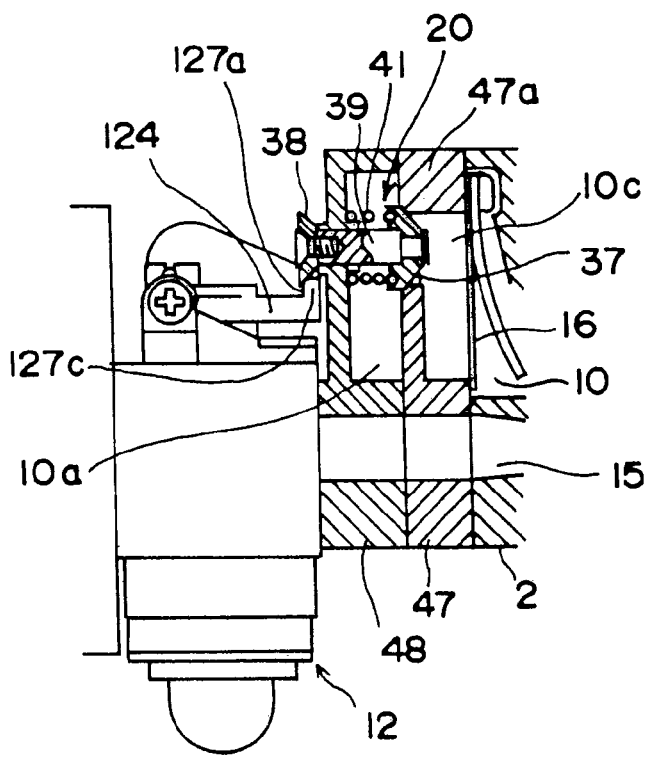
FIG. 10 corresponds to FIG. 6 and shows the third preferred embodiment of this invention.
Figure 11:
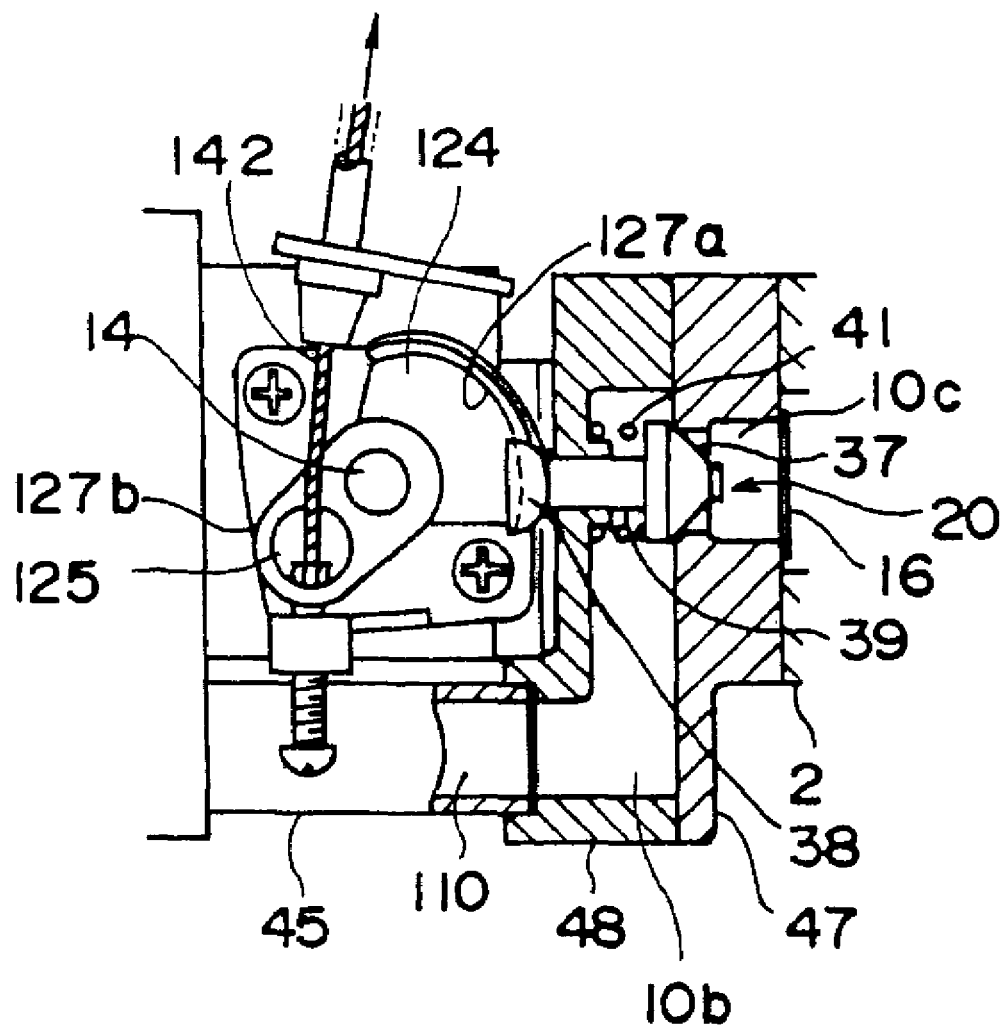
FIG. 11 is a cross section which corresponds to FIG. 7 and shows the third preferred embodiment of this invention.
Figure 12:
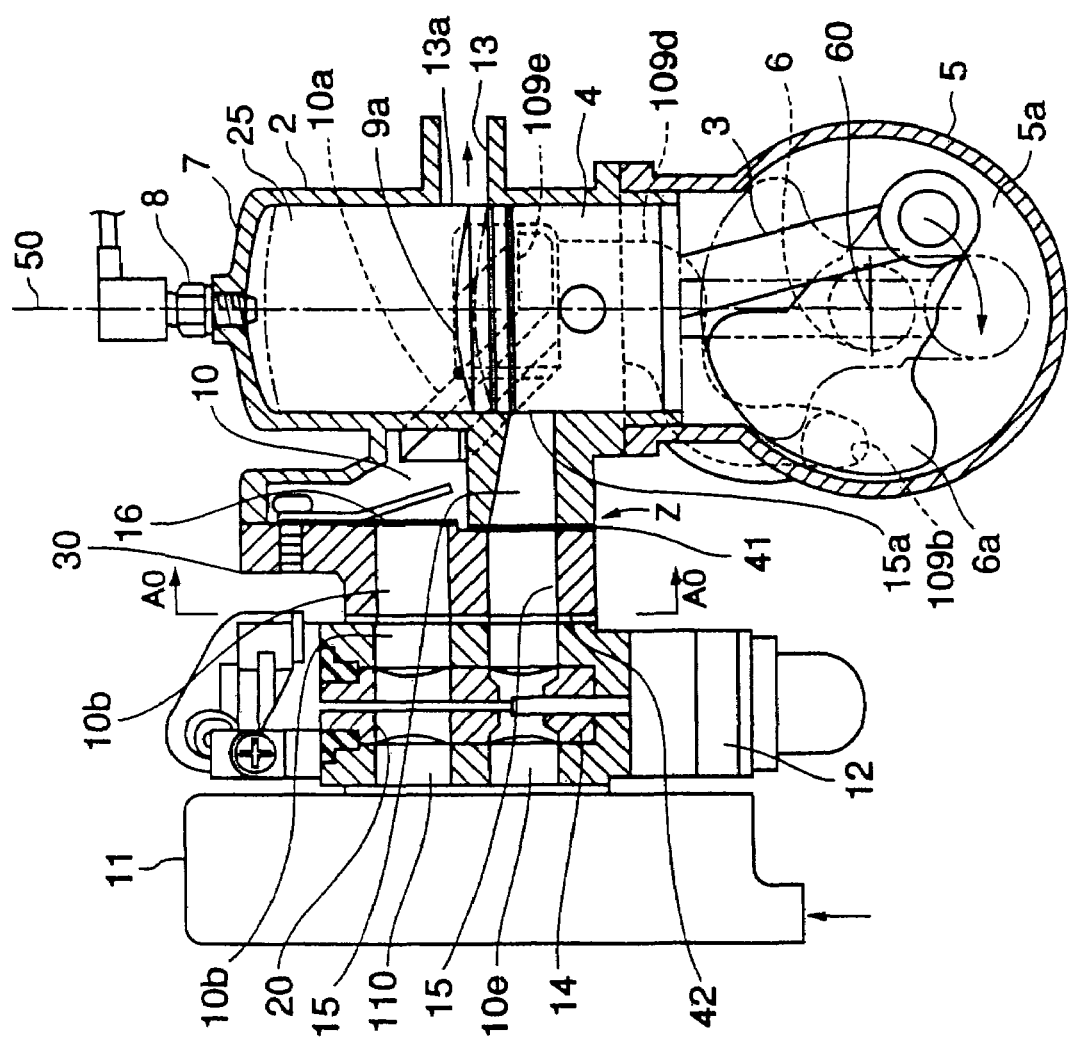
FIG. 12 eighth preferred embodiment of this invention.
Figure 13:
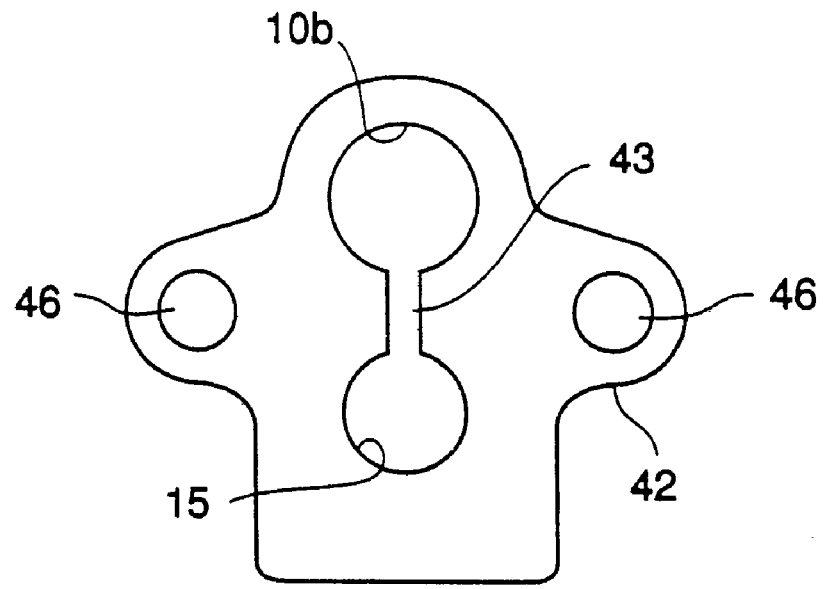
FIG. 13 is a frontal view of the carburetor gasket in the fourth preferred embodiment of this invention.

FIGS. 10 and 11 show an air layer-type scavenging two-stroke engine which is the third preferred embodiment of this invention. This embodiment concerns the valve which controls the quantity of scavenging air and its operating mechanism, as in the second embodiment. It differs from the second embodiment in that the internal cam on control lever 124 is formed at a given height on the inner edge of the fan-shaped periphery of the control lever.

In FIGS. 10 and 11, the scavenging air conducted out of air cleaner 11 through a different outlet than the one to air passage 10e passes through air passage 10b, which is surrounded by joint pipe 48 and intake pipe 47 in the insulator. It flows through the opening of air valve 37 and valve seat 47a in air control valve 20. It goes through non-return valve 16 and air supply chamber 10 in cylinder 2 and is sent to branching air passage 109 (See FIG. 1).

Control lever 124 is fixed to the rotary stem of mixture control valve 14 on the carburetor 12. On the end of control lever 124, in contrast to the configuration of the second embodiment, is portion 127c, which is bent upward. This forms internal cam 127a, whose horizontal cross section is fan-shaped. The internal cam 127 is interlocked with cam follower 38 of air valve 37 so that it opens and closes that air valve. The internal cam 127a is installed so that it opens air valve 37 through the action of cam follower 38 in the direction opposite the air flow, i.e., in the direction in which it exerts pressure on compressive spring 41.

Other aspects of the configuration and operation of this engine are identical to corresponding aspects of the second embodiment, and have been given the same numbers.

FIGS. 12 through 18 show the fourth preferred embodiment of this invention. In this embodiment, the respective supply systems for the preceding air and the fuel mixture have been improved. The basic configuration of this engine is identical to that of the first through third embodiments. Corresponding parts have been given the same numbers.

In FIGS. 12 through 18, 41 is an insulator gasket, which is placed between the surfaces where the insulator 30 and cylinder 2 are mounted to each other; 43 is a carburetor gasket, which is placed between the surfaces where the insulator 30 and carburetor 12 are mounted to each other.

Figure 14:
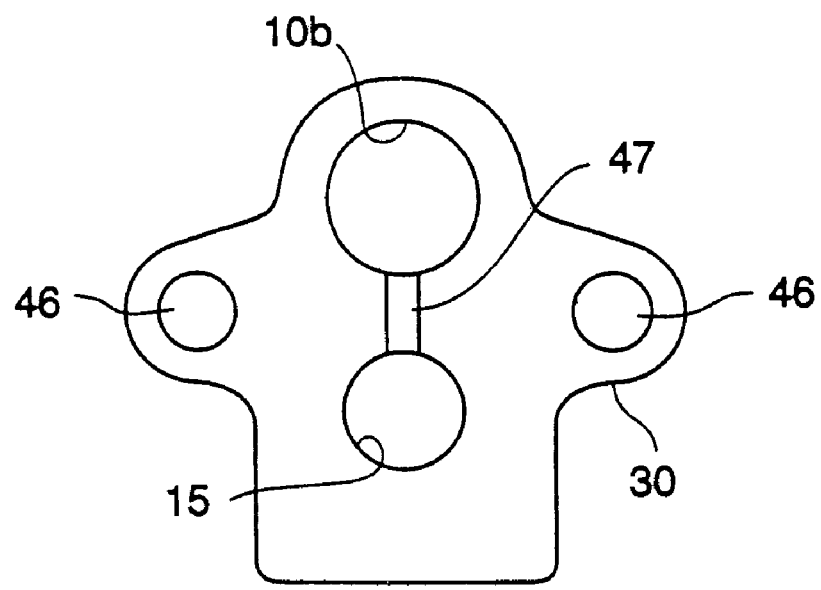
FIG. 14 is a view of the end of the carburetor gasket on the insulator (from line A0-A0 in FIG. 12) in the fourth preferred embodiment of this invention.

The carburetor gasket 42, which is shown in FIG. 14, has two parallel passages running through it, air passage 10b in its upper portion and fuel-mixture passage 15 in its lower portion, in the same positions as in the insulator 30. Connecting passage 43 is a slit which connects the air passage 10b and fuel-mixture passage 15. 46 are bolt holes.

Figure 16:
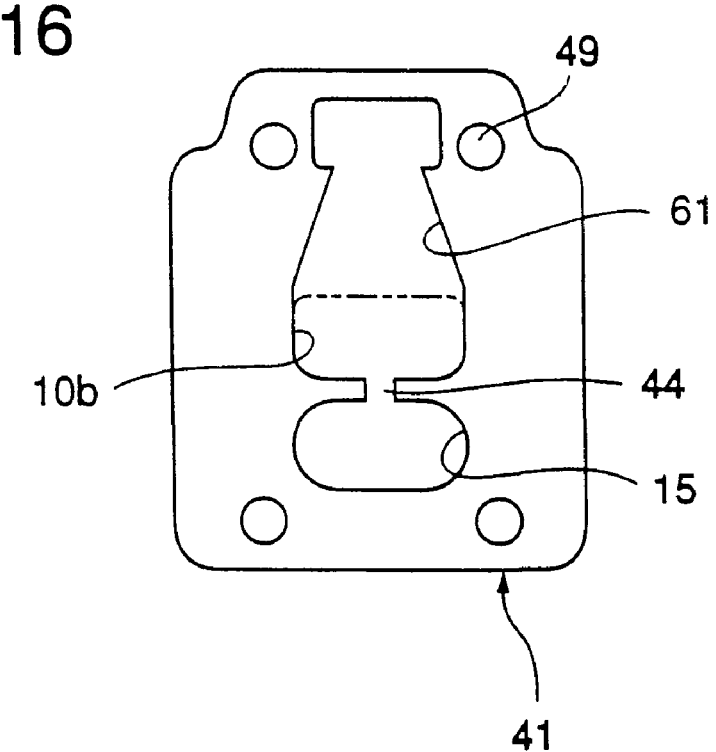
FIG. 16 is a plan view of the insulator gasket in the fourth preferred embodiment of this invention.

The insulator gasket 41, which is shown in FIG. 16, has the same two parallel passages running through it, air passage 10b in its upper portion and fuel-mixture passage 15 in its lower portion, at the same pitch as in the insulator 30. Connecting passage 44 is a slit which runs between and connects the air passage 10b and fuel-mixture passage 15. 61 is a space for the non-return valve 16; 49 are bolt holes.

Figure 15:
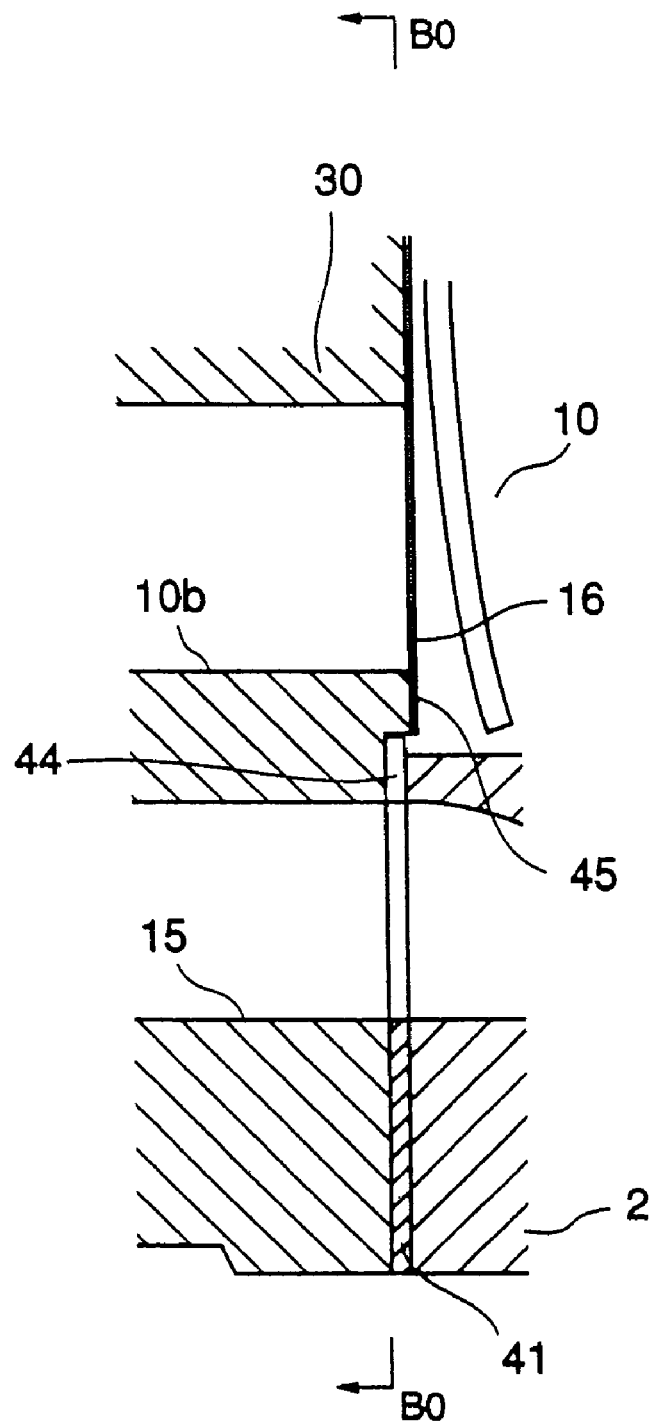
FIG. 15 is a magnified cross section of the area where the insulator and cylinder are connected (an enlargement of portion Z in FIG. 12) in the fourth preferred embodiment of this invention.

Connecting passage 44 in the insulator gasket 41, as can be seen in FIG. 15, connects fuel-mixture passage 15 and air supply chamber 10 in a location which is downstream from flat surface 45 of the non-return valve 16. Its diameter, that is, the diameter of its passage, is smaller than that of connecting passage 43 in carburetor gasket 42. Creating the connecting passage 44 minimizes any drops in output.

Figure 17:
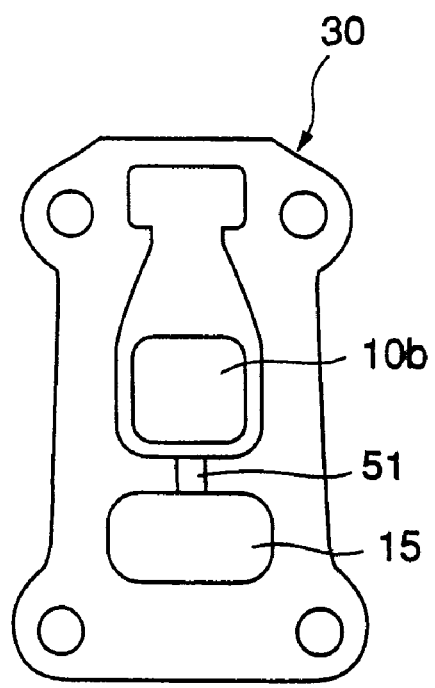
FIG. 17 is a view of the end of the insulator gasket on the insulator (from line B0-B0 in FIG. 15) in the fourth preferred embodiment of this invention.

Instead of providing connecting passages 44 and 43 in the insulator gasket 41 and carburetor gasket 42, a connecting passage 47 can be cut into the surface of insulator 30 which comes in contact with carburetor gasket 42, as shown in FIG. 14; or a connecting passage 51 can be cut into the surface of the insulator 30 which comes in contact with insulator gasket 41, as shown in FIG. 17.

The connecting passages may also be cut into the surface of cylinder 2 where it is attached to the insulator 30, or into the surface of carburetor 12 where it is attached to the insulator 30.

When a preceding air layer-type scavenging two-stroke engine configured in this way operates, the combustion pressure in combustion chamber 25 forces piston 4 downward and exhaust port 13a opens. The combustion gases (i.e., the exhaust gas) in the combustion chamber 25 exit through exhaust port 13a into exhaust pipe 13. They pass through the muffler (not pictured) and are released into the atmosphere.

As piston 4 goes further down, scavenging ports 9a to its left and right open, and the air stored in scavenging ports 109e and elsewhere flows into combustion chamber 25, pushing the combustion gases toward exhaust port 13a.

Next, the fuel-air mixture stored in crank chamber 5a flows into combustion chamber 25 through scavenging ports 9a by way of scavenger passage outlets 109b and scavenger passages 109d and 109e.

When piston 4 is at bottom dead center, exhaust port 13a and scavenging ports 9a open. The supplying of air and fuel-air mixture to combustion chamber 25 is now complete or on the verge of completion. When piston 4 rises from bottom dead center, it causes scavenging port 9a to close, creating a closed space in crank chamber 5a. The expansion process, that is to say, the depressurization, now begins.

As piston 4 rises further, exhaust port 13a closes and the mixture of fuel and gas in combustion chamber 25 begins to be pressurized. When piston 4 goes up, the volume of crank chamber 5a increases, causing the pressure in the crankcase to decrease. When piston 4 rises still further, air intake port 15a on the side of cylinder 2 opens. The fuel-air mixture generated in carburetor 12, whose rate of flow is controlled by valve 14, is supplied via fuel passage 15 to crank chamber 5a.

The pressure inside the crank chamber 5a drops, and the lower pressure is communicated via outlets 109 band scavenger passages 109d and 109e to branching air passages 10a on the left and right. Reed-type non-return valve 16 opens, and the air supplied to air supply chamber 10 via the valve 16 flows into crank chamber 5a.

The various pairs of passages which run from the scavenging ports 9a to crank chamber 5a, namely, branching scavenger passages 109e and scavenger passages 109d, together form two long scavenger passages. The air supplied to the scavenger passages must fill their entire length before it is admitted into crank chamber 5a.

When piston 4 reaches the vicinity of top dead center, spark plug 8 discharges a spark in combustion chamber 25. This ignites the pressurized fuel-air mixture and combustion occurs. The pressure generated by this combustion pushes piston 4 down, which generates rotary torque in crankshaft 6.

When piston 4 goes down and exhaust port 13a opens, the combustion gases in combustion chamber 25 flow through exhaust port 13a into exhaust pipe 13. They are exhausted to the exterior through the muffler (not pictured).

When piston 4 begins to drop, the gases in crank chamber 5a are pressurized by its reverse side. When piston 4 drops further, the outlets of scavenging ports 9a on either side of it open. The fuel-air mixture supplied to crank chamber 5a as described above is sucked into combustion chamber 25 from scavenging ports 9a via outlets 109b and scavenger passages 109d and 109e. The combustion gases (i.e., the exhaust gas) in the combustion chamber 25 are pushed out through exhaust port 13a and the scavenging operation commences.

When the engine is idling, the negative pressure in scavenger passages 10b, air supply chamber 10 and branching air passages 10a becomes greater than in fuel passage 15.

In the fourth embodiment, the air passage 10b and fuel-mixture passage 15 are connected either by small-diameter connecting passages 43 and 44 in insulator gasket 41 and carburetor gasket 42 or by slits 47 and 51, which are cut into insulator 30. When the engine is idling, then, the fuel-air mixture in fuel passage 15 goes through either small-diameter connecting passages 43 and 44 or slits 47 and 51 into air passage 10b and air supply chamber 10.

Thus when there is too much air in air passage 10b during sudden acceleration, fuel-air mixture can be added to the air flowing through air passage 10b. This prevents the new air being supplied to combustion chamber 25 via scavenging port 9a from causing there to be excess air in the chamber. It thus also prevents the fuel concentration from becoming too thin during sudden acceleration and so improves the engine's acceleration characteristics.

When the engine is running at a high speed, the throttle is opened more, and the pressure differential among fuel passage 15, air passage 10b and air supply chamber 10 is virtually eliminated. Thus virtually no air flows from fuel passage 15 through the small-diameter connecting passages 43 and 44 or 47 and 51 into either air passage 10b or air supply chamber 10. This design, then, prevents fuel-air mixture from contaminating the scavenging air, which insures that the required exhaust specifications can be maintained.

When the engine is mounted obliquely, the fuel-air mixture in fuel passage 15 will flow downstream from the non-return valve 16. It will thus flow through the connecting passages on the side of combustion chamber 25, namely passages 44 or 51 in insulator gasket 41 of insulator 30, and into air supply chamber 10. This prevents fuel from collecting downstream from fuel passage 15 and being sucked into the cylinder suddenly when the position of the engine changes, so it eliminates imperfect combustion due to an excess of fuel.

To prevent defective operation when the engine is mounted obliquely, as described above, the following must be considered. If the connecting passage 44 or 51 is provided between air supply chamber 10 and fuel passage 15, which are downstream from the non-return valve 16, it is connected to scavenger passage 109e, which is downstream from the valve 16. Thus if the diameter of the connecting passage is increased, the output of the engine will drop; however, if the connecting passage 43 or 47 is located in carburetor gasket 42 or insulator gasket 41, which are upstream from the non-return valve, the diameter of the connecting passage can be increased without producing a drop in engine output. This further improves the acceleration characteristics during sudden acceleration.

With the fourth embodiment, then, small-diameter connecting passages 43 and 44 are provided between fuel passage 15, air passage 10b and air supply chamber 10, so that negative pressure in the air passage 10b and air supply chamber 10 will cause the fuel-air mixture in the fuel passage 15 to flow into the air passage. This obviates the need for a complicated control device and allows us to achieve the effect described above through the use of a very simple device.

If one wishes to provide the connecting passage 43 or 44 in insulator gasket 41 or carburetor gasket 42, it will be possible to fashion a connecting passage merely by creating a slit of the same diameter as the connecting passage 43 or 44 in either the insulator gasket 41 or the carburetor gasket 42. Creating a connecting passage in this way is straightforward and does not require a large number of processes.

Figure 18:
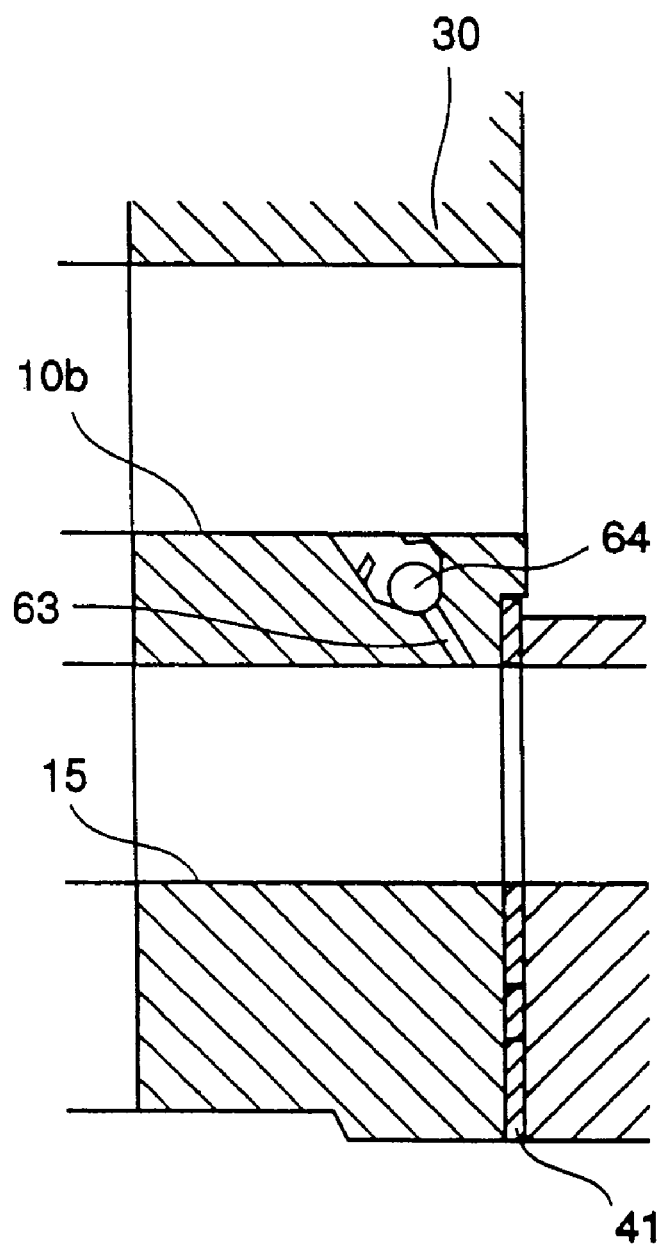
FIG. 18 is a view of the connecting passage in the fourth preferred embodiment of this invention which corresponds to FIG. 15.
Figure 19:
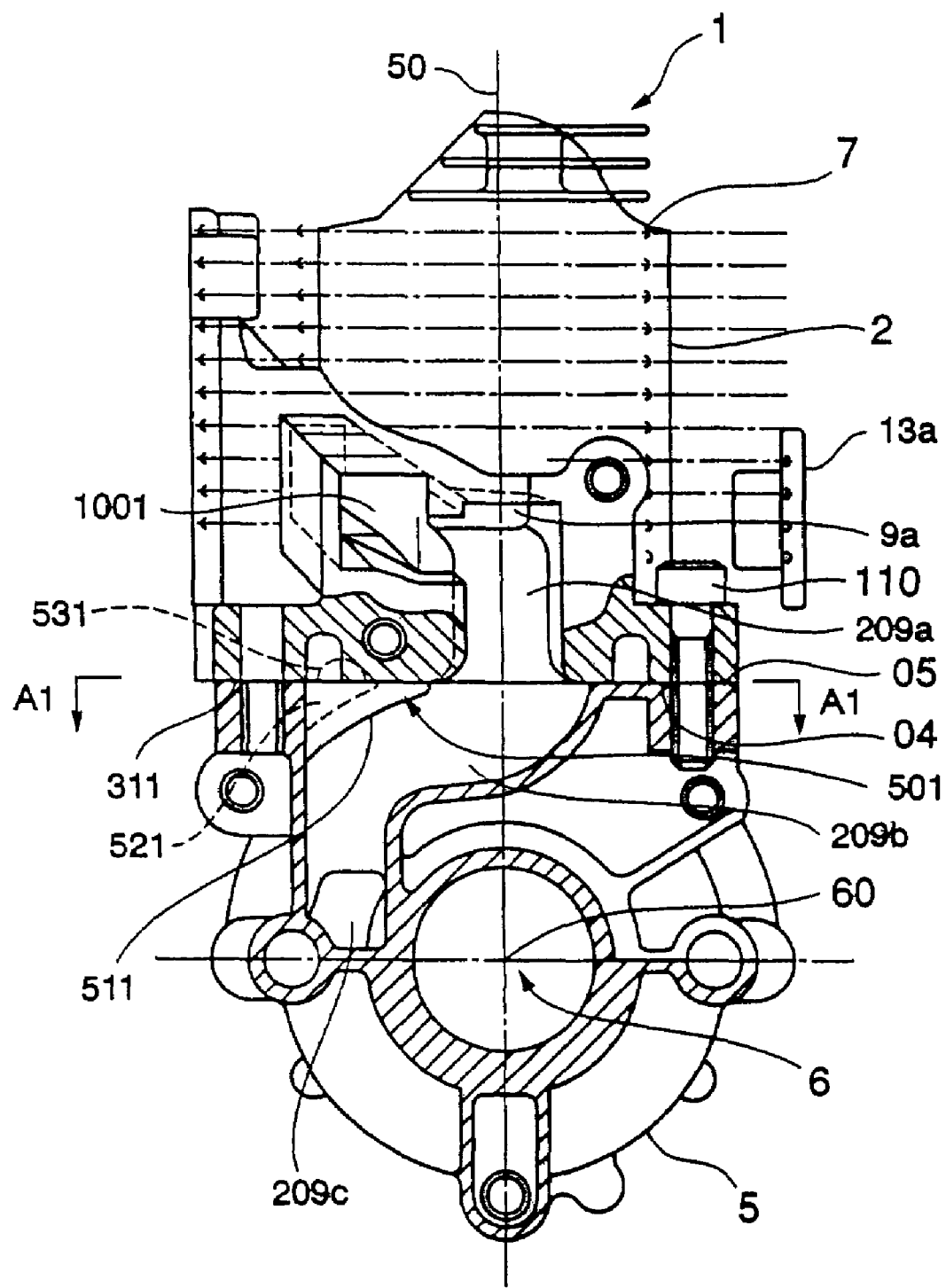
FIG. 19 is a cross section taken at a right angle to the crankshaft and showing the scavenger passage in a two-stroke engine which is the fifth preferred embodiment of this invention.

In FIG. 18, which shows another embodiment of the connecting passage, 63 is a connecting passage consisting of a small hole which connects air passage 10b and fuel passage 15 in insulator 30. 64 is the non-return valve on the connecting passage 63 which permits flow from the fuel passage only in the direction toward air passage 10b.

The non-return valve 64 may be eliminated, if desired, and connecting passage 63 may consist only of the small hole. Alternatively, a connecting passage 63 and non-return valve 64 as described above may be provided in carburetor 12 or cylinder 2 instead of in the insulator 30.

In FIGS. 19 through 22, which show the fifth preferred embodiment of this invention, 1 is the engine, 2 is the cylinder of the engine and 5 is the crankcase. The cylinder 2 and crankcase 5 are fastened together at surfaces 04 and 05 by a number of bolts 110, with gasket 311 placed between them. 13a is the exhaust port.

9a is the scavenging port, which opens into the side of the aforesaid cylinder 2. 209a is the scavenging passage in cylinder 2, which is connected to the aforesaid scavenging port 9a. 209c is the outlet of the scavenging passage which opens into crank chamber 5a in the aforesaid crankcase 5. 209b is the scavenging passage in the aforesaid crankcase 5. With the help of surface 511 of guide 501, which will be discussed shortly, it forms a smoothly curved passage inside the crankcase 5. Scavenging passage 209a in the aforesaid cylinder 2 and scavenging passage inlet 209c are connected at the aforesaid surfaces 04 and 05 where the passages in crankcase 5 and cylinder 2 meet.

1001 is the air passage for preceding air. It is connected partway along the length of the aforesaid scavenging passage 209a. Preceding air from the air cleaner (not pictured) is supplied to scavenging port 9a through the air passage and scavenging passage 209a.

Figure 39:
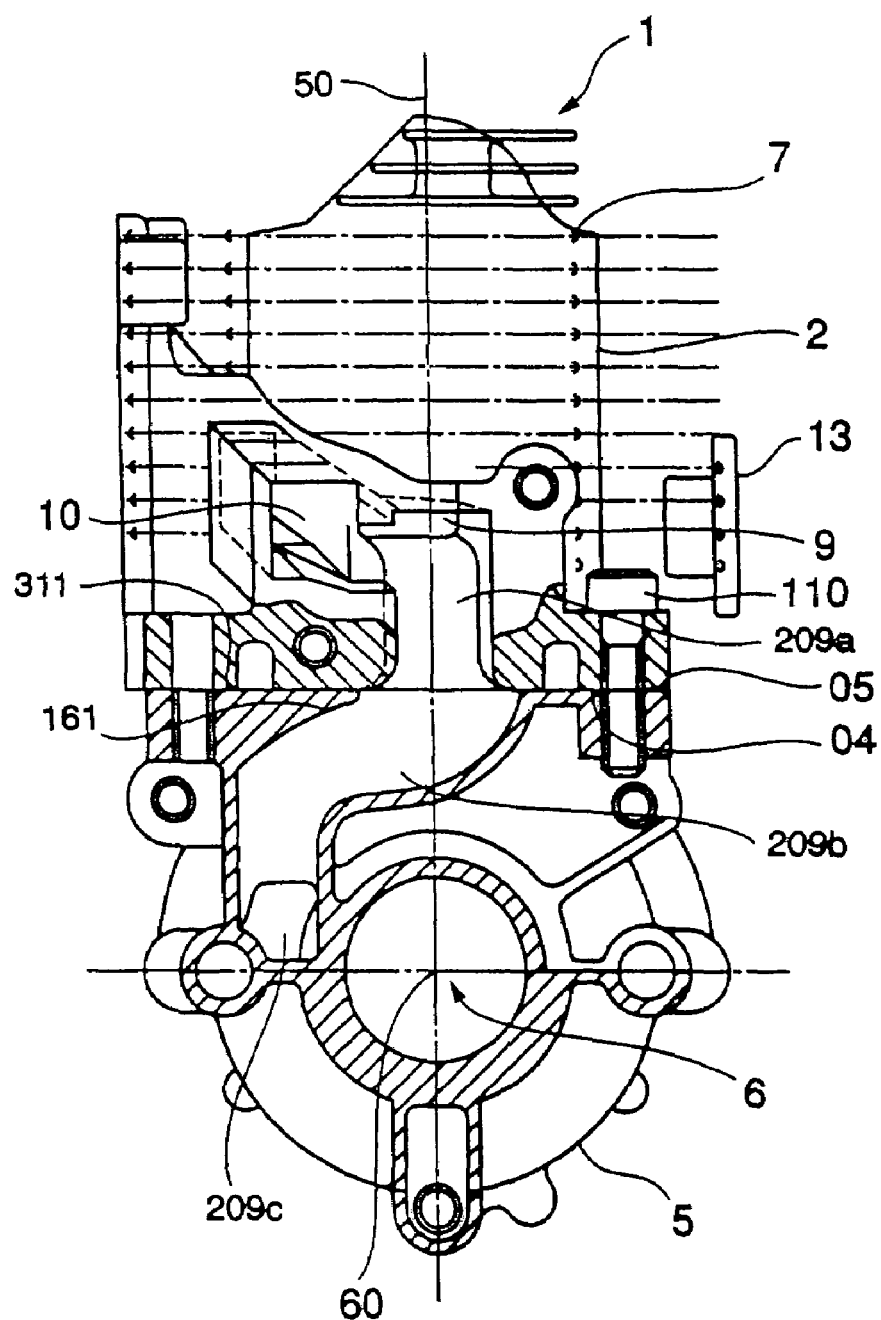
FIG. 39 is an example of the prior art which corresponds to FIG. 19.

With the exception of guide 501, the configuration just described is identical to the prior art design shown in FIG. 39.

501 is a guide. It is inserted into the aforesaid crankcase 5 from surface 04 to provide surface 511, which is smoothly connected to scavenging passage 209*b* in the crankcase.

Figure 20:
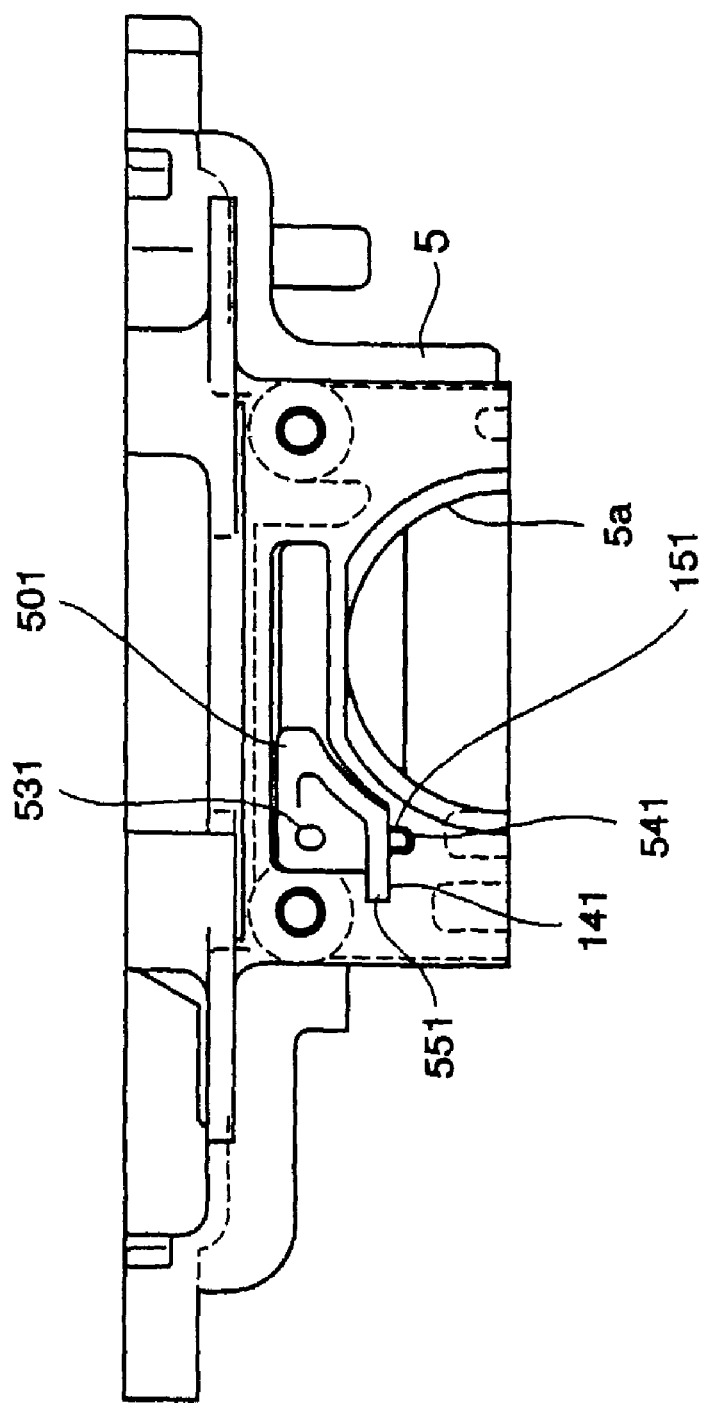
FIG. 20 is the view from line A1-A1 in FIG. 19.
Figure 21:
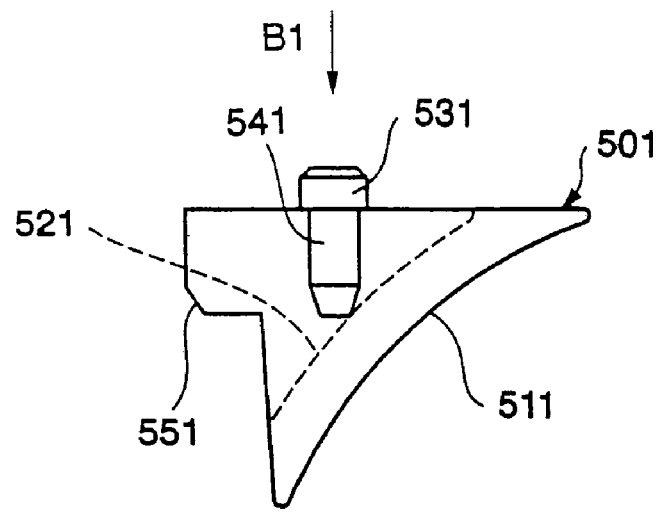
FIG. 21 is a frontal view of the guide in the fifth preferred embodiment.
Figure 22:
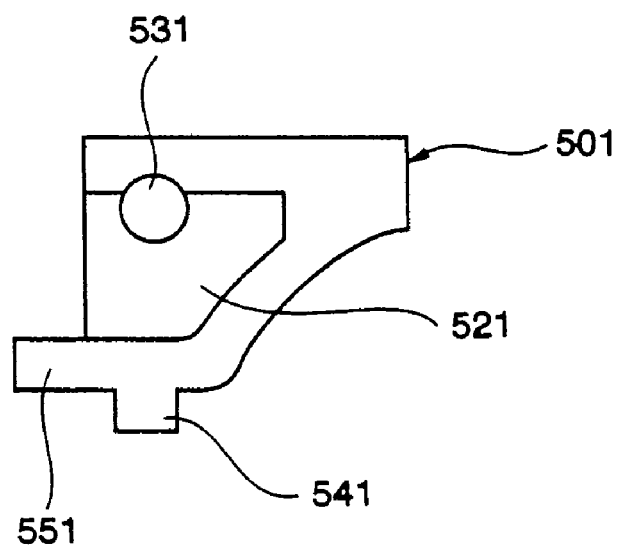
FIG. 22 is the view from arrow B1 in FIG. 19.

As can be seen in FIGS. 21 and 22, the guide 501 has a cylindrical protrusion 531 on its upper surface. Two teeth, 541 and 551, protrude on its sides. As can be seen in FIG. 20, when the teeth 541 and 551 on the guide 501 engage in depressions 151 and 141 in crankcase 5, the guide is fixed to the crankcase. If one set of teeth and depressions, for example tooth 541 and depression 151, is engaged more loosely than the other, in this case tooth 551 and depression 141, guide 501 can easily be installed.

Projection 531 on the guide 501 engages in the hole (not pictured) in the aforesaid gasket 311. Thus when gasket 311 is installed on top of guide 501, the correct placement of the gasket 311 can be checked by verifying the position of projection 531. Also, the fact that the guide 501 has been installed can be confirmed by looking at gasket 311, so there is no chance of forgetting to install the guide 501.

There is a depression 521 on the upper surface of the aforesaid guide 501. When fuel from the fuel-air mixture gets into the slight gap where gasket 311 separates the crankcase from the cylinder, the fuel will flow downward through the depression 521.

In a two-stroke engine with a scavenging passage configured in this way, the fuel-air mixture from crank chamber 5*a* in crankcase 5 is conducted into scavenging passage 209*b*, a portion of which consists of the smoothly curved surface 511 of guide 501. It flows through the smoothly curved scavenging passage 209*b* and is supplied to scavenging port 9*a*.

Because scavenging passage 209*b* is a smoothly curved channel without any right angles, the fuel-air mixture flows through it smoothly and rapidly without any flow loss such as a decrease in flow velocity as it is supplied to scavenging port 9*a*.

With the fifth preferred embodiment, the aforesaid guide 501 is installed in crankcase 5 in such a way that it can be attached or removed from surface 04 of cylinder 2 in the axial direction 50 of the cylinder. This obviates the need for the tooth 161 between the upper wall of scavenging passage 209*b* and the surface 04 to which the crankcase is attached, as was required in the prior art. The guide 501 performs the same function as the aforesaid tooth 161. Thus when crankcase 5 is cast, even if a single die is used to form scavenging passage 209*b* inside the crankcase 5, the die can easily be removed in the axial direction 50 of the cylinder. Because the scavenging passage can be formed using a single die, there is no possibility that one of several dies will slip out of position, as sometimes happened with prior art techniques, and ruin the casting.

Also, with the fifth preferred embodiment, if the fuel in the fuel-air mixture flowing through scavenging passages 209*a* and 209*b*, which are connected where they meet between surfaces 04 and 05 of crankcase 5 and cylinder 2, seeps into the gap between surfaces 04 and 05 where gasket 311 is inserted, the fuel will flow downward through the depression 521 formed in guide 501. Further, creating the aforesaid depression 521 reduces the surface area of the aforesaid gap, so less fuel will seep into the gap. Thus even if the engine is mounted obliquely, the fuel cannot return to scavenging passages 209*a* and 209*b*. This prevents the imperfect combustion which would result if fuel could flow back into scavenging passages 209*a* and 209*b*.

In addition to the aforesaid embodiments, the following two modifications are also included in the scope of this invention.

In the first modification, the aforesaid guide 501 consists of a flat piece which is formed integrally to gasket 311 from a resin. The piece corresponding to the guide is formed by molding a deep-drawing sheet. This surface 511, which connects smoothly with scavenging passage 209*b* in the aforesaid crankcase 5, and it also forms depression 521 on the reverse side of the surface.

With this modification, guide 501 and gasket 311 are one piece, and deep drawing allows channel surface 511 and depression 521 to be formed on the front and reverse sides of the sheet at the same time. This reduces the parts count and the number of assembly processes.

In the second modification, the aforesaid guide 501 is given a different color than the rest of the crankcase assembly. If the guide is a different color, its presence or absence will be all the more evident, so it will be impossible to forget to install it. By using a different color for each type of machine, we can simplify our parts control.

Figure 27:
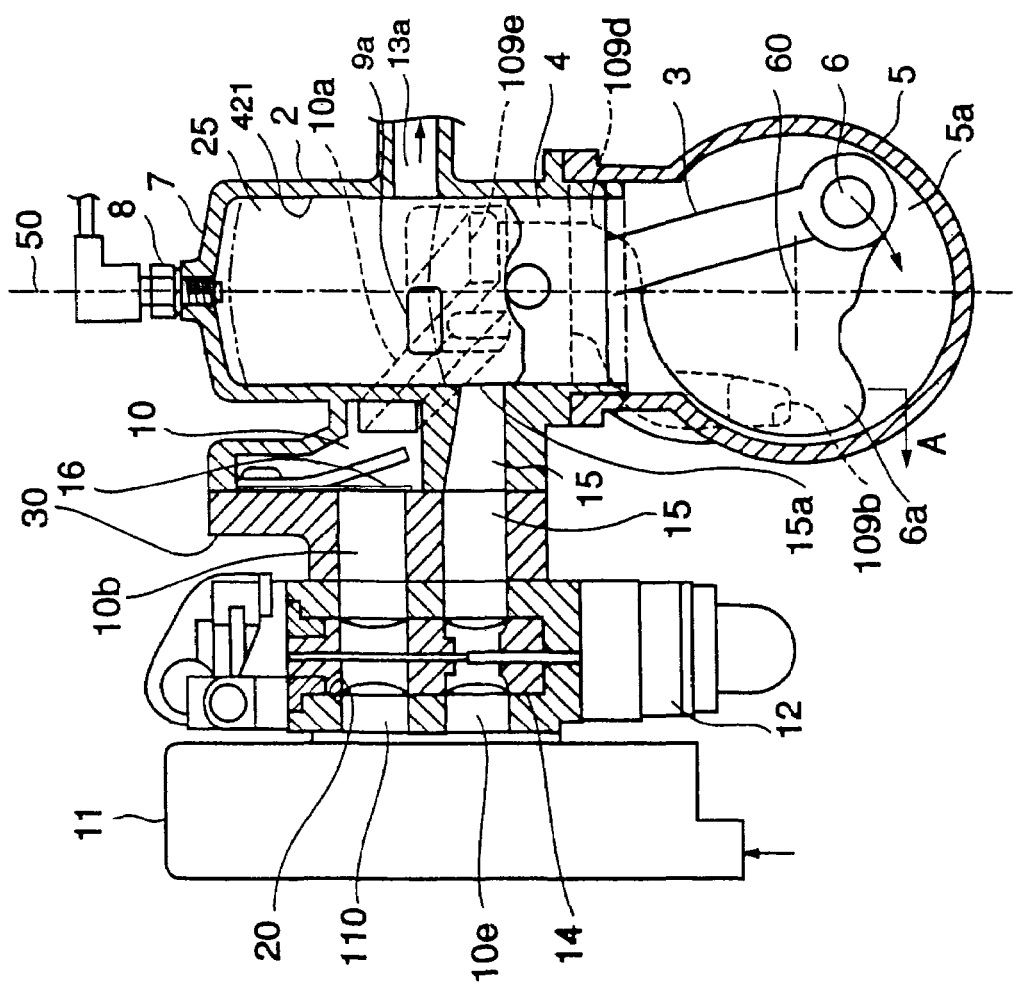
FIG. 27 is a cross section taken along the axis of the cylinder in an air layer-type scavenging two-stroke engine in which the sixth and seventh preferred embodiments of this invention have been implemented.

FIG. 27 shows an air-layer-type scavenging two-stroke engine in which the sixth and seventh preferred embodiments of this invention have been implemented. In this figure, 2 is the cylinder; 421 is the interior wall of the cylinder; 4 is the piston; 6 is the crankshaft; 6*a* is the crank web, a constituent of the crankshaft 6; 5 is the crankcase; 3 is the connecting rod which links piston 4 to crankshaft 6; 7 is the cylinder head; 8 is the spark plug; 11 is the air cleaner; and 12 is the carburetor.

25 is the combustion chamber; 5*a* is the crank chamber inside crankcase 5; and 15 is the fuel passage which connects the aforesaid carburetor 12 to crank chamber 5*a*. 13*a* is the exhaust port on the side of cylinder 2. It is connected to the exhaust pipe by exhaust passage 411.

9*a* are the two scavenging ports, which face each other on cylinder 2 to the right and left of exhaust port 13*a* at virtually a right angle with respect to the exhaust port. The scavenging ports 9*a* communicate with the aforesaid crank chamber 5*a* via branching scavenging passages 109*e*, which are angled obliquely with respect to cylinder 2; arc-shaped scavenging passages 109*d*, which are formed inside the walls on either side of crankcase 5; and outlets 109*b*.

10 is the air supply chamber formed on the side of cylinder 2. Its upstream side is connected to air passage 10*b* in insulator 30; its downstream side is connected to branching air passages 10*a*. The branching air passages 10*a* connect to the two branching scavenging passages 109*e*.

Non-return valve 16 on the outlet of the air supply chamber 10, which goes to branching air passages 10*a* on the right and left, permits air to flow only in the direction of the air passages.

The aforesaid insulator 30 thermally isolates the air intake system from the engine body. It is bolted to the side of cylinder 2. The aforesaid air passage 10*b* is in the upper portion of the insulator 30 and fuel passage 15 is in the lower portion.

The upstream side of the fuel passage 15 is connected to valve 14 on carburetor 12, which controls the flow rate of the fuel-air mixture. The downstream side is connected to the inside of the cylinder (i.e., to combustion chamber 25) via air intake port 15*a*.

110 is an air passage integral to carburetor 12 which connects air cleaner 11 to insulator 30. On the air passage 110 is an air control valve 20, which changes the diameter of the passage. The air control valve 20 is interlocked with mixture control valve 14 on carburetor 12.

This invention concerns an improvement in the configuration of the scavenging passages in the air layer-type scavenging two-stroke engine discussed above.

Figure 23:
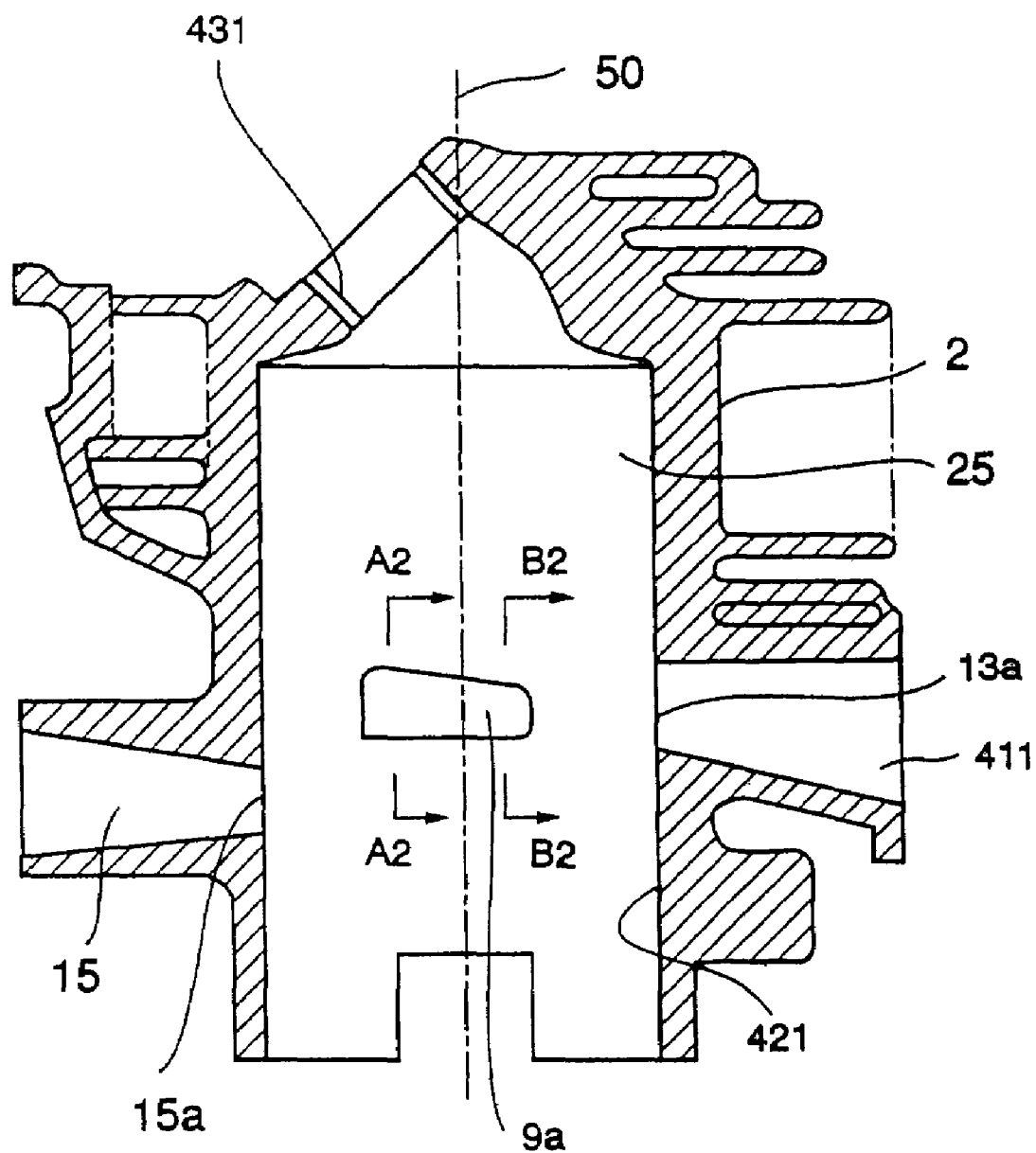
FIG. 23 is a cross section taken along the axis of the cylinder and showing the cylinder in an air layer-type two-stroke engine which is the sixth preferred embodiment of this invention.

FIGS. 23 and 25 show the sixth preferred embodiment of this invention. 2 is the cylinder; 25 is the combustion chamber inside the cylinder; 431 is the space for the aforesaid spark plug 8; 15 is the fuel passage; 15a is the air intake port which is the outlet of the fuel passage 15 into combustion chamber 25; 13a is the exhaust port; and 411 is the exhaust passage which connects the chamber to the exhaust port 13a. 421 is the interior wall of the cylinder.

9a is one of the scavenging ports. It is actually the outlet of one of the aforesaid scavenging passages 109d into combustion chamber 25. As in FIG. 27, there are two such passages and outlets.

As is shown in FIG. 25, upper walls 9c and 9b of the aforesaid scavenging passages 109d, which connect to the aforesaid scavenging ports 9a, and their blow-up angle α, the angle they form with respect to a passage perpendicular to the axis 50 of the cylinder, or in other words with respect to horizontal passage 45, vary along the periphery of the cylinder.

The sixth preferred embodiment is shown in FIG. 23. If we call the blow-up angle of the aforesaid scavenging passage 109d, which can be seen in FIG. 25, in a location nearer the aforesaid exhaust port α1 (B in FIG. 25) and that in a location nearer the aforesaid intake port α2 (A in FIG. 25), then α1<α2. The blow-up angle α varies continuously from a location nearer intake port 15a (α2) to one nearer exhaust port 13 (α1).

Figure 24:
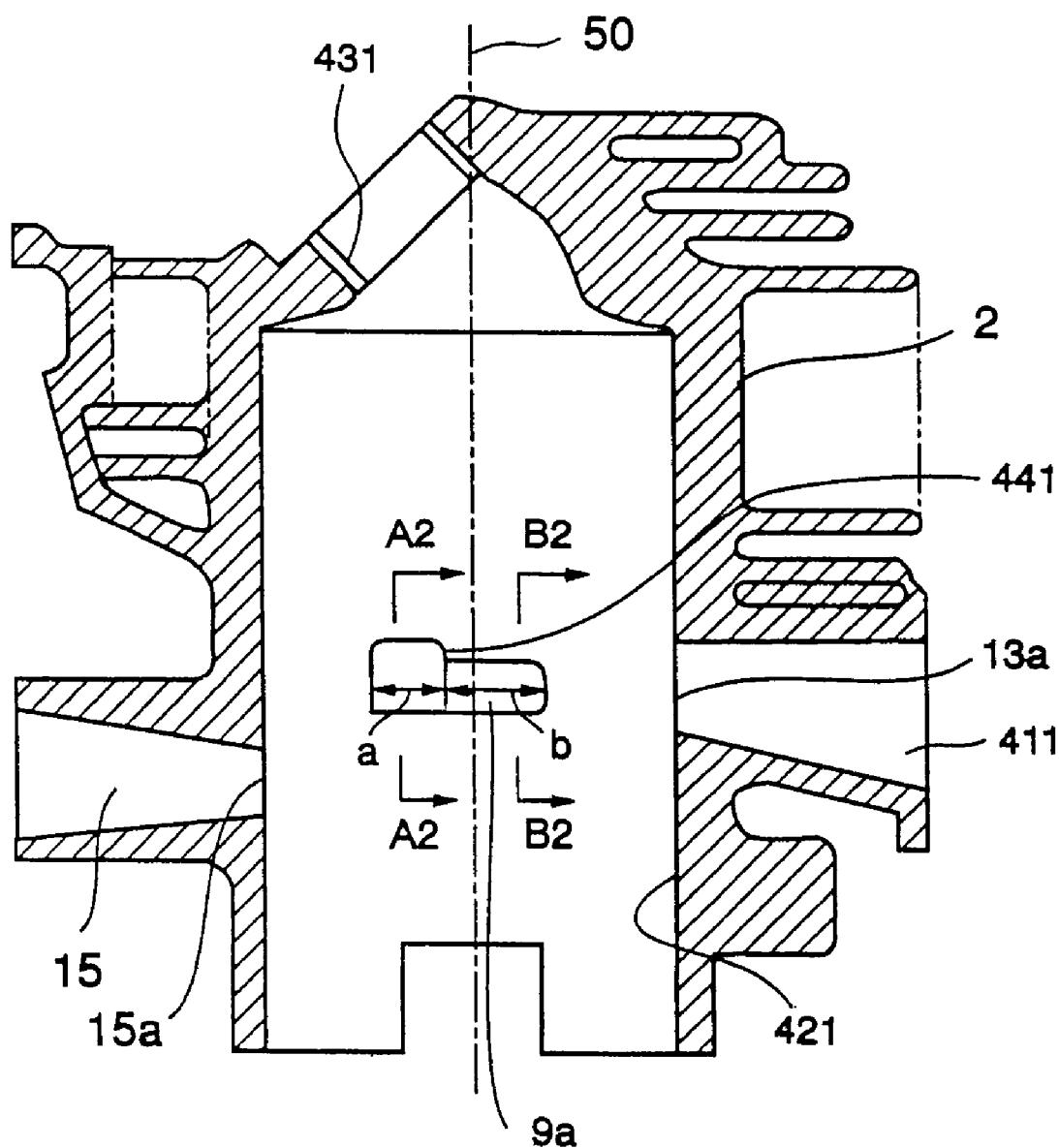
FIG. 24 is a view of the seventh preferred embodiment of this invention which corresponds to that in FIG. 23.
Figure 26:
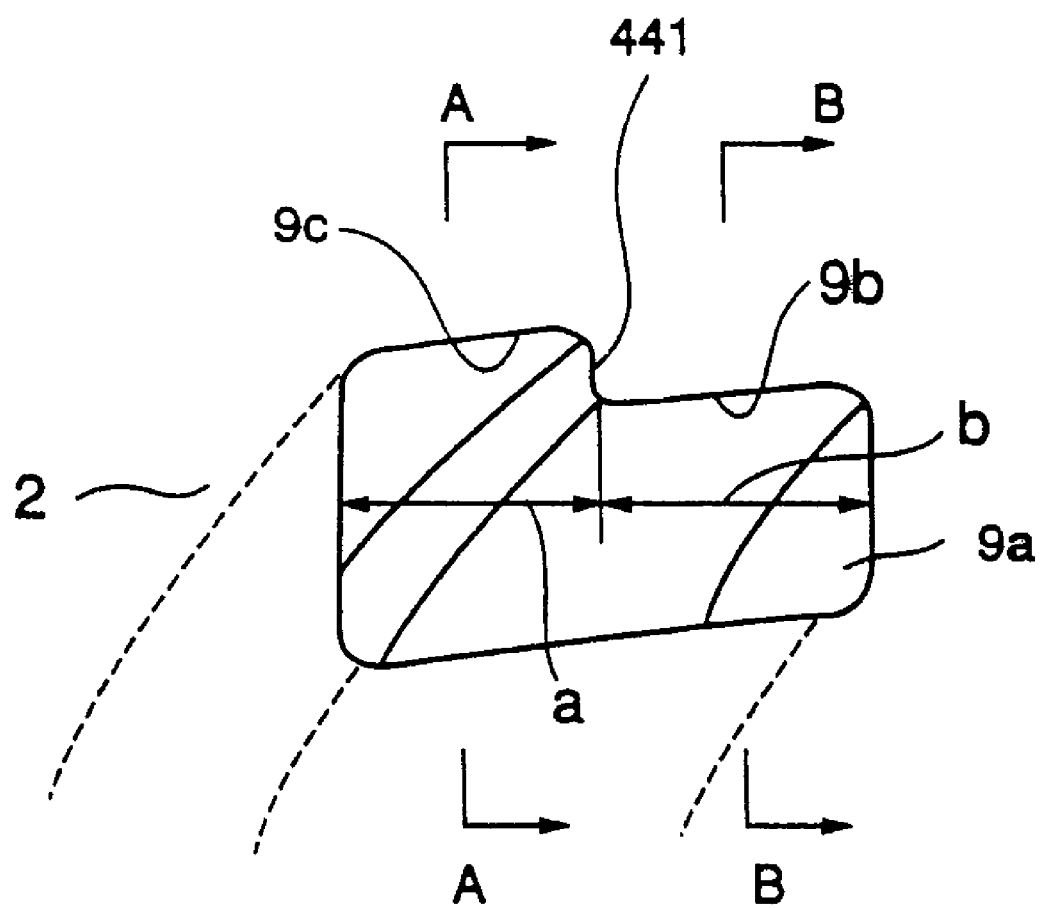
FIG. 26 is a perspective drawing of the scavenging port in the seventh preferred embodiment.

In the seventh embodiment of this invention, which is pictured in FIGS. 24, 26 and 27, surfaces 9c and 9b of the upper wall of the aforesaid scavenging passage 109d are formed so that they vary in step fashion from blow-up angle α2 along a given length a on the side of the passage nearer intake port 15a to blow-up angle α1 along a given length b on the side of the passage nearer exhaust port 13, with the angular difference mediated by step 441.

In this case there is a fixed blow-up angle α2 along the entire length of the aforesaid given length a, and a different fixed blow-up angle α1 along the entire length of the aforesaid given length b. It would also be permissible to have two or more steps like the aforesaid 441 so that the blow-up angle would vary in three or more stages.

When an air layer-type scavenging two-stroke engine configured in this way operates, the combustion pressure in combustion chamber 25 forces piston 4 downward and opens exhaust port 13. The combustion gases (i.e., the exhaust gas) in the combustion chamber 25 flow through exhaust port 13 and exhaust passage 411 to the exhaust pipe, and are released into the atmosphere through the muffler (not pictured).

When piston 4 goes down further, the scavenging ports 9a to its left and right open. The air which has accumulated in branching scavenging passages 109e flows into combustion chamber 25, pushing the combustion gases toward exhaust port 13.

Next, the fuel-air mixture stored in crank chamber 5a flows into combustion chamber 25 via outlets 109b of the scavenging passages, scavenging passages 109d and branching scavenging passages 109e.

When piston 4 reaches bottom dead center, exhaust port 13 and scavenging ports 9a open, and the supply of air and fuel-air mixture to combustion chamber 25 is completed or virtually completed. Scavenging ports 9a are closed by the action of the piston 4, and the interior of crank chamber 5a becomes a closed space. As the space begins to expand, its pressure begins to drop.

When piston 4 rises further, exhaust port 13 closes, and the fuel-air mixture in combustion chamber 25 begins to be pressurized. As piston 4 rises, the volume inside crank chamber 5a increases, which further reduces the pressure in the crank chamber 5a. When piston 4 rises further, air intake port 15a on the side of cylinder 2 opens, and the fuel-air mixture generated in carburetor 12, and whose flow rate is controlled by valve 14, is supplied to crank chamber 5a through fuel passage 15.

The drop in pressure inside the aforesaid crank chamber 5a is communicated via outlets 109b, scavenging passages 109d and branching scavenging passages 109e to branching air passages 10a on the left and right. Non-return valve 16 opens, and the air supplied to air supply chamber 10 fills scavenging passages 109d.

When piston 4 reaches the vicinity of top dead center, spark plug 8 discharges a spark in combustion chamber 25. This ignites the pressurized fuel-air mixture and combustion occurs. The pressure generated by this combustion pushes piston 4 down, which generates rotary torque in crankshaft 6.

When piston 4 goes down and exhaust port 13 opens, the combustion gases in combustion chamber 25 flow through exhaust port 13 into the exhaust pipe. They are exhausted to the exterior through the muffler (not pictured).

In the aforesaid scavenging operation, because the blow-up angle α2 of upper walls 9c and 9b of the aforesaid scavenging passage 109d is greater at a location nearer intake port 15a than blow-up angle α1 at a location nearer exhaust port 13a, the fuel mixture which enters the chamber from the location nearer the exhaust port 13a will flow along the top of the piston at a high speed without being dispersed. This will prevent it from getting caught in the exhaust gas stream and so reduce the quantity of fuel lost through exhaust port 13a.

The fuel-air mixture which enters the chamber from the location nearer the aforesaid intake port 15 of the aforesaid scavenging passage 109d will be flowing at a lower velocity than that nearer the aforesaid exhaust port 13a. It will be sent into the area around the spark plug in the upper part of the chamber, where it will be efficiently ignited and combusted.

Thus the sixth and seventh embodiments prevent the fuel-air mixture supplied to combustion chamber 25 from escaping unburned through exhaust port 13a, improve the scavenging efficiency, and increase the concentration of the fuel-air mixture which fills combustion chamber 25.

If the engine is configured as in the aforesaid seventh embodiment, the surfaces 9c and 9b of the upper wall of the aforesaid scavenging passage 109d is formed so that it varies in step fashion from a large blow-up angle α2 at a location nearer intake port 15a to a smaller angle α1 at a location nearer exhaust port 13a, with the change in angles occurring at step 441. When the cylinder is cast, two dies can be used with two different blow-up angles α, as described above, with the angles changing at the step 441. This will make it easy to remove the work from the dies.

Also, using dies with two different blow-up angles to form scavenging passage 109d is an easy and reliable way to control the blow-up angle.

Figure 29:
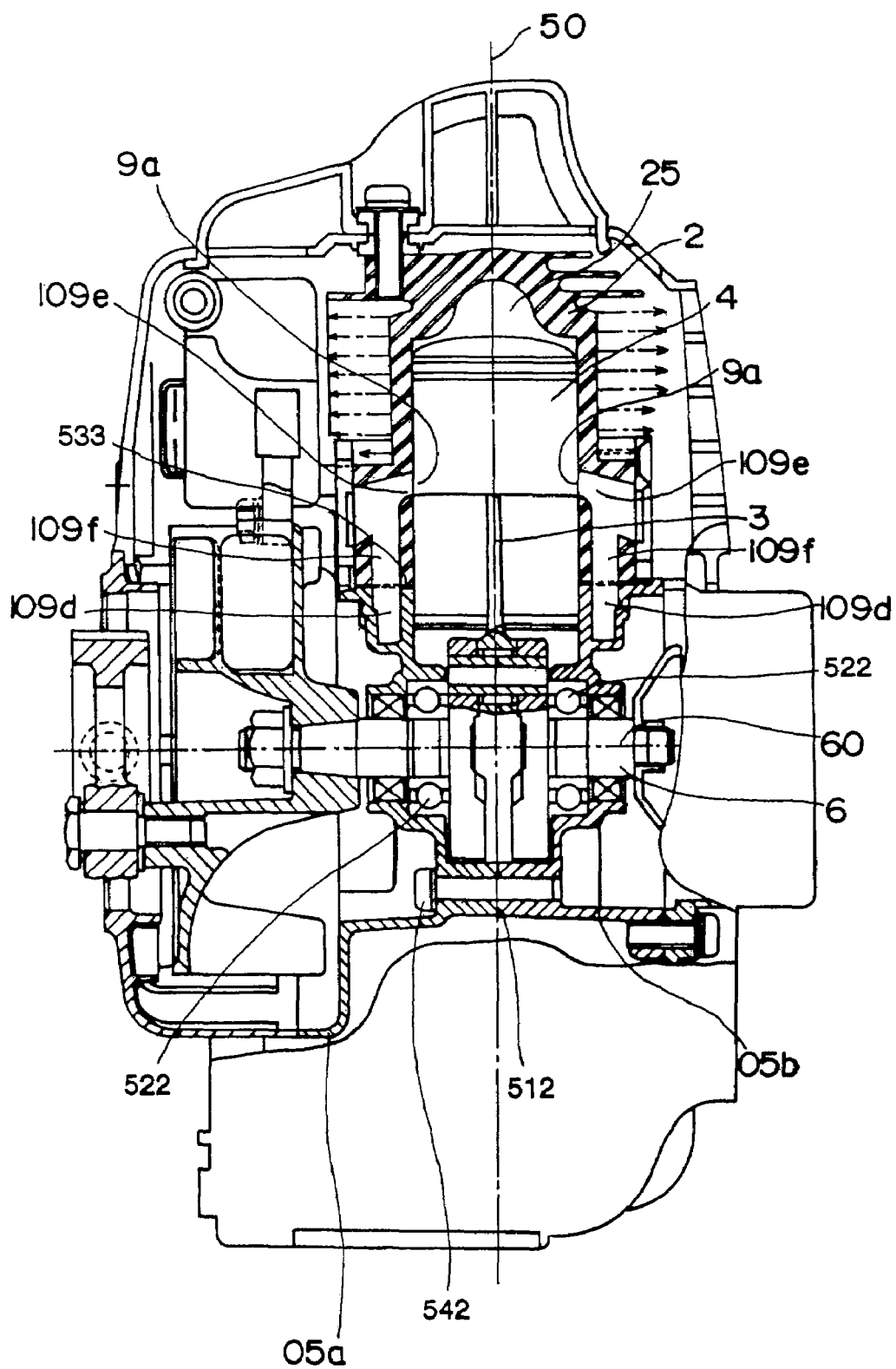
FIG. 29 is a cross section taken along the crankshaft of a two-stroke engine which is the eighth preferred embodiment of this invention.
Figure 30:
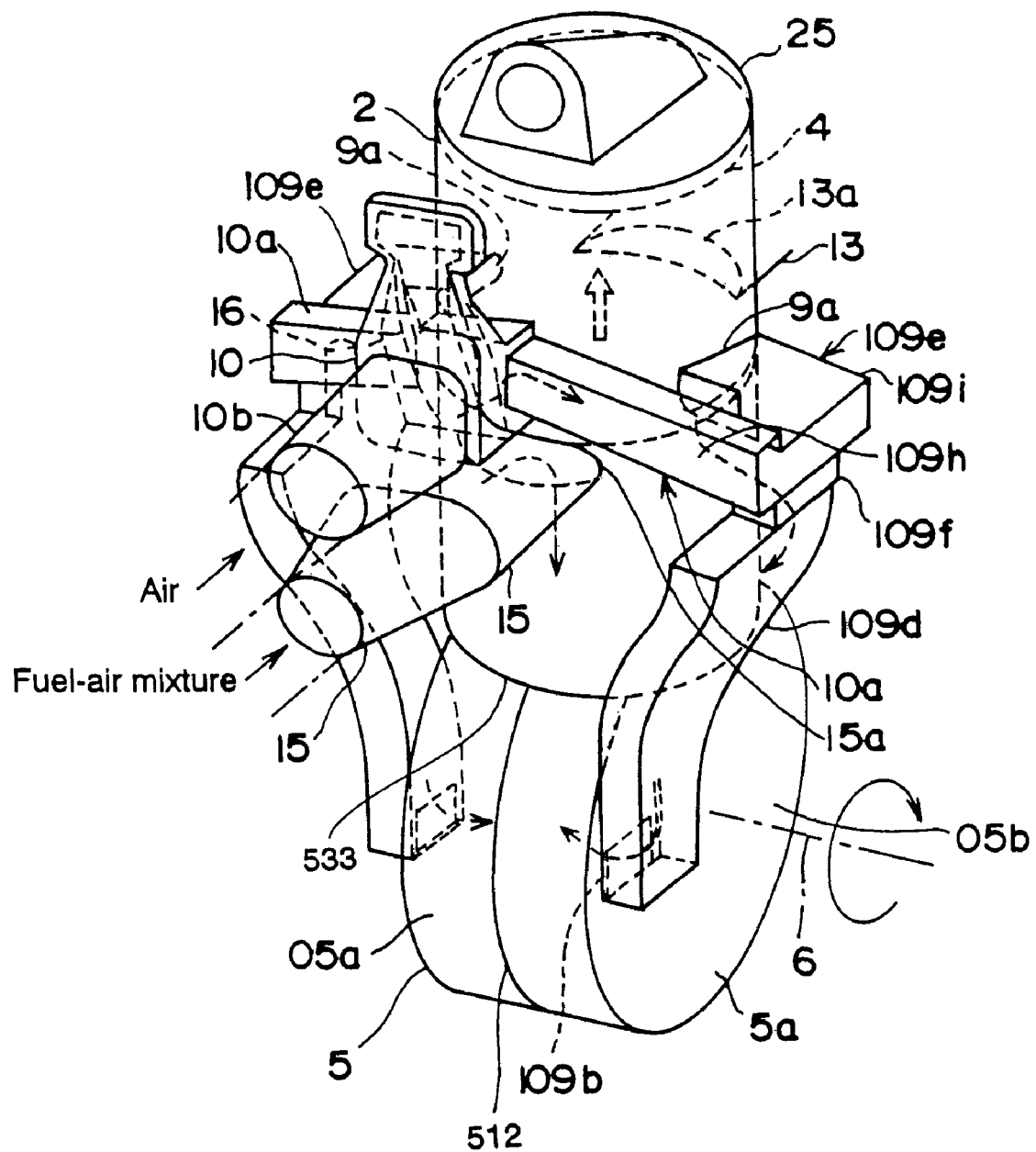
FIG. 30 shows the configuration of the scavenging and air passages in the eighth preferred embodiment of this invention.
Figure 31:
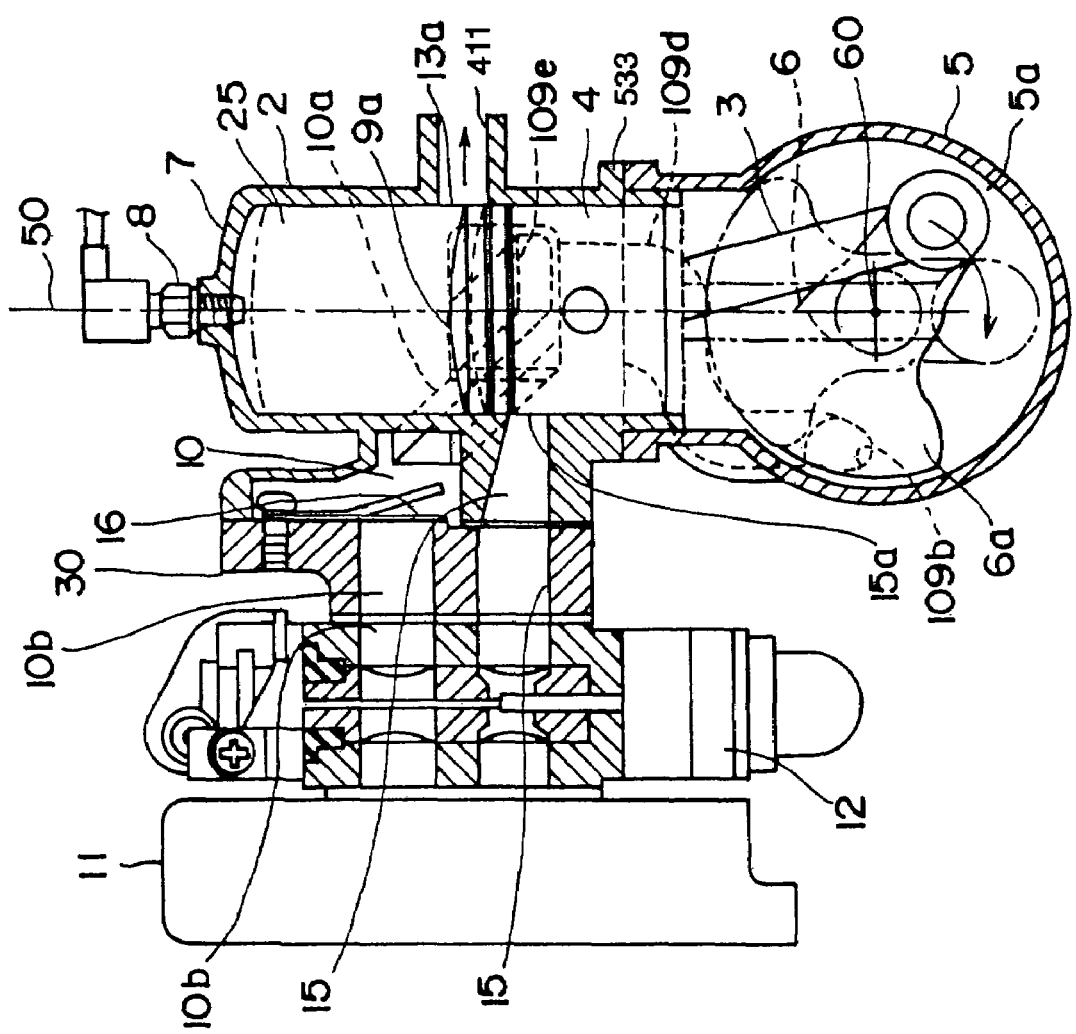
FIG. 31 is a cross section taken at a right angle to the crankshaft which describes the axis of the cylinder in an air layer-type scavenging two-stroke engine in which this invention has been implemented.

FIGS. 28 through 31 show the eighth preferred embodiment of this invention. In FIG. 31, 2 is the cylinder, 4 the piston, 6 the crankshaft, 6a the crank web of the crankshaft 6, 5 the crankcase, 3 the connecting rod which connects piston 4 and crankshaft 6, 7 the cylinder head, 8 the spark plug, 11 the air cleaner and 12 the carburetor. 25 is the combustion chamber. 5a is the crank chamber formed inside crankcase 5. 15 is the passage for the fuel-air mixture which connects the aforesaid carburetor 12 and crank chamber 5a. 13a is the exhaust port on the side of cylinder 2. It is connected to exhaust passage 411.

9a are the two scavenging ports which face each other on cylinder 2 to the right and left of exhaust port 13a at virtually a right angle with respect to the exhaust port. As can be seen in FIG. 30, the scavenging ports 9a communicate with the aforesaid crank chamber 5a via branching scavenging passages 109e, which are angled obliquely with respect to cylinder 2; scavenging passages 109f, which are at the points where the various scavenging passages meet; arc-shaped scavenging passages 109d, which are formed inside the walls on either side of crankcase 5; and outlets 109b.

The end surfaces of the aforesaid outlets 109b and the end surfaces of crank webs 6a approximate each other in the direction of crankshaft 60, leaving only a microscopic gap, so that the ends of the outlets can be opened and closed by the revolution of crank webs 6a of crankshaft 6.

10 is the air supply chamber formed on the side of cylinder 2. Its upstream side is connected to air passage 10b in insulator 30, which will be discussed shortly; its downstream side is connected to branching air passages 10a. As can be seen in FIG. 30, the branching air passages 10a connect to scavenging passages 109f and 109e.

Non-return valve 16 on the outlet of the air supply chamber 10, which goes to branching air passages 10a on the right and left, permits air to flow only in the direction of the air passages.

As is shown in FIG. 30, the aforesaid branching air passages 10a and scavenging passages 109e are formed virtually symmetrically with respect to the axis 50 of the cylinder by walls 109h and 109i, which extend outward from the sides of the cylinder 2 and are integral to it. The walls 109h and 109i are parallel to each other. The single die which forms them can be removed by pulling it sideward away from the cylinder.

30 is an insulator to thermally isolate the engine body from the air intake system. The insulator 30 is bolted to the side of cylinder 2. The aforesaid air passage 10b is in the upper portion of the insulator 30, and fuel passage 15 is in its lower portion. The upstream side of the fuel passage 15 is connected to carburetor 12, as described above. The downstream side is connected to the interior of the cylinder (combustion chamber 25) via air inlet port 15a.

Figure 28:
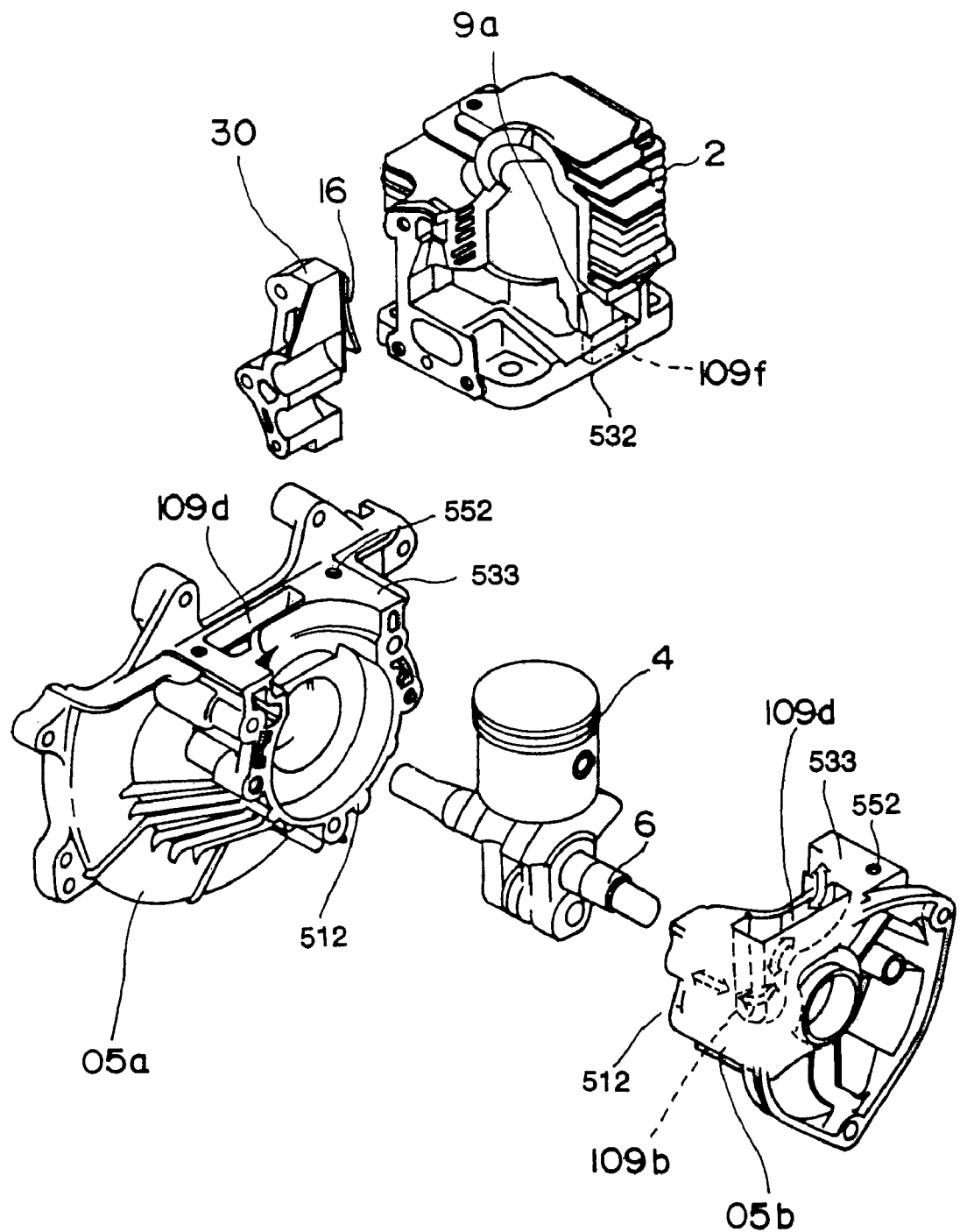
FIG. 28 is an exploded perspective drawing of an air layer-type scavenging two-stroke engine which is the eighth preferred embodiment of this invention.

In FIGS. 28 and 29, the aforesaid crankcase 5 consists of front portion 05a and rear portion 05b. The two portions of the crankcase are divided at surface 512, a surface at a right angle with respect to crankshaft 60 and cylinder axis 50, which is also the axis of the crankshaft. After crankshaft 6 and main shaft bearings 522 are installed between them, the front portion 05a and rear portion 05b are fastened to each other by a number of bolts 542.

533 is the flat surface on the top of the aforesaid crankcase 5 to which the cylinder will be mounted. The undersurface 532 of cylinder 2 is brought up against the surface 533 and the cylinder is fastened to the aforesaid crankcase 5 by a number of bolts 552.

Inside the aforesaid front portion 05a and rear portion 05b are two symmetrical scavenging passages 109d and their outlets 109b. The two passages meet where they go through common surface 512. The upper ends of the scavenging passages 109d come out through the surface 533, so the upper portions of the dies which form them can be removed by pulling them away from the surface 533.

Inside the aforesaid cylinder 2, scavenging passages 109f, which connect with scavenging passages 109d in the aforesaid front portion 05a and rear portion 05b of the crankcase; branching scavenging passages 109e, which connect with the scavenging passages 109f; and branching air passages 10a, which connect with the branching scavenging passages 109e, are symmetric with respect to surface 512 of the aforesaid crankcase 5.

When an air layer-type scavenging two-stroke engine configured in this way operates, piston 4 goes down and the scavenging ports 9a to its left and right open. The air which has accumulated in branching scavenging passages 109e by flowing through the aforesaid air passage 10b, non-return valve 16 and air supply chamber 10 flows through scavenging ports 9a into combustion chamber 25 and pushes the combustion gases toward exhaust port 13a.

Next, the fuel-air mixture stored in crank chamber 5a flows through scavenging ports 9a into combustion chamber 25 via scavenging passage outlets 109b, scavenging passages 109d and 109f and branching scavenging passages 109e.

When piston 4 rises from bottom dead center, it closes scavenging ports 9a, and the interior of crank chamber 5a becomes a closed space. As the space begins to expand, its pressure begins to drop.

When piston 4 rises further, exhaust port 13a closes, and the fuel-air mixture in combustion chamber 25 begins to be pressurized. As piston 4 rises, the volume inside crank chamber 5a increases, which further reduces the pressure in the crankcase. When piston 4 rises further, air intake port 15a opens, and the fuel-air mixture is supplied to crank chamber 5a through fuel passage 15.

When an air layer-type scavenging two-stroke engine configured as described above is manufactured, scavenging passages 109d are cast inside front portion 05a and rear portion 05b of the crankcase, and the required machining processes are performed. Then piston 4, crankshaft 6, connecting rod 3 and main shaft bearings 522 are assembled between the two halves of the crankcase. The halves are joined at surface 512 and fastened together by bolts 542 to achieve a unitary crankcase 5.

In cylinder 2, scavenging passages 109f, which connect with passages 109d in the aforesaid crankcase 5; branching scavenging passages 109e, which connect with the passages 109f; and branching air passages 10a, which connect with the branching passages 109e, are cast in such a way that they are symmetric with respect to surface 512 of the aforesaid crankcase 5, and the required machining processes are performed.

Piston 4, connecting rod 3 and other necessary components are assembled in the aforesaid cylinder 2, and its undersurface 532 is brought up against surface 533 of the aforesaid crankcase 5. The cylinder is then fastened to the crankcase by bolts 552.

With the eighth embodiment, then, crankcase 5 is divided at surface 512, a surface at a right angle with respect to crankshaft 60 and cylinder axis 50, which is also the axis of the crankshaft, into a front portion 05a and a rear portion 05b, both of which have scavenging passages 109d running inside them. The front and rear portions 05a and 05b are fastened together by bolts 542. Cylinder 2, which contains scavenging passages 109f, branching scavenging passages 109e and branching air passages 10a, is fastened to surface 533 on the top of the aforesaid crankcase 5 by bolts 552. Scavenging passages 109f on the bottom of the cylinder communicate with scavenging passages 109d in crankcase 5, forming two long scavenging passages which run through both crankcase 5 and cylinder 2. The crankcase 5 and cylinder 2 thus assume a compact shape with no projections, and their scavenging passages are smooth passages with no sharp angles.

The engine is divided into front and rear portions 05a and 05b, with scavenging passages 109d running through both portions, and the two portions are cast separately. Thus the work can be removed from the dies at the aforesaid surface 512 where the two portions will be joined or at surface 533, the surface perpendicular to surface 512 where the cylinder is mounted. This simplifies the shapes of the dies and the removal of the work and reduces the number of dies needed.

With the eighth embodiment, scavenging passages 109*d* and 109*f,* branching scavenging passages 109*e* and branching air passages 10*a* are all symmetric with respect to surface 512 of the aforesaid crankcase along their entire length from outlets 109*b* into crank chamber 5*a* to scavenging ports 9*a* in cylinder 2. A common die can therefore be used to cast the two respective scavenging passages and branching air passages in the front and rear portions of the crankcase, so fewer dies are needed. The shape described above makes the passages of the two symmetric scavenging passages exactly the same size. Cylinder 2 will therefore be filled uniformly along its circumference with scavenging air and fuel-air mixture. And because the aforesaid two branching air passages 10*a* also have identically-shaped passages, cylinder 2 will be scavenged uniformly along its circumference.

Walls 109*h* and 109*i* of the aforesaid scavenging and branching air passages can be formed integrally to cylinder 2 and virtually parallel with each other. Because this design allows the cylinder to be cast using a single sliding die, it simplifies the configuration of the die and reduces the cost of producing it.

Figure 32:
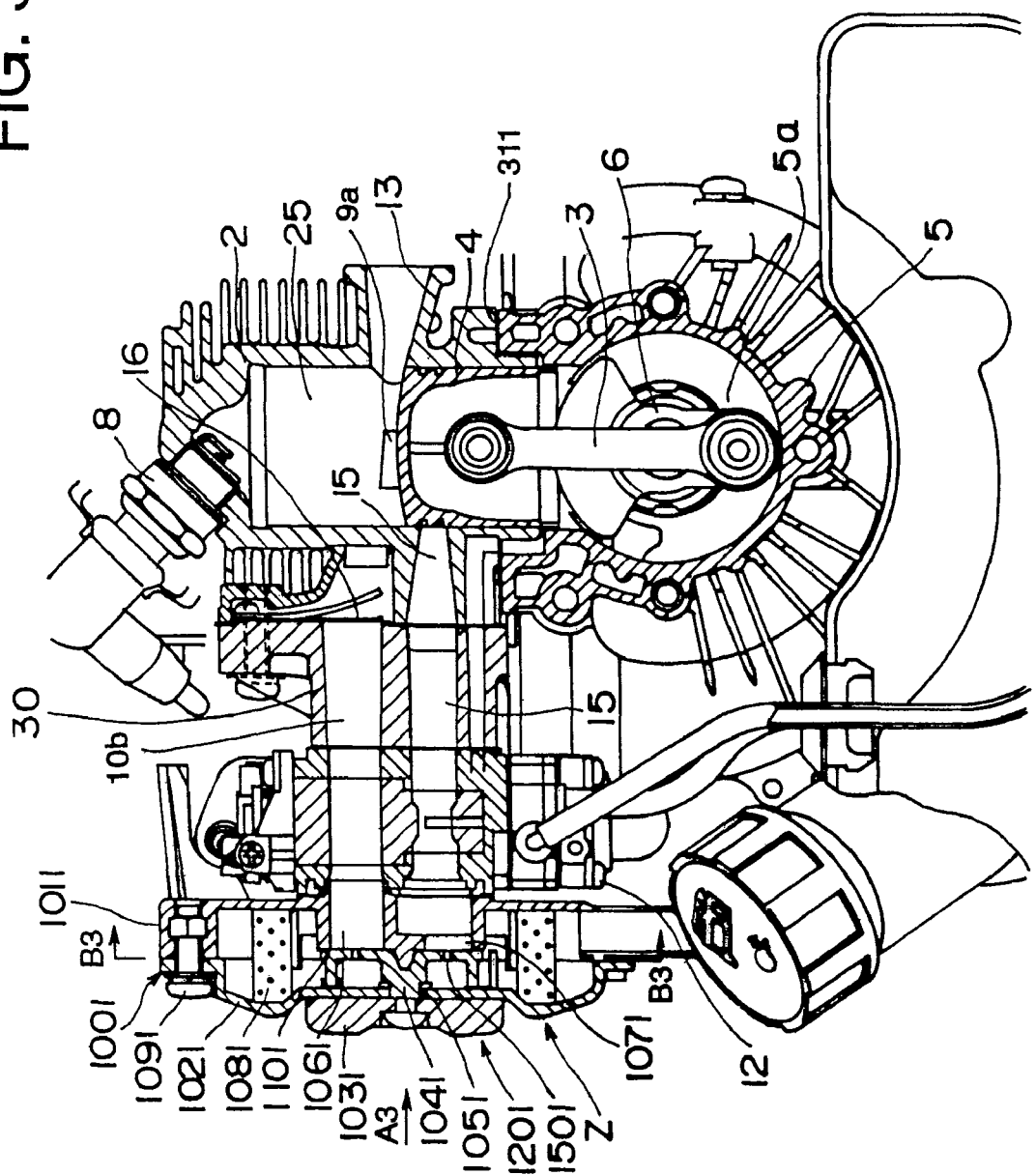
FIG. 32 is a cross section taken at a right angle to the crankshaft which shows the configuration of the air cleaner and vacuum device in a two-stroke engine which is the ninth preferred embodiment of this invention.

FIGS. 32 through 38 show the ninth preferred embodiment of this invention. In FIG. 32, 2 is the cylinder; 5 is the crankcase. The cylinder 2 and crankcase 5 are fastened to each other with gasket 05 between them by bolts 110 at their mounting surfaces. 4 is the piston; 3 is the connecting rod; 8 is the spark plug; 13*a* is the exhaust port; and 25 is the combustion chamber.

9*a* is the scavenging port, which is on the side of the aforesaid cylinder 2. 5*a* is the crank chamber inside the aforesaid crankcase 5. 12 is the carburetor; 30 is the insulator between the carburetor 12 and the aforesaid cylinder 2. 15 is the passage for the fuel-air mixture. It runs from the throttle passage of the aforesaid carburetor 12 through insulator 30 and cylinder 2 to the aforesaid crank chamber 5*a*. 10*b* is the air passage. It runs from the air passage of the aforesaid carburetor 12 through insulator 30 and non-return valve 16 to the scavenging passage and the aforesaid scavenging port 9. The non-return valve 16 is a reed valve which is opened and closed by negative pressure in the aforesaid scavenging passage.

In the two-cycle engine according to this invention, the air cleaner and the choke valve used in it have been improved.

1001 is the air cleaner, which is configured as follows.

1011 is the air cleaner housing. It is attached to the aforesaid carburetor 12 by bolts (not pictured). 1021 is the air cleaner cover. It is attached to the aforesaid air cleaner housing 1011 by bolts 109.

Two air passages, passage 1061 and passage 1071, run parallel to each other through the aforesaid air cleaner housing 1011. Air passage 1061 connects to air passage 10*b*, which has the aforesaid non-return valve 16 on it. Air passage 1071 connects to the aforesaid fuel passage 15.

1201 is a choke valve which alternately opens and closes the aforesaid air passages 1061 and 1071.

In FIGS. 32 through 38, 1041 is a rotary valve consisting of valve portions 1041*a* and 1041*b*. When rotated, it engages over the opening in the center of the aforesaid air cleaner cover 1021. Valve portions 1041*a* and 1041*b* alternately open and close the inlets of the aforesaid air passages 1061 and 1071. 1031 is the rotary knob which operates the valve 1041. It is fixed to the end of the valve 1041. There is a choke hole 1501 in valve portion 1041*b*. On the side of valve portions 1041*a* and 1041*b* which is away from the engine extensions 1511 and 1521 are formed integrally to the valve portions.

The end of the aforesaid valve 1041 consists of flat surface 1101, which covers or uncovers the inlets of the aforesaid air passages 1061 and 1071. Flat surface 1101 of the valve 1041, as can be seen in FIG. 32, is shaped in such a way as to completely obstruct the inlets of the aforesaid air passages 1061 and 1071 when the valve 1041 is rotated.

1051 is an O-ring which is placed on the circumference of the valve stem of the aforesaid valve 1041. It goes between the inner surface 1131 of the aforesaid air cleaner cover 1021 and step portion 1221 of the valve stem of the aforesaid valve 1041 and exerts pressure in the axial direction of the valve, forming a liquid seal for the interior of air cleaner 1001. Its elastic force presses flat surface 1101 of the aforesaid valve 1041 against the inlets of the aforesaid air passages 1061 and 1071.

Figure 33:
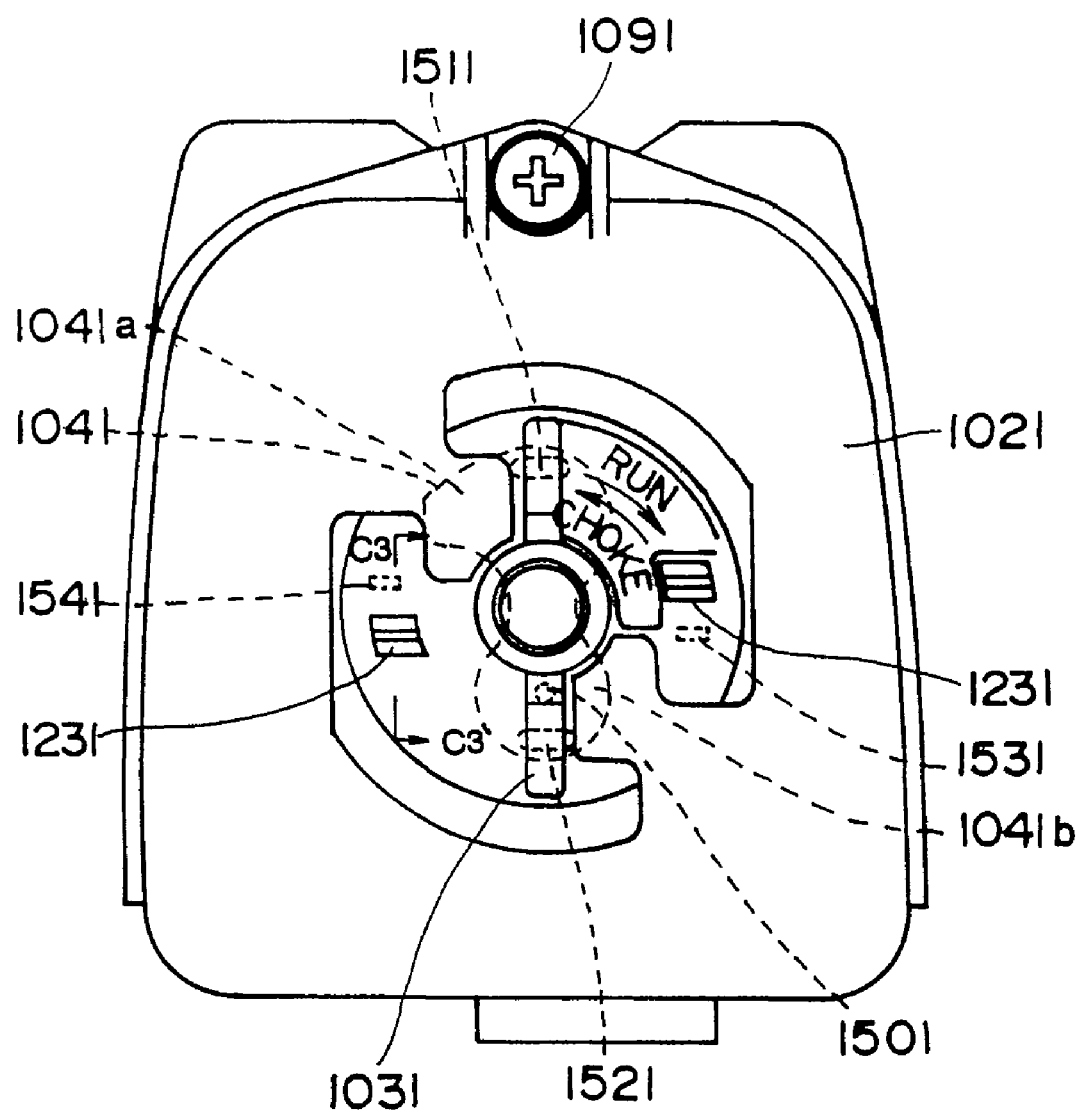
FIG. 33 is the view from arrow 3 in FIG. 32.
Figure 34:
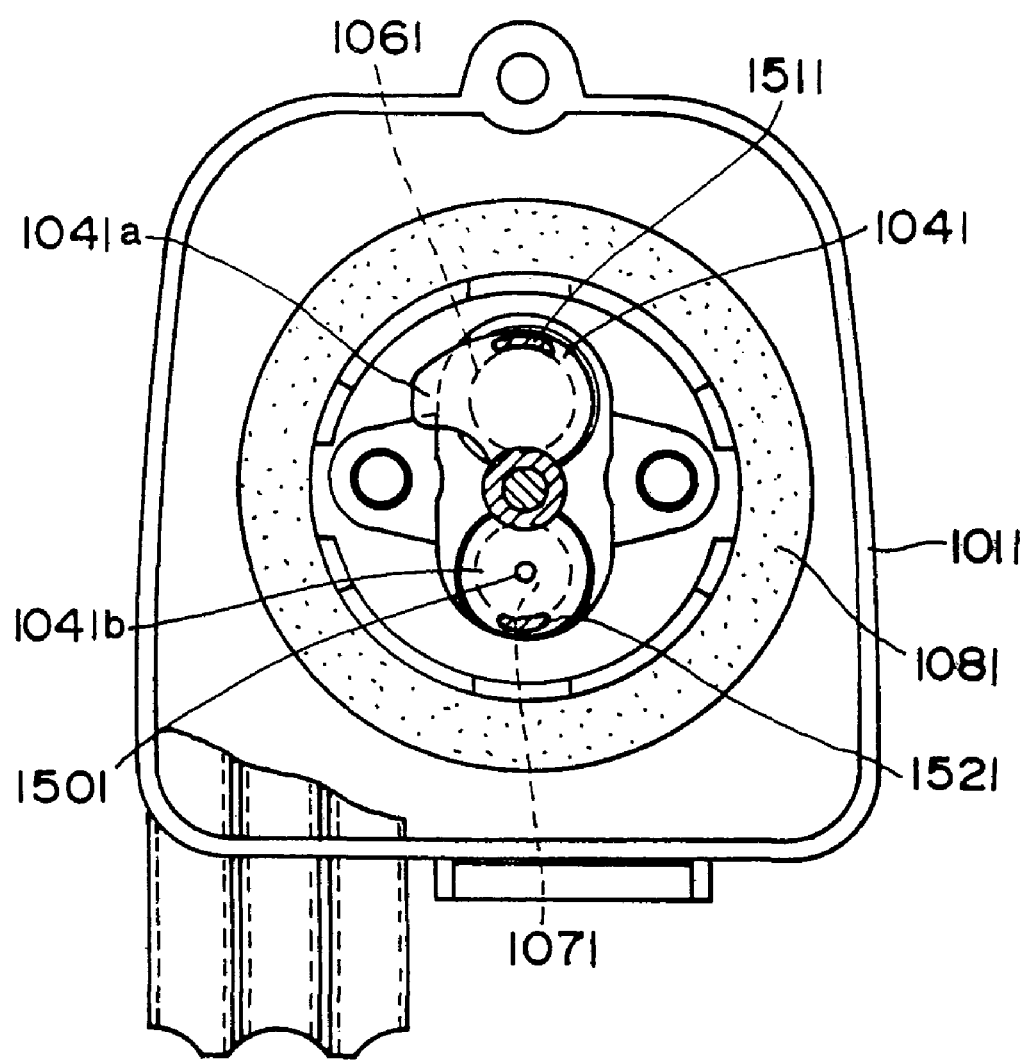
FIG. 34 is the view from line B3-B3 in FIG. 32.
Figure 35:
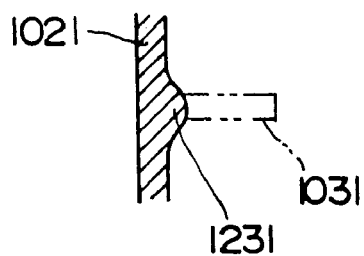
FIG. 35 is the view from line C3-C3 in FIG. 32.
Figure 36:
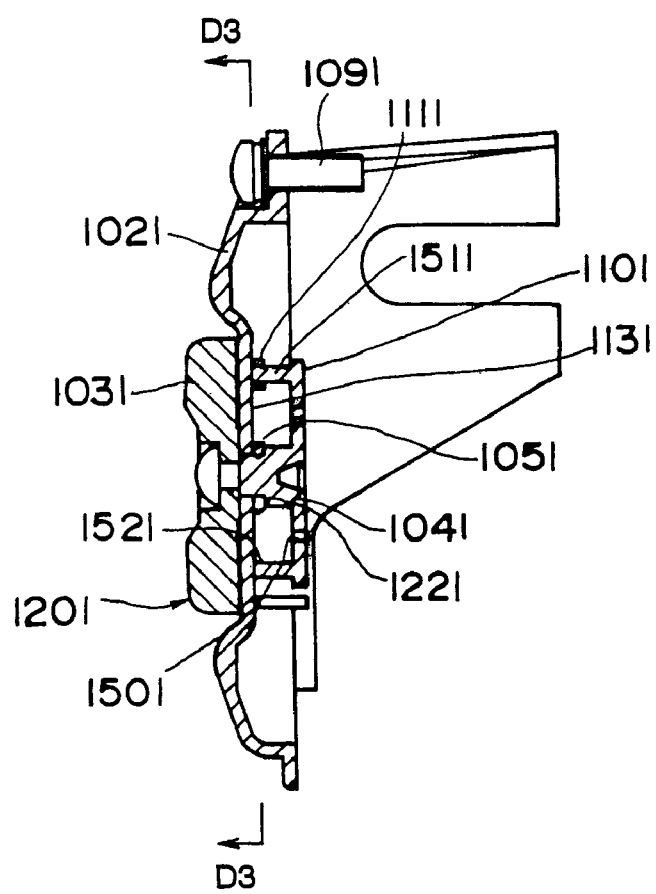
FIG. 36 is a cross section of the air cleaner cover and choke valve (a closer view of area Z in FIG. 32).
Figure 37:
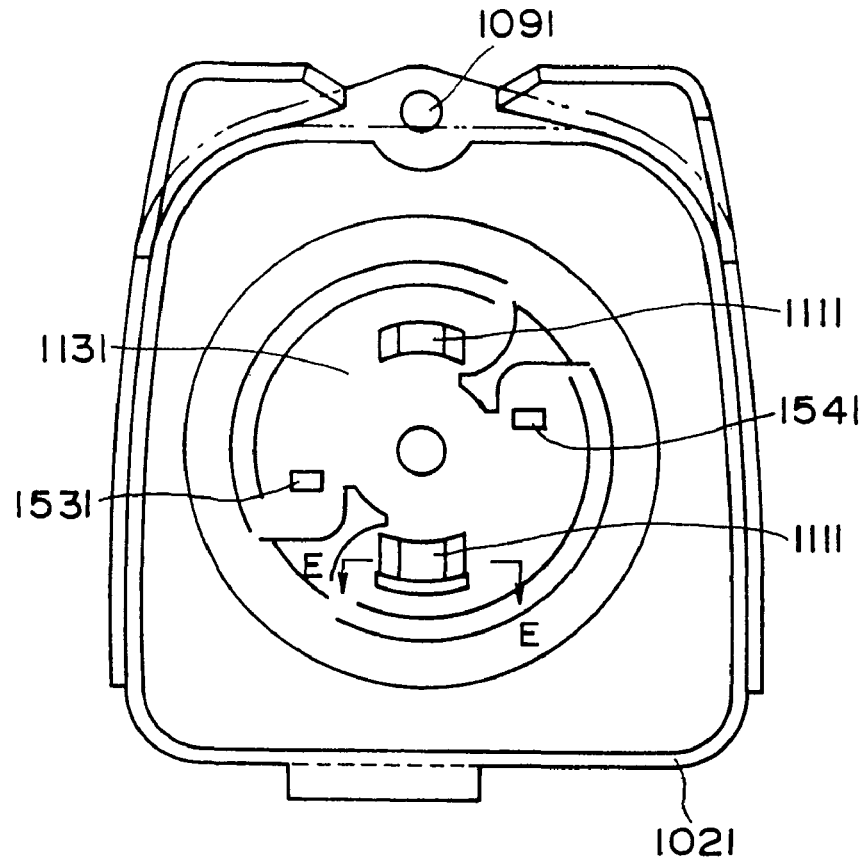
FIG. 37 is the view from line D3-D3 in FIG. 36.

As FIG. 33 shows, when rotary knob 1031, which is integral to the aforesaid valve 1041, is turned approximately 90° clockwise from starting position, it is set in normal operating position. 1231 is a stop which projects from the exterior surface of the aforesaid air cleaner cover 1021. As can be seen in FIGS. 33 and 34, when the aforesaid rotary knob 1031 is being rotated from the aforesaid starting position to normal operating position, its end goes over the aforesaid projection 1231 against the force of the aforesaid O-ring 1051. Extensions 1511 and 1521 on valve 1041 come up against and are stopped by stops 1531 and 1541, as shown in FIG. 37. The elastic force of the aforesaid O-ring 1051 returns the valve to its previous position, and it is held on the portion of the aforesaid air cleaner cover 1021 which does not have a projection 1231 on it.

Figure 38:
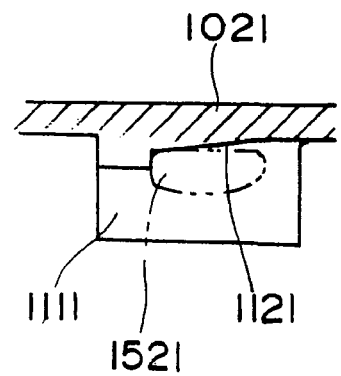
FIG. 38 is a cross section taken along line E-E in FIG. 37.

As can be seen in FIGS. 37 and 38, there is a projection 1111 with a tapered surface 1121 on the inside of the aforesaid air cleaner cover 1021. When the aforesaid rotary knob 1031 is in starting position, as shown in FIG. 33, its end rides up on tapered surface 1121 of the projection 1111, and flat surface 1101 of the aforesaid valve 1041 pushes against the inlet of the aforesaid air passage 1061, closing it completely.

In an air cleaner in a two-stroke engine configured as described above, when the engine is going to be started up, the rotary knob 1031 of choke valve 1201 is set in starting position (choke position), as shown in FIG. 33. When rotary valve 1041, which is fixed to the knob 1031, is rotated, the air inlet of carburetor 12 and the aforesaid air passage 1071, which is connected to the aforesaid fuel passage 15, is fully closed (although the small choke hole 1501 remains open). The aforesaid air passage 1061, which is connected to the air passage 10*b* which supplies preceding air, is also fully closed, and the engine is started up.

When this choke valve 1201 is operated, the air filtered by cleaner element 1081 of air cleaner 1001 flows into air passage 1071 through choke hole 1501 and is supplied from the passage 1071 to the main nozzle of carburetor 12, which is connected to passage 1071. In the carburetor 12, a fuel-air mixture is generated by atomizing the fuel in the air. The fuel-air mixture is supplied from fuel passage 15 through crank chamber 5*a*, the scavenging passage and scavenging port 9*a*, into combustion chamber 25, where it is ignited and combusted, thus starting the engine.

When the engine is started up, air passage 1061 of air cleaner 1001 is fully closed by valve 1041 of the aforesaid choke valve 1201. Thus preceding air cannot be supplied to the combustion chamber through the air passages 1061 and 10*b*. Only the fuel-air mixture generated in carburetor 12 using the air which enters the aforesaid air passage 1071 through choke hole 1501 is supplied to the combustion chamber. Thus combustion chamber 25 will be filled with a rich fuel-air mixture, and the engine's starting characteristics will improve.

Flat surface 1101 of rotary valve 1041 in the aforesaid choke valve 1201 opens and closes the inlets of the aforesaid air passages 1061 and 1071. 1051 is an O-ring which is placed on the circumference of the stem of the aforesaid valve 1041 between the inner surface 1131 of the aforesaid air cleaner cover 1021 and step portion 1221 of the stem of the aforesaid valve 1041. It exerts pressure in the axial direction of the valve 1041, forming a liquid seal for the interior of air cleaner 1001. Its elastic force presses flat surface 1101 of the aforesaid valve 1041 against the inlets of the aforesaid air passages 1061 and 1071. Thus the choke valve 1201 completely closes the inlet of air passage 1061 for preceding air. This allows a rich mixture to be generated, as described above, and it allows a high negative pressure to be maintained.

In addition to the aforesaid O-ring 1051, a projection 1231 which serves as a stop is provided on the outer surface of the aforesaid air cleaner cover 1021. When the aforesaid choke valve 1201 is rotated from starting position to normal operating position, it switches between the aforesaid air passages 1061 and 1071. When the aforesaid rotary knob 1031 is between starting position and normal operating position, its end goes over the aforesaid projection 1231 against the force of the aforesaid O-ring 1051. The moderate friction improves the operating feel of the choke valve. When the choke valve 1031 is released, the elastic force of the aforesaid O-ring 1051 and the force of the aforesaid protruding stop 1231 automatically hold the choke valve 1201 in place on the flat portion of the outer surface of air cleaner 1021 in such a way that it cannot go back.

There is a projection 1111 with a tapered surface 1121 on the inside of the aforesaid air cleaner cover 1021. As can be seen in FIG. 33, when the aforesaid choke valve 1201 is rotated toward starting position, the end of rotary knob 1031 will ride up on tapered surface 1121 of the projection 1111 when the knob reaches starting position. The flat surface 1101 of the aforesaid valve 1041 will then press against the inlet of the aforesaid air passage 1061.

This improves the seal formed by flat surface 1101 of the valve 1041 so that the aforesaid air passage 1061 can be completely closed off.

A rotary choke valve 1201 configured as described above is not limited in its application to use as a choke valve for an air cleaner as described above. It can be used for a wide range of applications which require a valve to switch between two fluid passages when knob 1031 is turned to rotate valve 1041.

What is claimed is:

1. A two-stroke cycle engine comprising:
   a scavenger passage which connects a scavenging port on the side of the cylinder to the crank chamber inside the crankcase, and goes through the mounting surface where the cylinder and crankcase are attached to each other; and
   a removable guide with a surface forming a curved smooth channel which is attachable to said scavenger passage in the crankcase from the mounting surface, and forms a portion of said scavenger passage with the curved channel,
   wherein said removable guide comprises a positioning tooth which engages with the hole in the gasket for the mounting surface where the cylinder and crankcase are attached to each other.

2. A two-stroke cycle engine according to claim 1, wherein said removable guide has a depression in the mounting surface where the cylinder and crankcase are attached to each other.

3. A two-stroke cycle engine according to claim 1, wherein paint is applied on said removable guide.

4. A two-stroke cycle engine according to claim 1, wherein said removable guide is fixed to the crankcase when a tooth engages in an indentation in the crankcase.

* * * * *